(12) United States Patent
Witherbee

(10) Patent No.: US 9,444,236 B2
(45) Date of Patent: Sep. 13, 2016

(54) MOUNTING BRACKET FOR ELECTRICAL OR COMMUNICATION DEVICE

(71) Applicant: Cooper Technologies Company, Houston, TX (US)

(72) Inventor: Martin Lee Witherbee, Godfrey, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/701,039

(22) Filed: Apr. 30, 2015

(65) Prior Publication Data

US 2015/0318677 A1    Nov. 5, 2015

Related U.S. Application Data

(60) Provisional application No. 61/986,528, filed on Apr. 30, 2014.

(51) Int. Cl.
*H02G 3/12* (2006.01)
*H02G 3/10* (2006.01)

(52) U.S. Cl.
CPC ............... *H02G 3/126* (2013.01); *H02G 3/10* (2013.01)

(58) Field of Classification Search
CPC .......... Y10S 248/909; Y10S 248/906; H02G 3/126; H02G 3/125
See application file for complete search history.

(56) References Cited

U.S. PATENT DOCUMENTS

| | | | |
|---|---|---|---|
| 1,206,431 A | 11/1916 | Graybill | |
| 4,561,615 A | 12/1985 | Medlin, Jr. | |
| 4,569,458 A * | 2/1986 | Horsley | H02G 3/125 220/3.6 |
| 4,757,908 A | 7/1988 | Medlin, Sr. | |
| 4,964,525 A | 10/1990 | Coffey et al. | |
| 5,209,444 A * | 5/1993 | Rinderer | H02G 3/126 248/205.1 |
| 5,646,371 A | 7/1997 | Fabian | |
| 6,871,827 B2 | 3/2005 | Petak et al. | |
| 6,996,943 B2 | 2/2006 | Denier et al. | |
| 7,053,300 B2 * | 5/2006 | Denier | H02G 3/18 174/50 |
| 7,439,443 B2 * | 10/2008 | Dinh | H02G 3/126 174/481 |
| 7,595,447 B2 * | 9/2009 | Vrame | H01R 13/518 174/57 |
| 7,667,137 B1 * | 2/2010 | Beckman | H02G 3/126 174/135 |
| 7,798,458 B2 * | 9/2010 | Borbolla | H02G 3/086 248/300 |
| 7,902,457 B2 * | 3/2011 | Johnson | H02G 3/126 174/57 |
| 7,923,635 B2 | 4/2011 | Korcz et al. | |
| 8,042,776 B2 | 10/2011 | Johnson | |
| 8,403,289 B1 * | 3/2013 | Rinderer | A47H 1/10 174/480 |
| 8,912,440 B2 * | 12/2014 | Petak | H02G 3/18 174/58 |
| 8,975,519 B2 * | 3/2015 | Lalancette | H05K 5/0204 174/57 |

* cited by examiner

*Primary Examiner* — Rodney Mintz
*Assistant Examiner* — Daniel Kenny
(74) *Attorney, Agent, or Firm* — Senniger Powers LLP

(57) ABSTRACT

A mounting bracket for a junction box includes a face plate, a first leg extending from the face plate, a second leg extending from the face plate, and a leg connector extending between and interconnecting the first and second legs.

18 Claims, 77 Drawing Sheets

MOUNTING BRACKET FOR ELECTRICAL OR COMMUNICATION DEVICE

FIELD OF THE DISCLOSURE

The present disclosure generally relates to a mounting bracket for mounting an electrical or communication device on a wall stud.

BACKGROUND OF THE DISCLOSURE

Typically, an electrical or communication device is installed in a building using a mounting bracket. The communication device is fastened to the mounting bracket, and in turn, the mounting bracket is fastened to framing (e.g., a wall stud). In some circumstances, junction boxes are used to house and protect electrical and communication devices, such as electrical outlets, electrical switches, associated electrical wiring, communication terminals (e.g., terminals for fiber optics), and associated communication cables (e.g., optical fiber cables). The junction box is secured to the mounting bracket, so that, in turn, the electrical or communication device is secured to the mounting bracket.

SUMMARY OF THE DISCLOSURE

In one aspect, a mounting bracket for mounting a junction box on a wall stud generally comprises a face plate including a main body having opposite front and rear faces and opposite left and right side edge margins, wherein the main body is configured for attaching the junction box to the rear face thereof, and at least one stud mounting tab configured for attachment to a wall stud, wherein the at least one stud mounting tab extends outward from at least one of the left and right side edge margins of the main body. A stabilizing extension connected to the face plate includes a first leg extending rearward from the face plate, a second leg extending rearward from the face plate, and a leg connector extending between and interconnecting the first and second legs such that movement of one of the first and second legs relative to the face plate causes movement of the other of the first and second legs relative to the face plate.

In another aspect, a mounting bracket includes a face plate having a first opening. A first plaster ring mounting tab is formed on the face plate and is configured to be bent to overlie the first opening of the face plate.

In another aspect, a mounting bracket assembly includes a mounting bracket comprising a face plate having front and rear faces and a central opening. The face plate includes first and second openings at diagonally opposite corners thereof and first and second plaster ring mounting tabs at the diagonally opposite corners. The first plaster ring mounting tab is positioned adjacent the first opening and configured to be bent toward the rear face to overlie the first opening. The second plaster ring mounting tab is positioned adjacent the second opening and configured to be bent toward the rear face to overlie the second opening. The assembly further includes a plaster ring including a peripheral flange and first and second slots at diagonally opposite corners thereof. A first fastener is configured to extend through the first slot of the plaster ring, the first opening of the face plate, and the first plaster ring mounting tab. A second fastener is configured to extend through the second slot of the plaster ring, the second opening of the face plate, and the second plaster ring mounting tab. The first and second fasteners attach the plaster ring to the mounting bracket.

In yet another aspect, a method of attaching a mounting bracket to a plaster ring includes providing a mounting bracket including a face plate having a first opening and a first plaster ring mounting tab. The first plaster ring mounting tab includes a pilot hole. The first plaster ring mounting tab is bent to align the pilot hole with the first opening of the face plate. A plaster ring is attached to the first plaster ring mounting tab.

In another aspect, a mounting bracket generally comprises a face plate including a main body having a mounting opening for attaching a junction box to the face plate, and a plaster ring mounting tab on the face plate for mounting a plaster ring to the face plate, the plaster ring mounting tab being configured to be bent to overlie the mounting opening of the face plate.

In yet another aspect, a mounting bracket generally comprises a face plate including a main body having left and right edge margins, a first stud mounting tab extending from the left edge margin of the main body, the first stud mounting tab including a clearance hole and a pilot hole vertically aligned with the clearance hole, and a second stud mounting tab extending from the right edge margin of the main body, the second stud mounting tab including a clearance hole and a pilot hole vertically aligned with the clearance hole.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
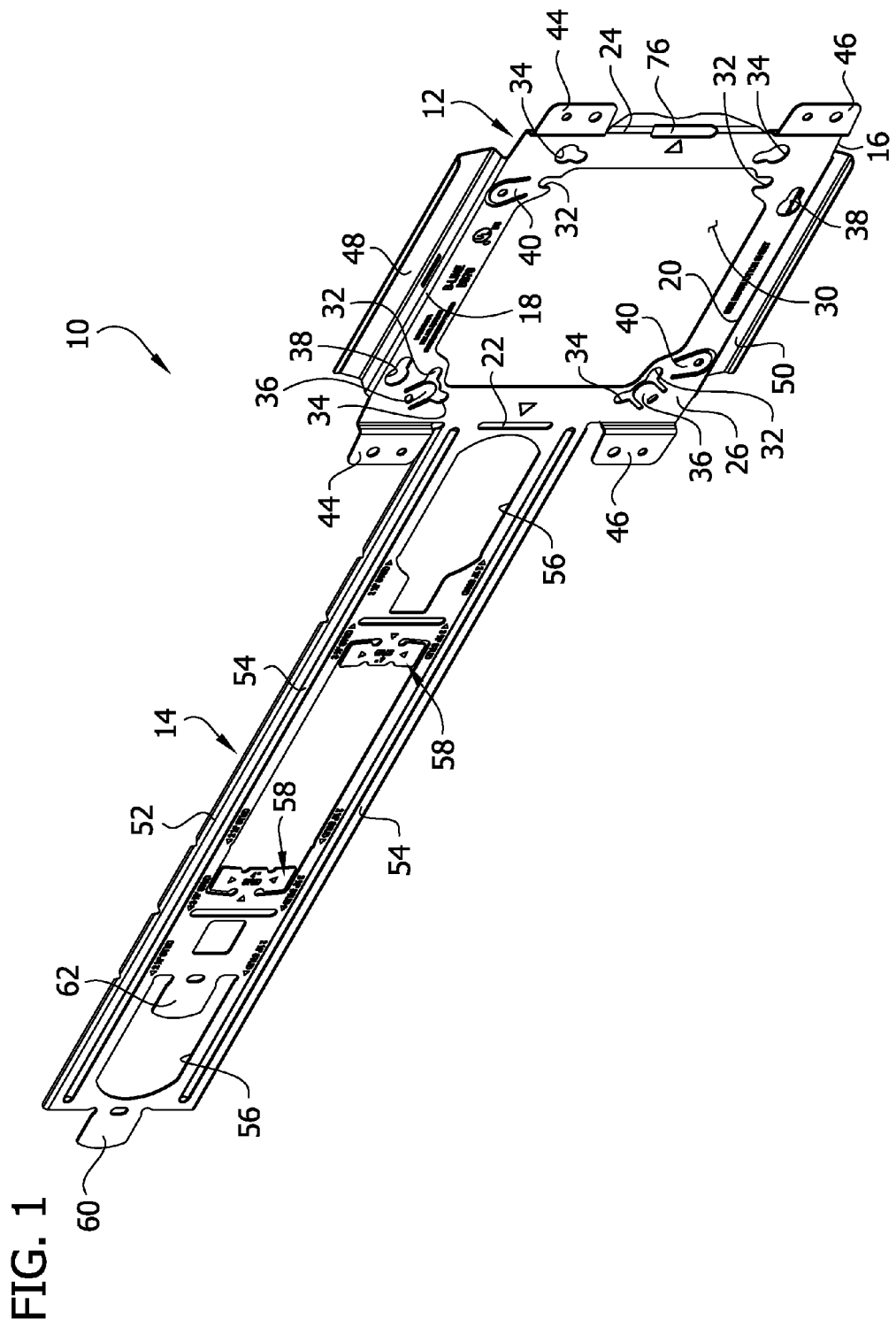
FIG. 1 is a perspective of one embodiment of a mounting bracket for an electrical or communication device.
Figure 2:
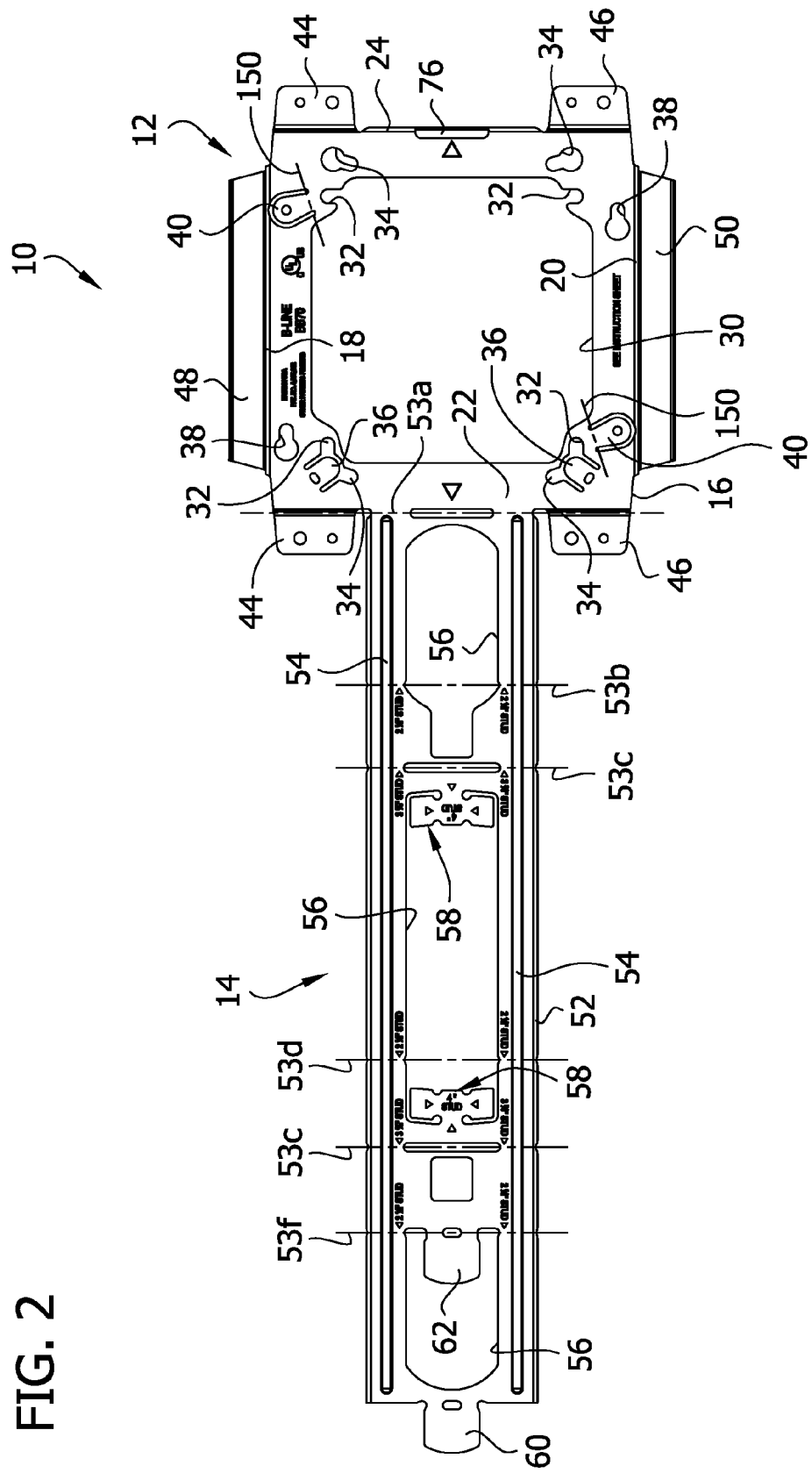
FIG. 2 is a front elevation of the mounting bracket of FIG. 1.
Figure 53:
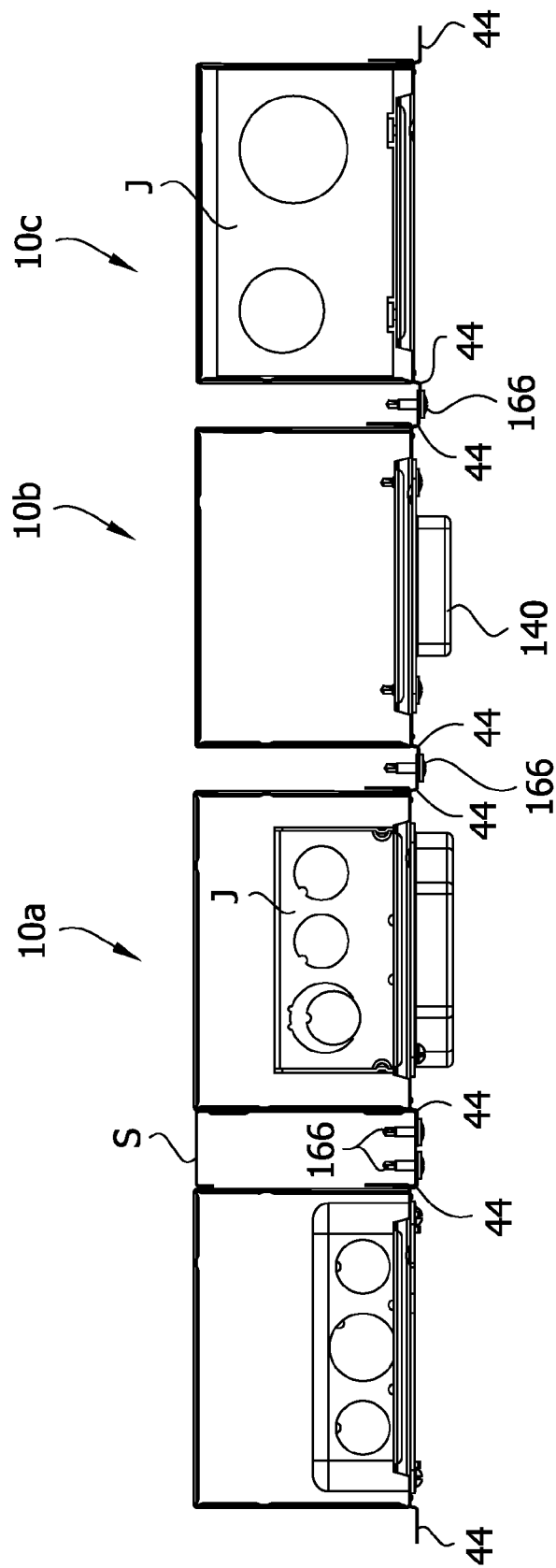
FIG. 53 is a top plan of FIG. 52.
Figure 54:
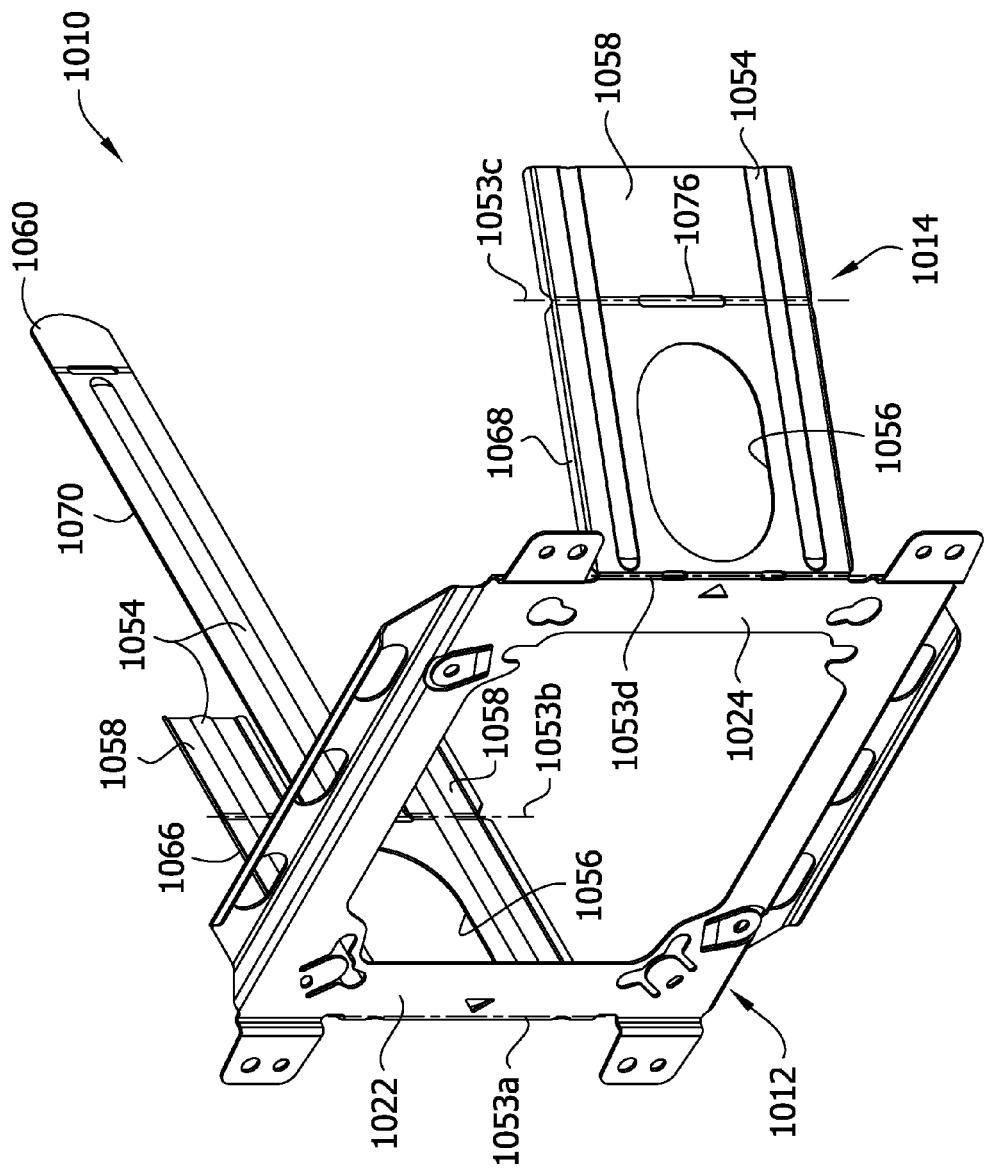
FIG. 54 is a perspective of a second embodiment of a mounting bracket for a junction box.
Figure 55:
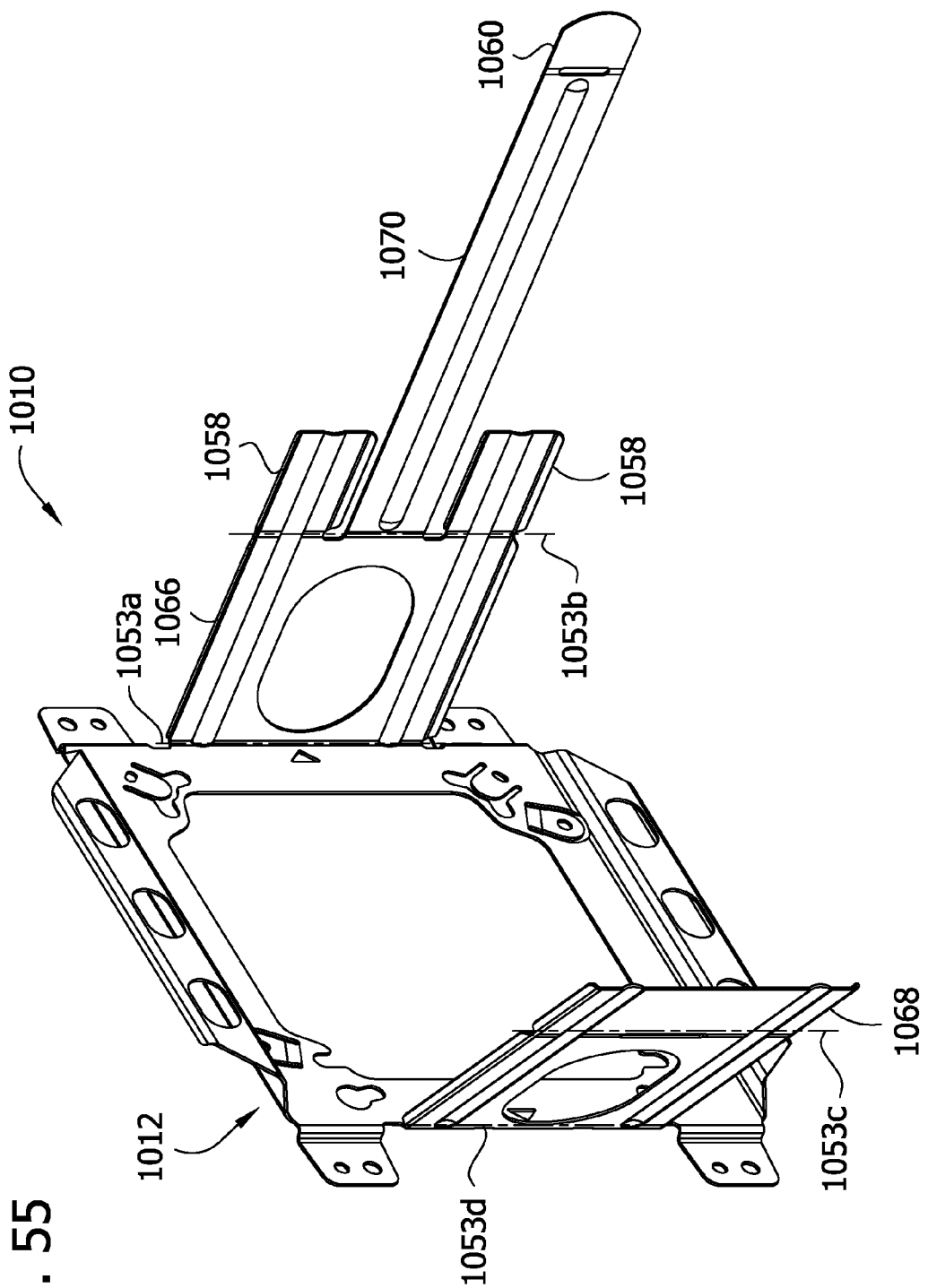
FIG. 55 is a rear perspective of the mounting bracket of FIG. 54.
Figure 56:
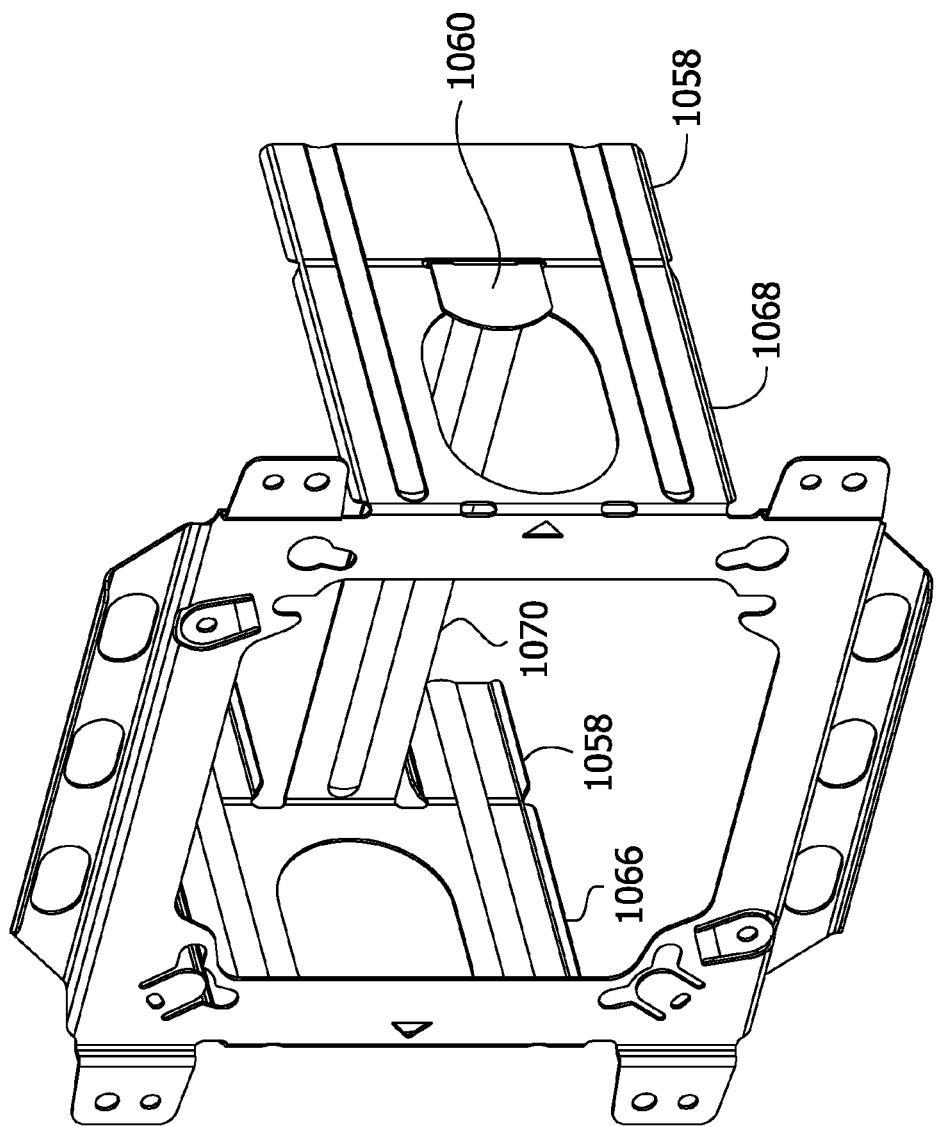
FIG. 56 is a perspective of the mounting bracket in a first stabilizing configuration.
Figure 57:
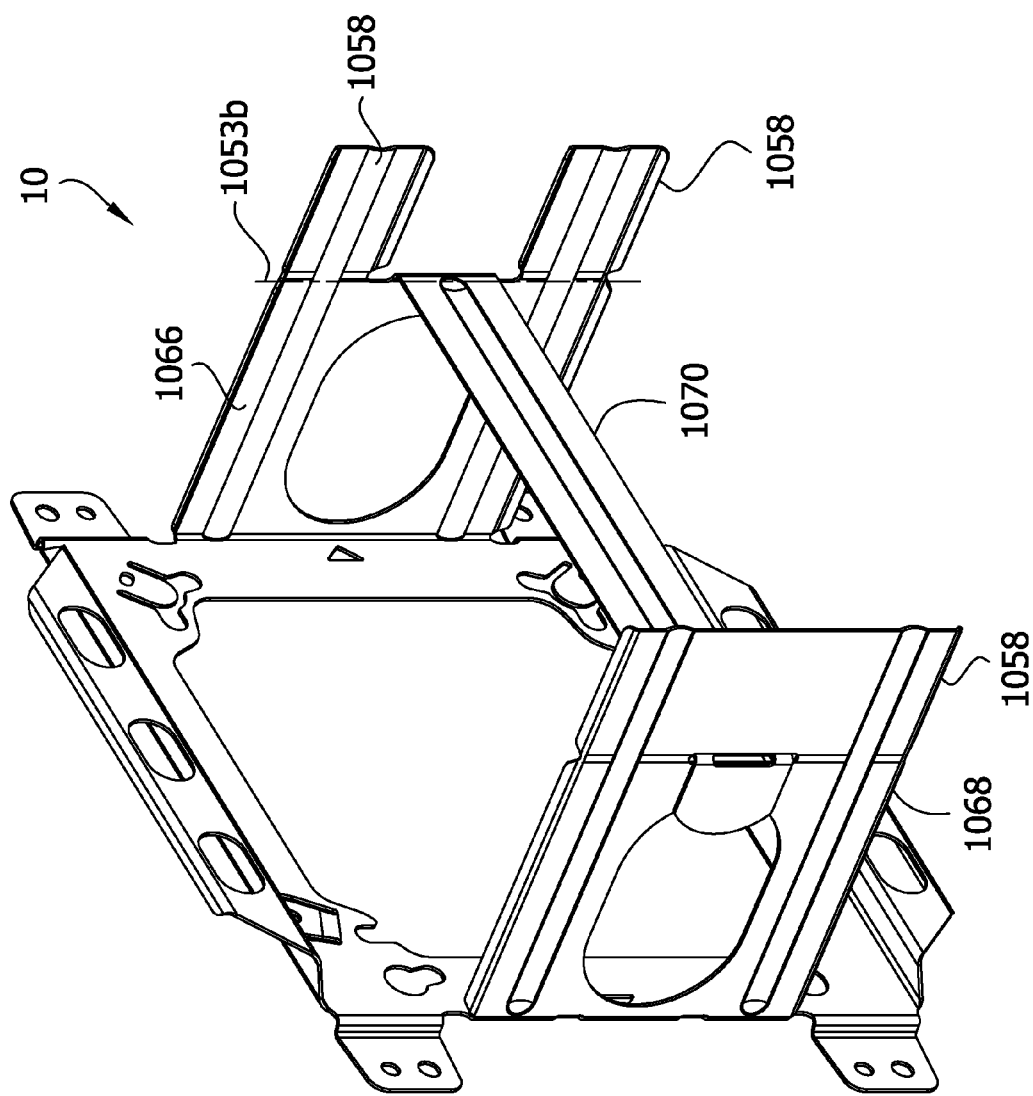
FIG. 57 is a rear perspective of the mounting bracket in the first stabilizing configuration.
Figure 58:
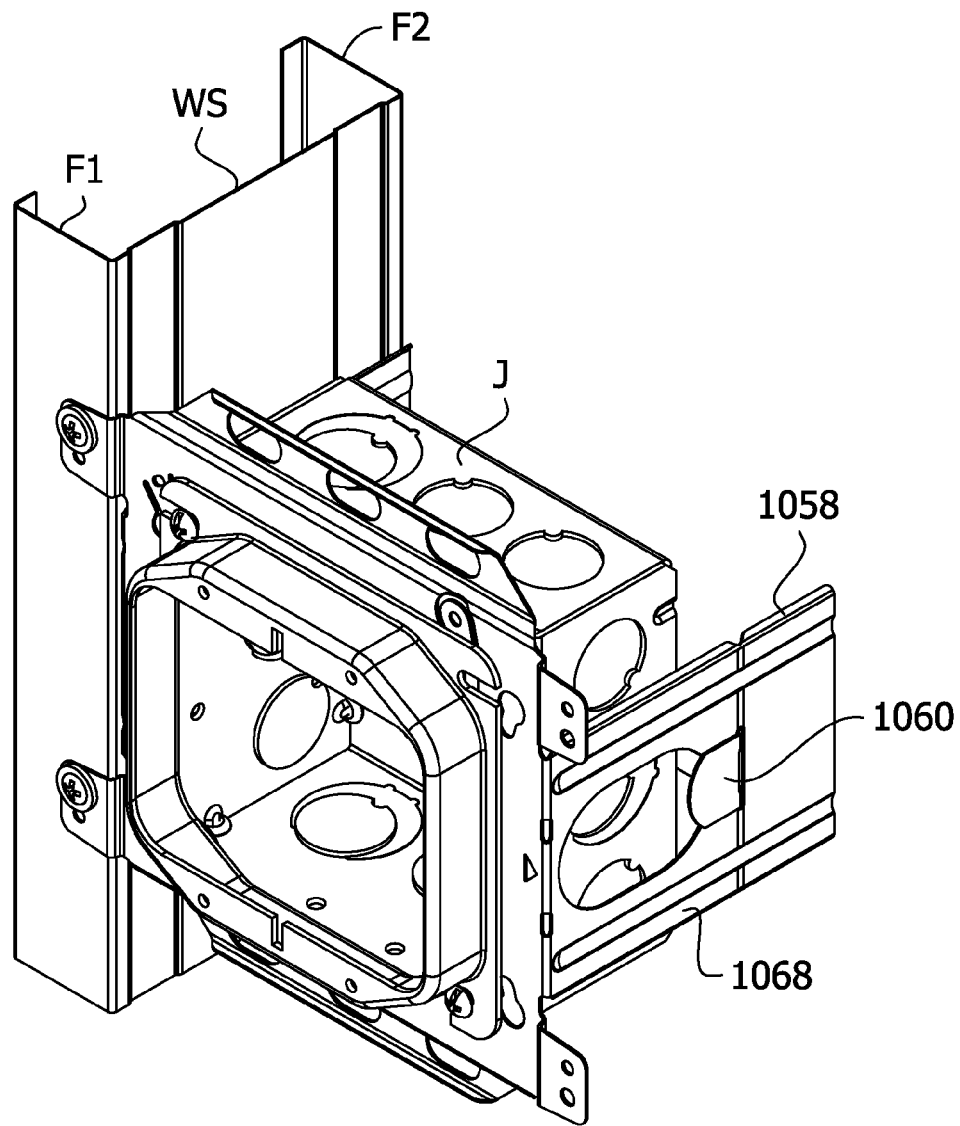
FIG. 58 is a perspective of a mounting bracket assembly including the mounting bracket, a junction box, and a plaster ring, illustrating the mounting bracket assembly attached to a wall stud and the mounting bracket in the first stabilizing configuration.
Figure 59:
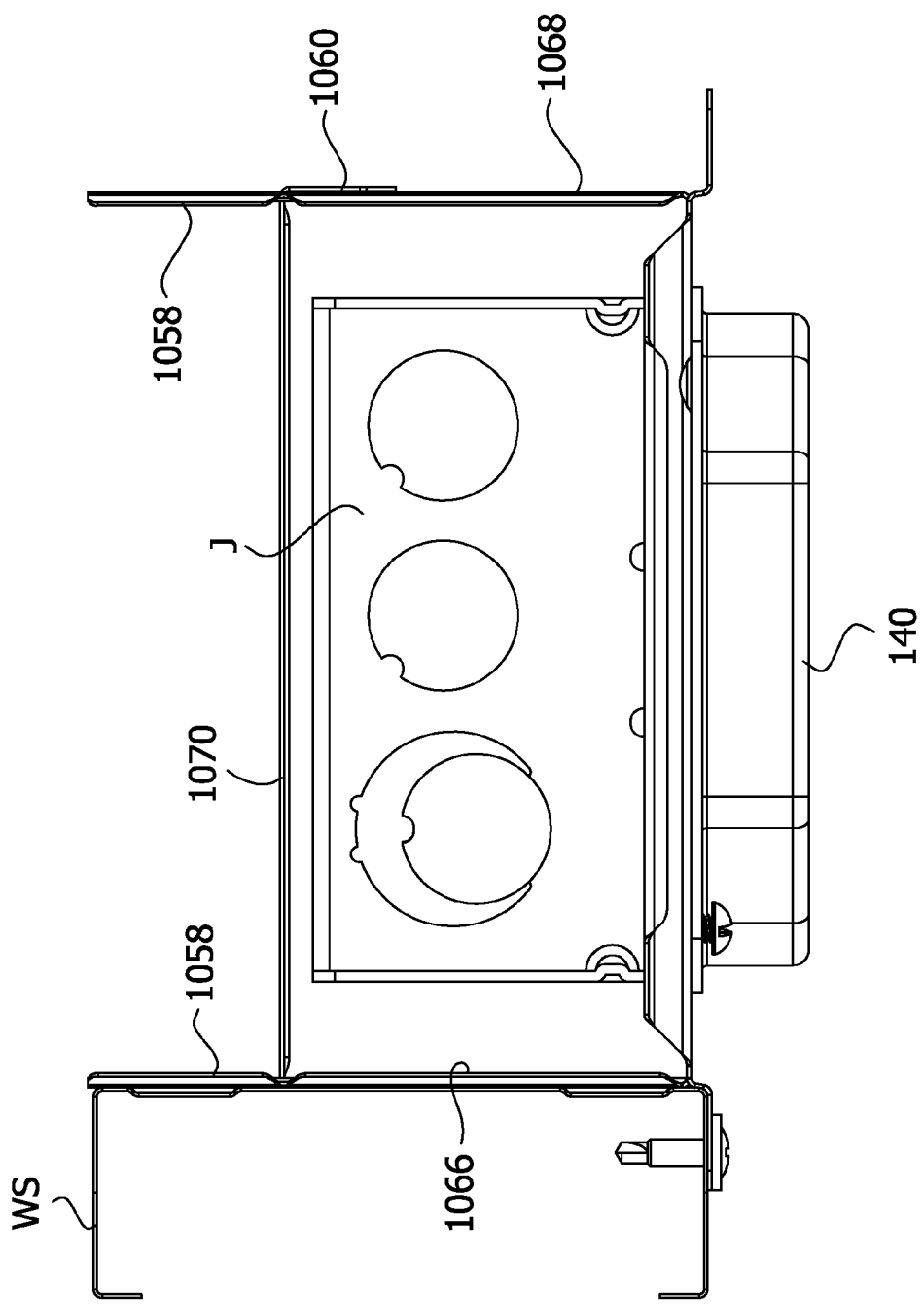
FIG. 59 is a top plan of FIG. 58.
Figure 60:
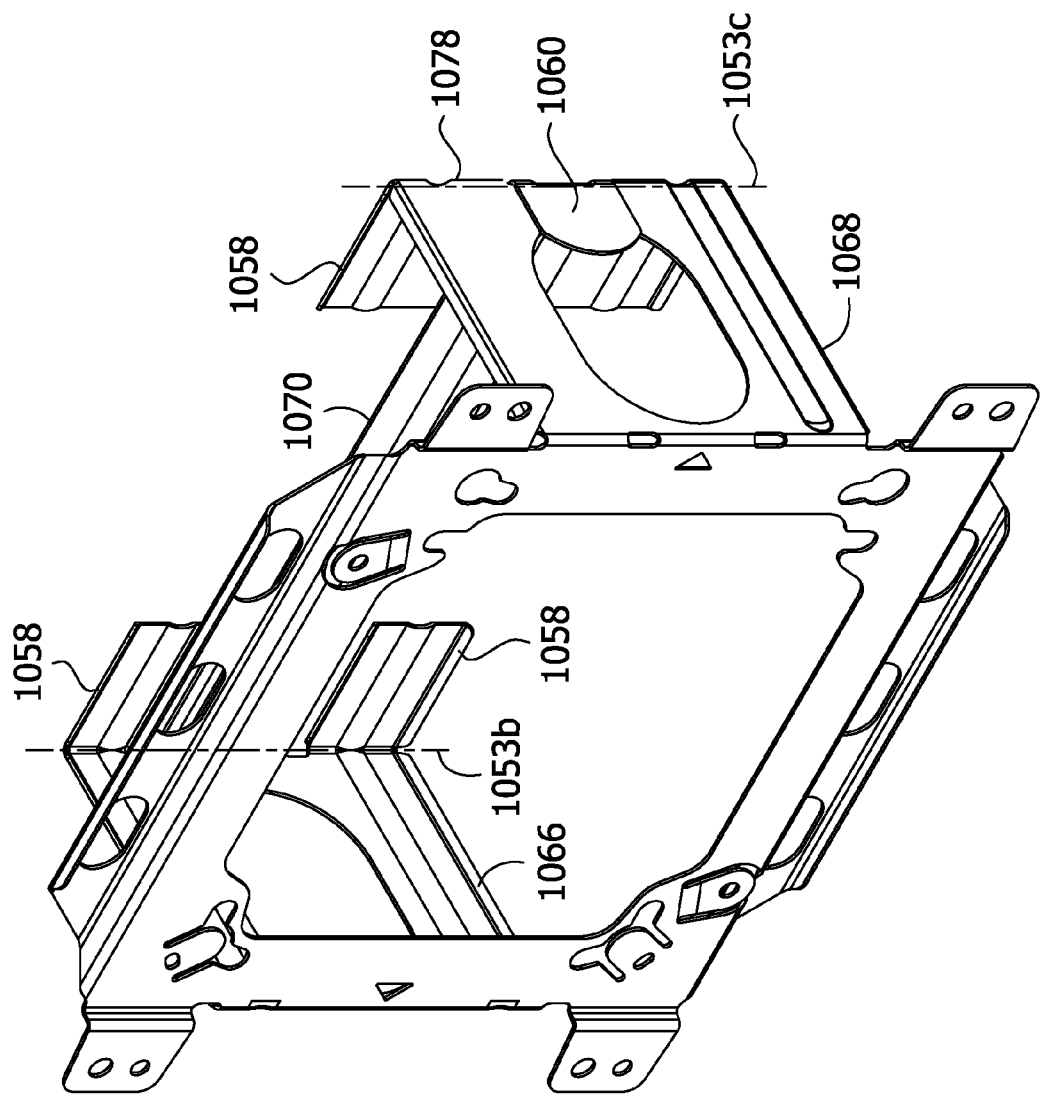
FIG. 60 is a perspective of the mounting bracket in a second stabilizing configuration.
Figure 61:
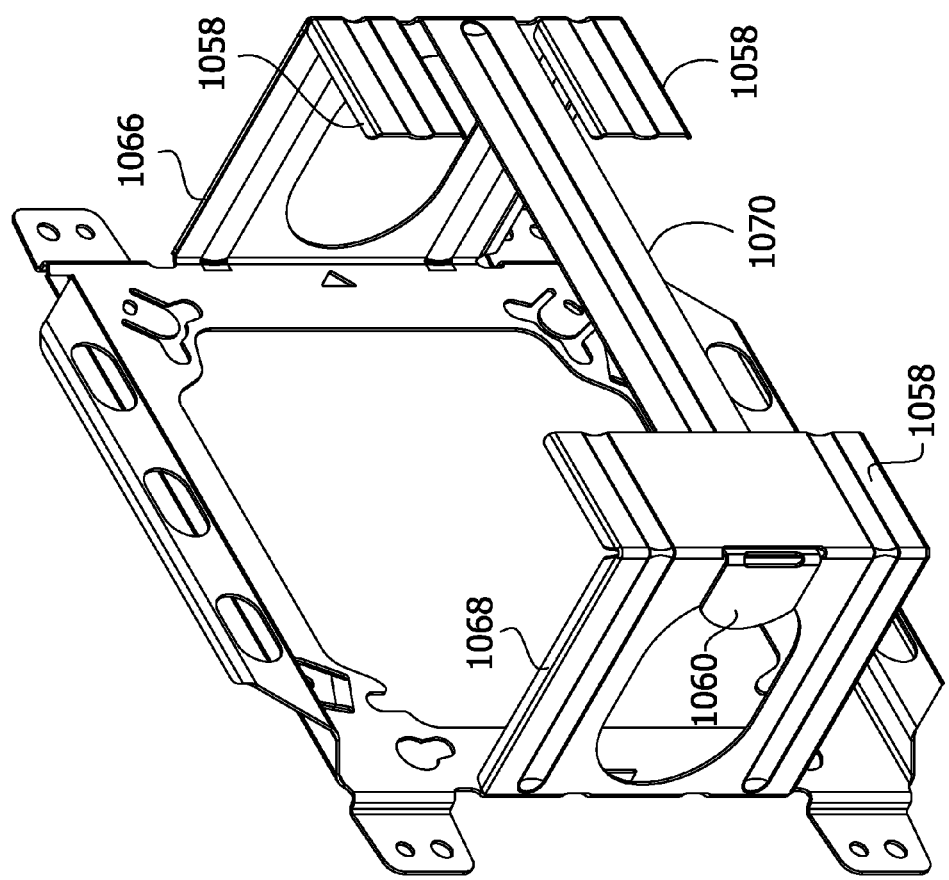
FIG. 61 is a rear perspective of the mounting bracket in the second stabilizing configuration.
Figure 62:
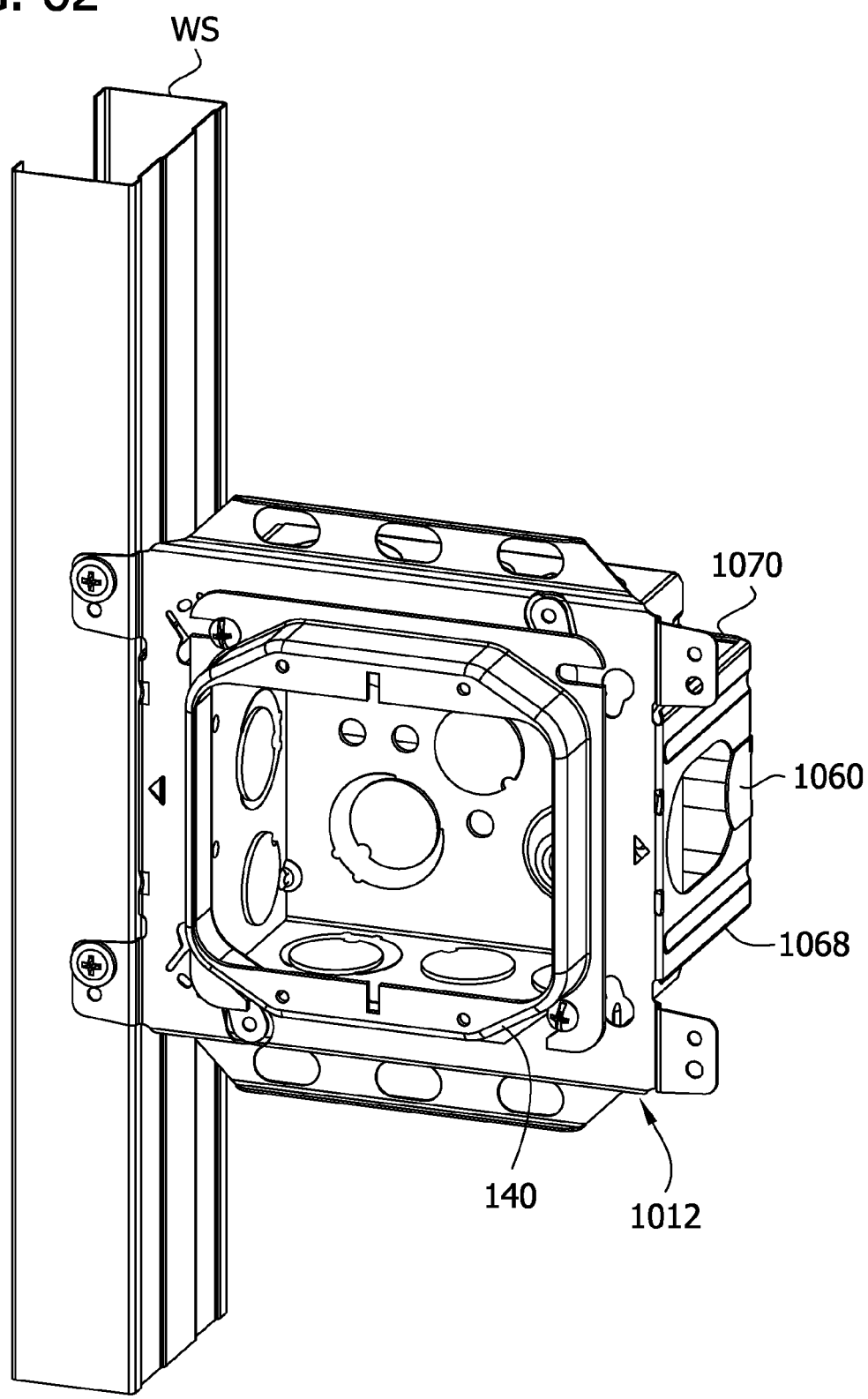
FIG. 62 is a perspective of the mounting bracket assembly attached to the wall stud with the mounting bracket in the second stabilizing configuration.
Figure 63:
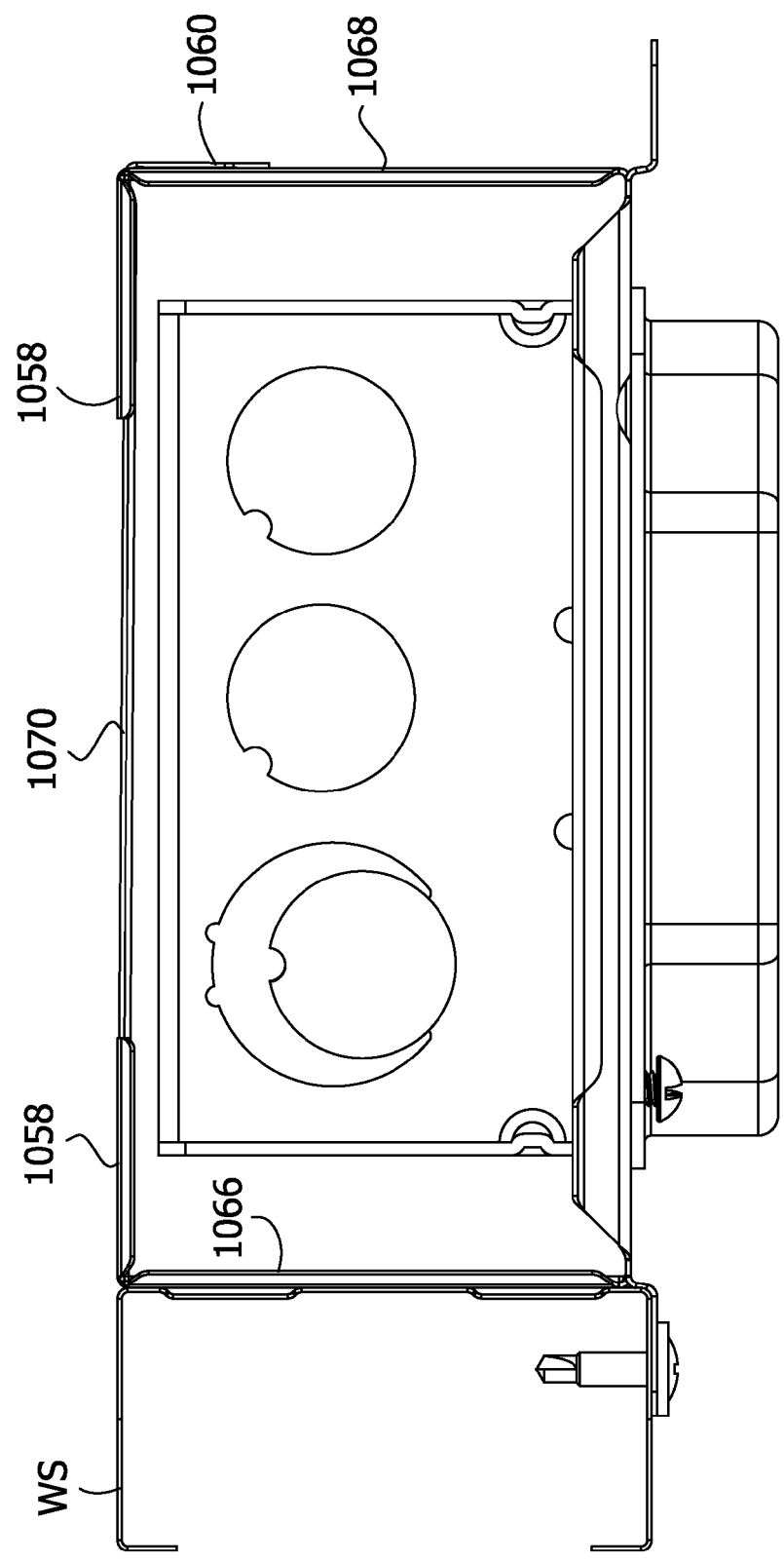
FIG. 63 is a top plan of FIG. 62.
Figure 64:
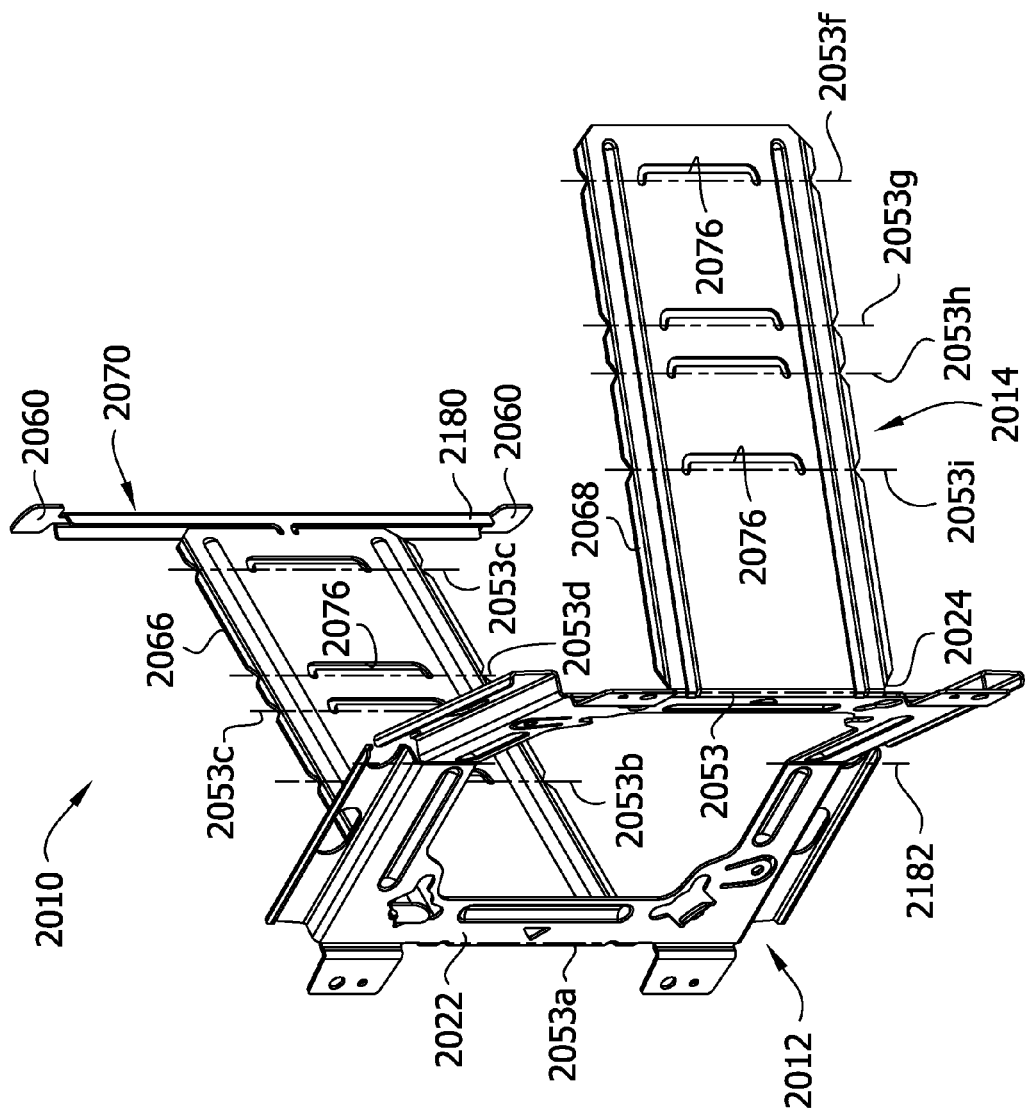
FIG. 64 is a perspective of a third embodiment of a mounting bracket for a junction box.

Referring to FIGS. 1-53, a first embodiment of a mounting bracket for mounting an electrical or communication device (or the like) on a wall stud (e.g., a metal wall stud) is generally indicated at reference numeral 10. In this embodiment, the mounting bracket 10 is a unitary, one-piece construction. The mounting bracket 10 may be formed from a single sheet metal (e.g., steel or aluminum) or other suitable material. In FIGS. 1 and 2, the mounting bracket 10 is shown in an initial configuration. As set forth below, in general the mounting bracket 10 is configured to be bent from the initial configuration to a plurality of different configurations. It is envisioned that in some embodiments the bracket 10 may be sold and shipped to a customer in the initial configuration. In other embodiments, the bracket 10 may be sold and shipped to a customer as part of an assembly (e.g., a pre-assembled electrical or communication assembly), as described below. The orientation of the mounting bracket 10 in the drawings provides the point of reference for the terms defining relative locations and positions of structures and components of the bracket, including but not limited to the terms "upper," "lower," "left," "right," "top," "bottom," "forward," and "rearward," as used throughout the present disclosure.

Referring still to FIGS. 1 and 2, in its initial configuration, the mounting bracket 10 includes a face plate, generally indicated at 12, and a stabilizing extension, generally indicated at 14, extending laterally outward from the face plate. The face plate 12 includes a main body 16 that is generally rectangular having opposite upper and lower edge margins 18, 20, opposite left and right edge margins 22, 24, a front face 26, a rear face 28 (FIG. 4), and a large, generally rectangular, central opening 30. The central opening 30 is sufficiently large enough to permit use of the mounting bracket 10 with junction boxes J of different sizes. When fastened to the main body 16, as described below, the junction box J is generally accessible through the central opening 30. As an example, the mounting bracket 10 is suitable for use with the junction boxes J having the following known sizes (length of upper and lower sides x length of left and right sides): 4×4 in, 4$^{11}/_{16}$×4$^{11}/_{16}$ in, and 5×5 in.

Figure 3:
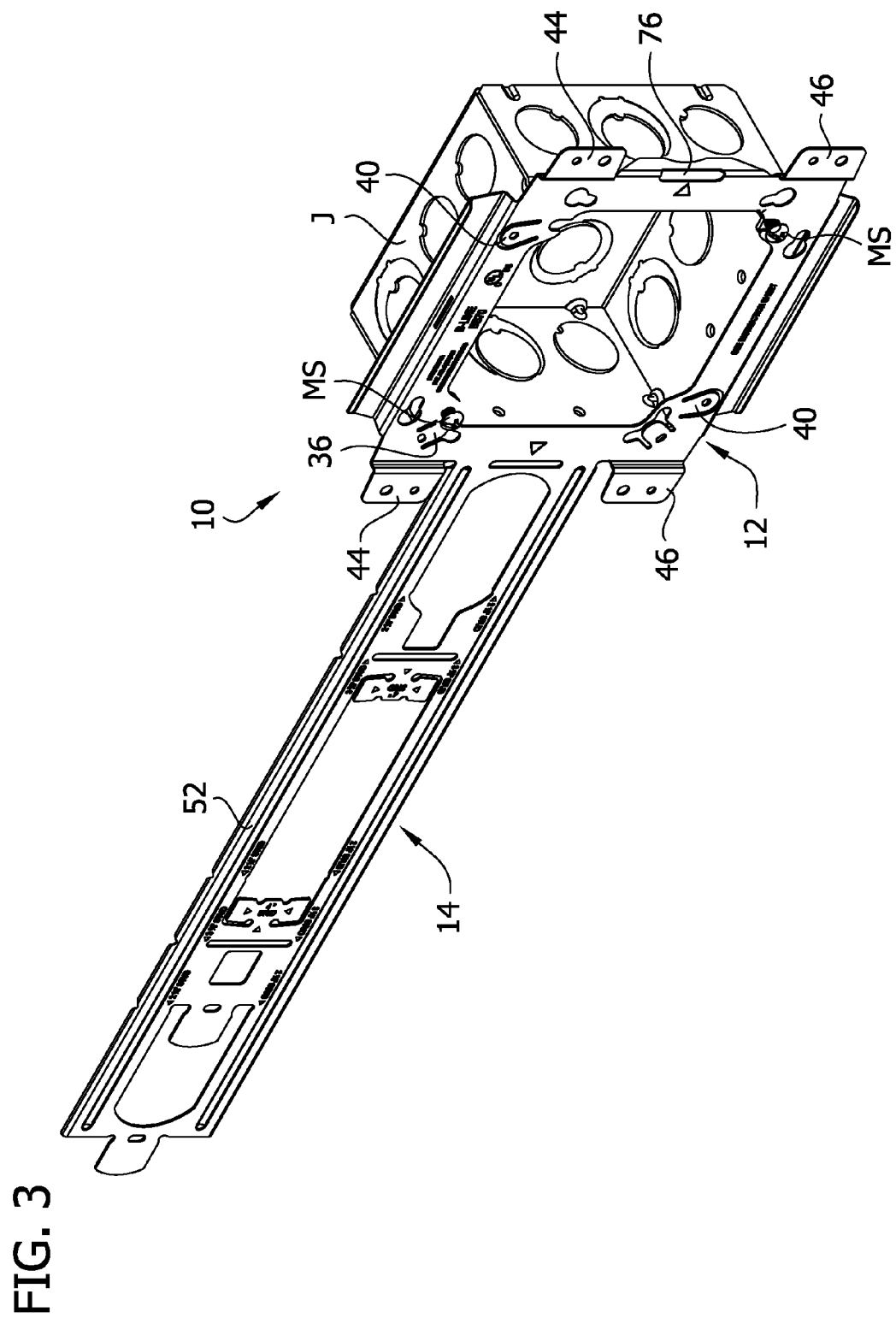
FIG. 3 is a perspective of a mounting bracket assembly including the mounting bracket and a junction box attached to the mounting bracket.
Figure 4:
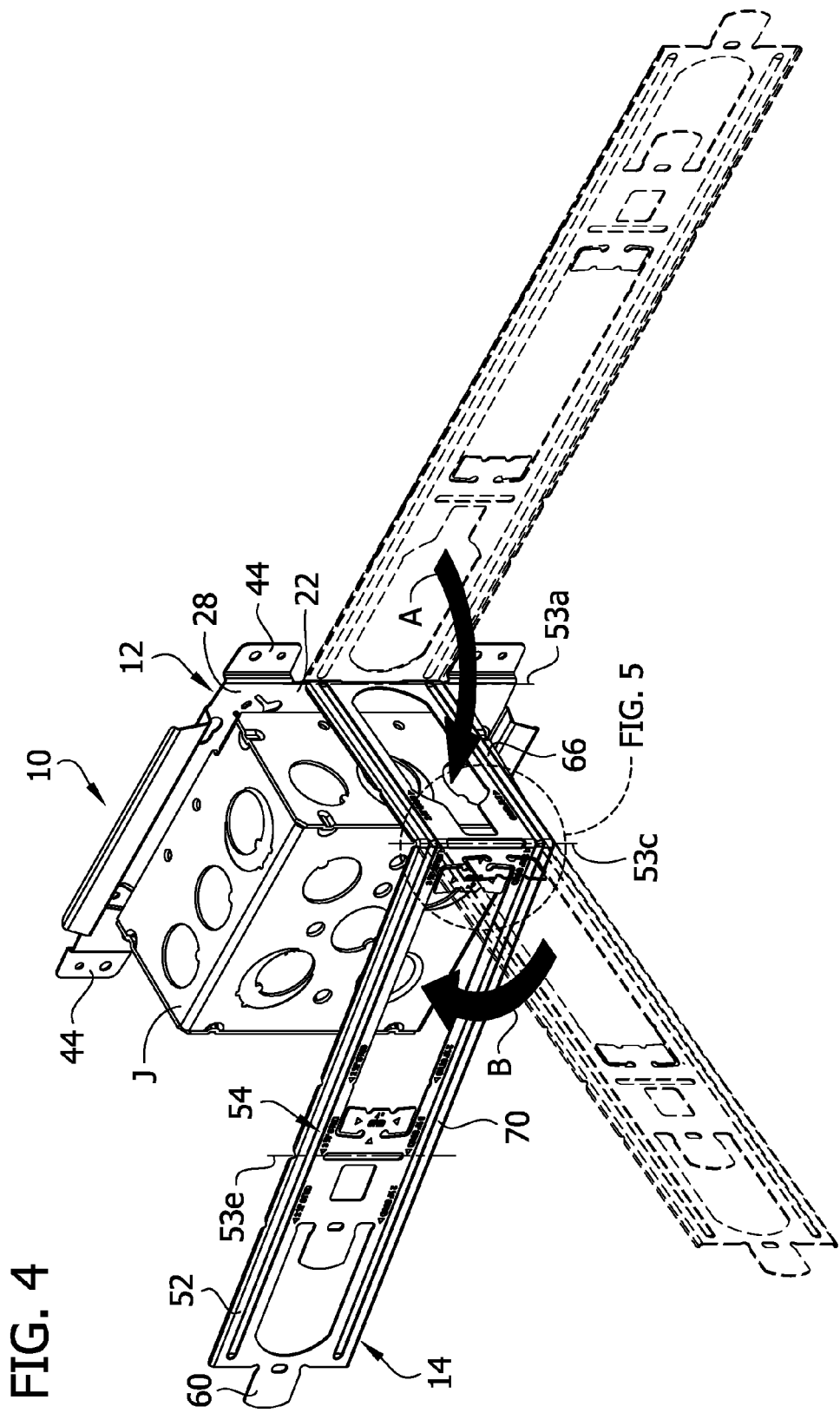
FIG. 4 is a rear perspective of the mounting bracket assembly of FIG. 3, illustrating movement of the mounting bracket from an initial configuration to a first stabilizing configuration.

Referring still to FIGS. 1 and 2, a plurality of sets of box mounting openings 32, 34 are formed in the main body 16 for use in fastening junction boxes J of different sizes to the rear face 28 of the main body of the mounting bracket 10 (FIG. 4). The sets of box mounting openings 32, 34 are generally known in the art. Briefly, the set of box mounting openings 32 adjacent diagonally opposite corners of the main body 16 of the face plate 12 is generally for use in attaching the 4×4 in junction box J to the mounting bracket 10. The set of box mounting openings 34 is generally for use in attaching a 4$^{11}/_{16}$×4$^{11}/_{16}$ in junction box J to the mounting bracket 10. Locking devices 36 associated with some of the openings 32, 34 are generally for use in permitting the junction box J to be attached to the mounting bracket 10 and wired without the need for tightening the junction box mounting screws MS (FIG. 3). The sets of openings 32, 34 and the locking devices 36 are described in U.S. Pat. No. 5,595,362, filed Dec. 17, 1992, the entirety of which is hereby incorporated by reference.

In the illustrated embodiment, a third set of box mounting openings 38 are also formed in the main body 16, generally adjacent diagonally opposite corners of the main body, for use in attaching a 5×5 in data junction box to the mounting bracket 10. The 5×5 in data junction box may be of the type described in U.S. Pat. No. 6,379,166, filed Jun. 26, 2000, the entirety of which is hereby incorporated by reference, and/or one or more of the following data junction boxes commercially available from Randl Industries, Inc. of Spokane, Wash.: #T-55017, #T-55018, and #T-55019. Accordingly, the illustrated bracket 10 is configured to allow selective attachment thereto of any one of three different junction boxes: a 4×4 in junction box; a 4$^{11}/_{16}$×4$^{11}/_{16}$ in junction box; and a 5×5 in data junction box.

A pair of plaster ring mounting tabs 40 is also formed on the main body 16. These mounting tabs 40 are for use in attaching a plaster ring to the mounting bracket 10 without using the junction box J, as described below herein with reference to FIGS. 44-49.

Figure 16:
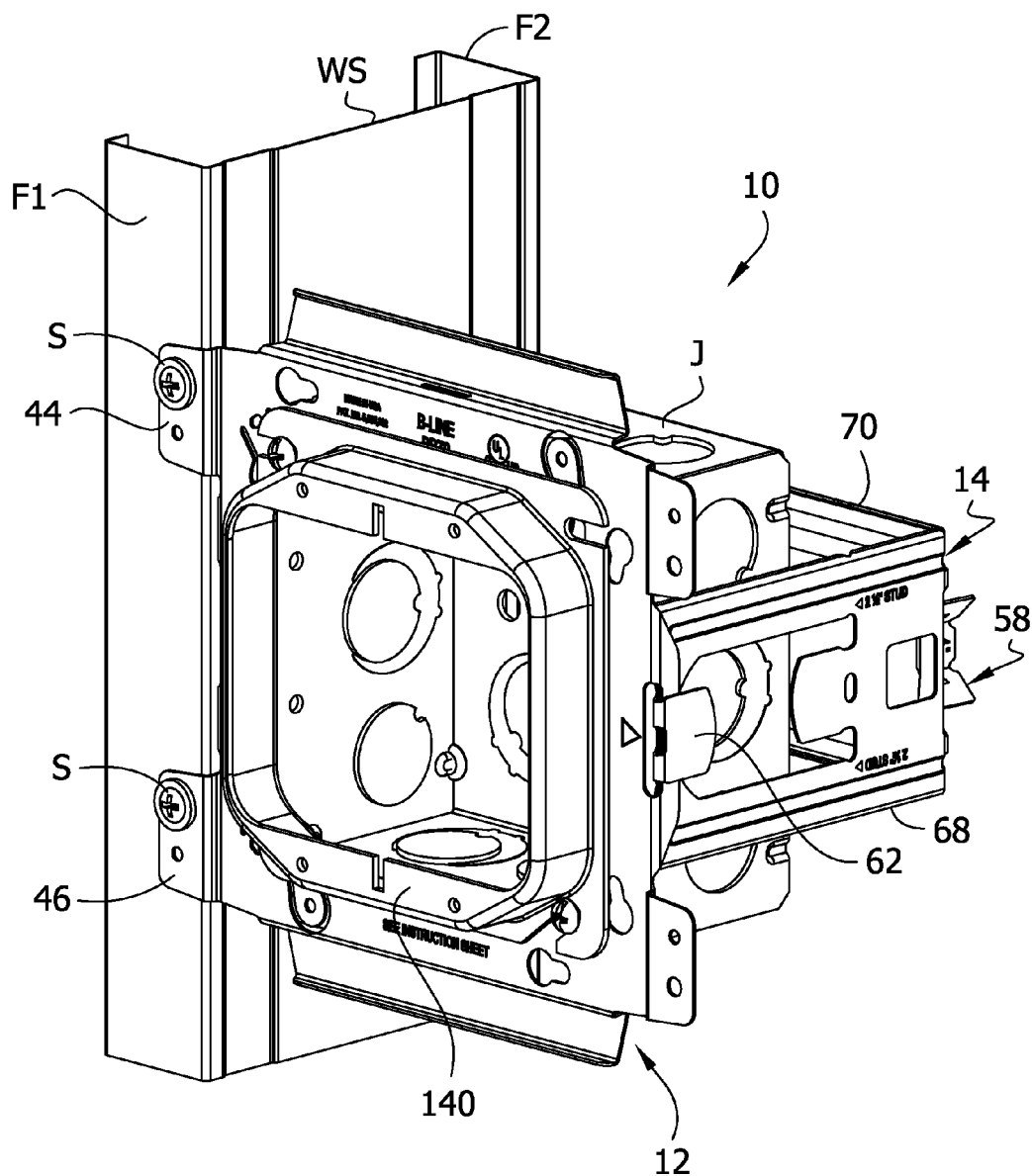
FIG. 16 is a perspective of the mounting bracket assembly in the second stabilizing configuration attached to a wall stud.
Figure 17:
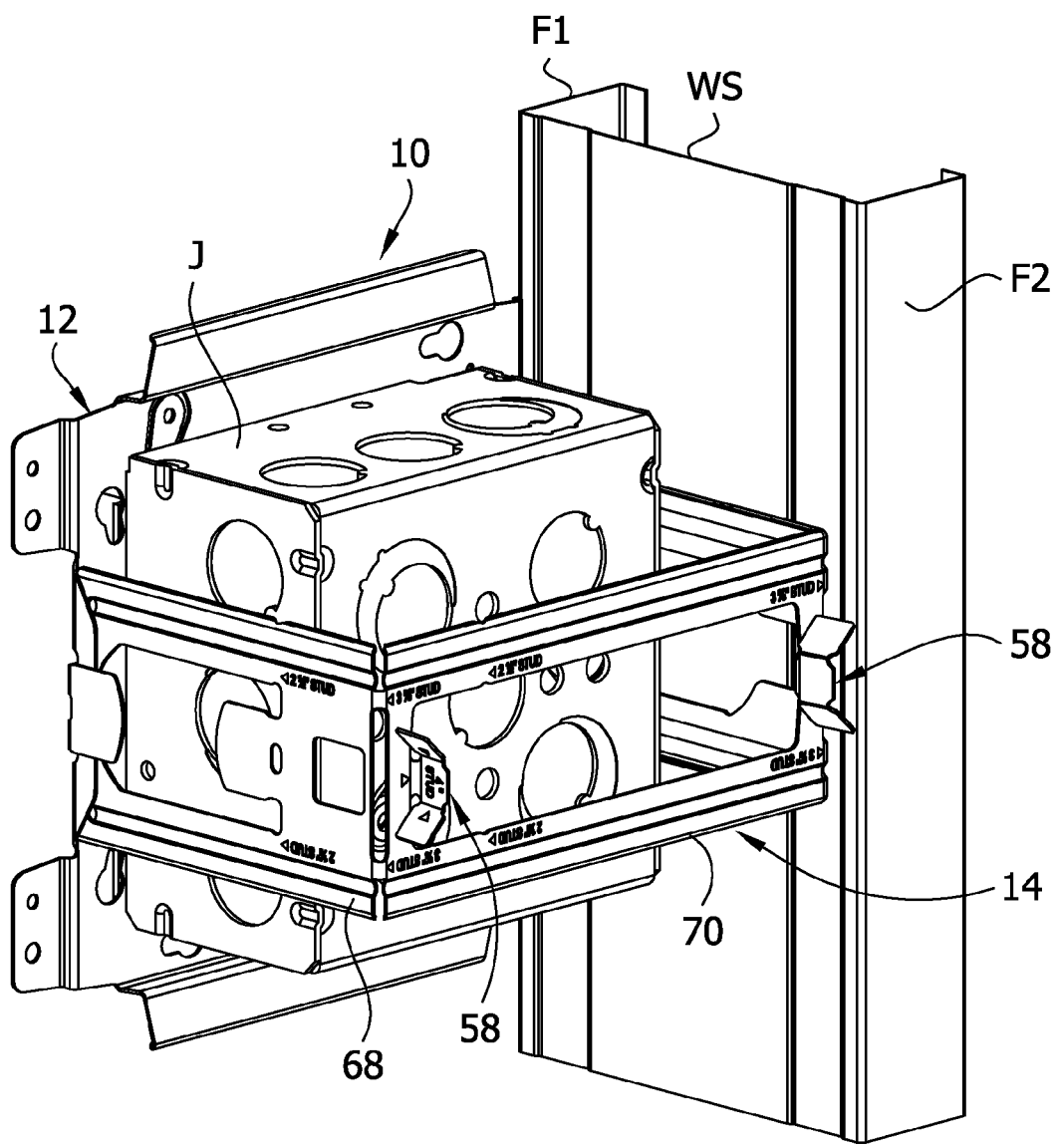
FIG. 17 is a rear perspective of the mounting bracket assembly in the second stabilizing configuration attached to the wall stud.

The face plate 12 also includes pairs of upper and lower stud mounting tabs 44, 46. The stud mounting tabs 44, 46 extend laterally outward from the left and right edges margins 22, 24 of the main body 16. In general, these stud mounting tabs 44, 46 are used to secure the mounting bracket 10 to the wall stud WS using suitable fasteners S (e.g., standard self-tapping sheet metal screws), as shown in FIG. 16, for example. Additional details of the stud mounting tabs 44, 46 are described below herein with reference to FIGS. 44 and 46-53.

Upper and lower component attachment flanges 48, 50, respectively, extend upward and downward, respectively, from the respective upper and lower edge margins 18, 20 of the main body 16 of the face plate 12. The component attachment flanges 48, 50 are used to secure additional components to the mounting bracket 10. For example, a cable containment component (not shown) may be secured to the upper component attachment flange 48, and a floor stand (not shown) may be secured to the lower component attachment flange 50. Suitable component attachment flanges, cable containment components, and floor stands are described in pending U.S. patent application Ser. No. 13/839,458, filed Mar. 15, 2013, the entirety of which is hereby incorporated by reference. In other embodiments, the mounting bracket 10 may not include the upper and lower attachment flanges 48, 50.

The stabilizing extension 14 is configurable to one of a plurality of stabilizing configurations for maintaining the face plate 12 generally parallel to a front mounting face F1 of the wall stud WS to which the mounting bracket 10 is secured. As is generally known and seen in FIG. 10B, for example, opposing front and rear walls FW, RW (e.g., dry wall) are secured to respective front and rear mounting faces F1, F2 (e.g., flanges) of the wall stud WS using suitable fasteners (e.g., standard self-tapping sheet metal screws; not shown). As shown in FIG. 10B, for example, the distance between the opposite wall mounting faces F1, F2 defines the depth d of the wall stud WS. Examples of metal wall studs WS are also shown in FIGS. 18, 28-30, 35-37, 40-42, and 50-53. As is generally known in the electrical and communications equipment industry, there are different types of metal wall studs WS having different depths d. For example, studs WS having the following wall stud depths d are generally known: 2½ in, 3⅝ in, 4 in, 5½ in, and 6 in. As explained below, the illustrated stabilizing extension 14 provides a generally rigid stabilizer that is suitable for use with studs WS having any one of the above-listed wall stud depths to maintain the face plate 12 of the mounting bracket 10 generally parallel to the front mounting face F1 of the stud to which the mounting bracket is secured. It is understood that the stabilizing extension 14 may be configured for studs WS having other or additional depths d. As used herein, the wall mounting face to which the illustrated bracket 10 is secured is called the front wall mounting face F1 to provide a point of reference for ease of description, with the understanding the other wall mounting face (i.e., the rear wall mounting face F2) may also have a mounting bracket secured thereto.

With reference to FIGS. 1-3, the stabilizing extension 14 includes an elongate, generally rectangular stabilizing body 52 extending laterally outward from one of the side edge margins (e.g., the left edge margin 22) of the main body 16 of the face plate 12. The stabilizing body 52 is generally planar in its initial configuration shown in FIGS. 1-3. The stabilizing body 52 is configured for bending about bending axes 53*a*-53*f* extending generally transverse (e.g., perpendicular) to and spaced apart along the stabilizing body. Bending areas of the stabilizing body 52 define the bending axes 53*a*-53*f* to allow for configuring the stabilizing extension 14 into a selected one of the stabilizing configurations depending on the depth d of the wall stud WS to which the mounting bracket 10 will be secured. For example, the bending areas may comprise lines of weakness to facilitate bending of the stabilizing body 52 about the bending axes 53*a*-53*f*. As seen in FIGS. 1-3, the lines of weakness may be defined by notches (or cutouts) and/or openings (e.g., slots) in the stabilizing body 52. (The bending axes 53*a*-53*f* pass through these notches and/or openings). Other suitable ways of facilitating bending of the stabilizing body 52 about the bending axes 53*a*-53*f* do not depart from the scope of the present invention. For example, thinning material at the bending locations or rigidifying the stabilizing body at opposite sides of the bending locations may facilitate bending about the bending axes 53*a*-53*f*. Ribs 54 extend along the length of the stabilizing body 52 to provide rigidity to the stabilizing extension when it is in one of the stabilizing configurations.

The stabilizing extension 14 has large openings 56 extending through the stabilizing body 52. These openings 56 allow for wires or conduits to pass through the stabilizing body 52 to the junction box J when the stabilizing extension is in one of its stabilizing configurations. The stabilizing extension 14 also includes extension tabs, generally indicated at 58, and first and second locking tongues 60, 62 for use in certain stabilizing configurations, as explained below.

Figure 15:
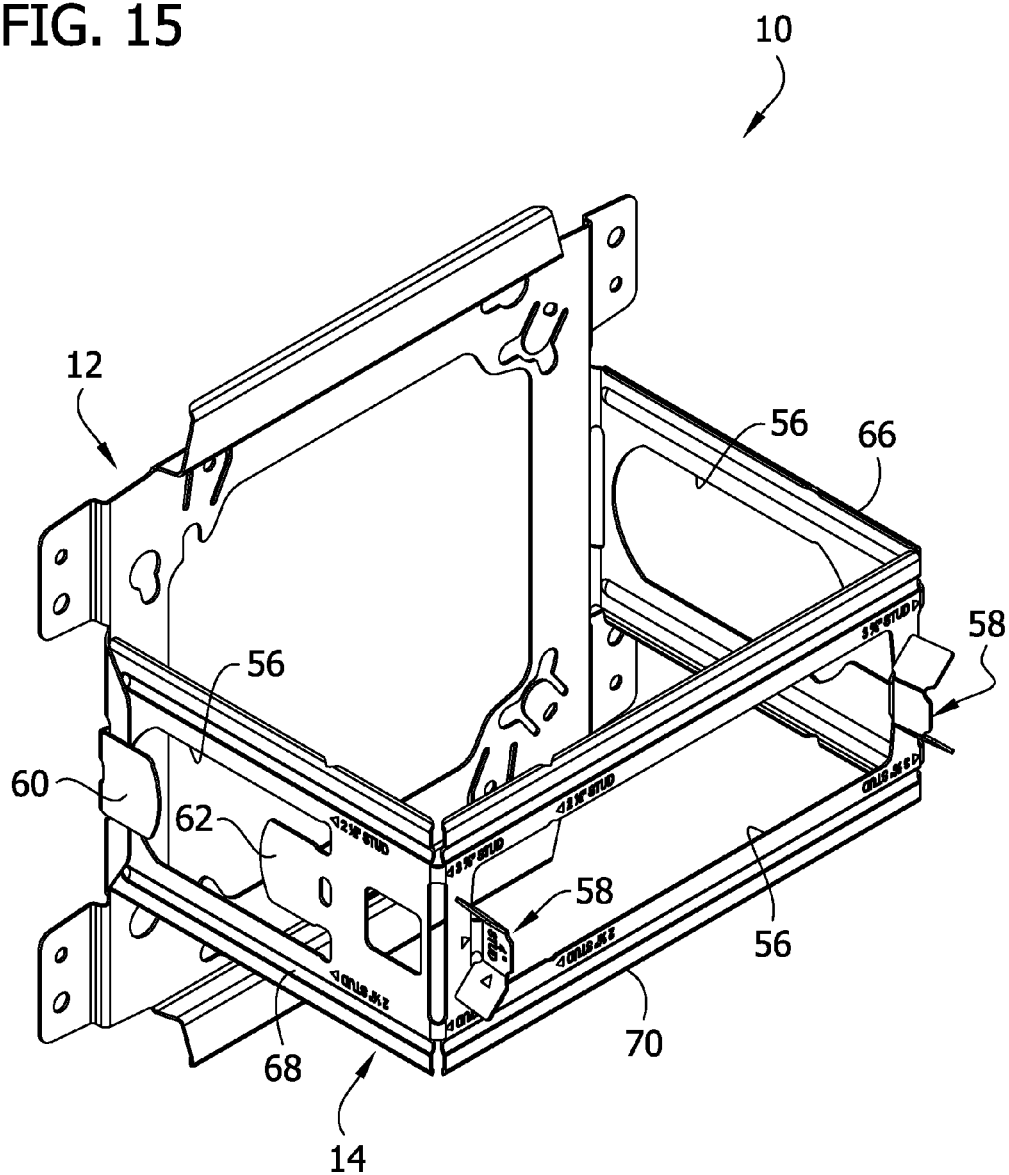
FIG. 15 is a rear perspective of the mounting bracket in the second stabilizing configuration.
Figure 27:
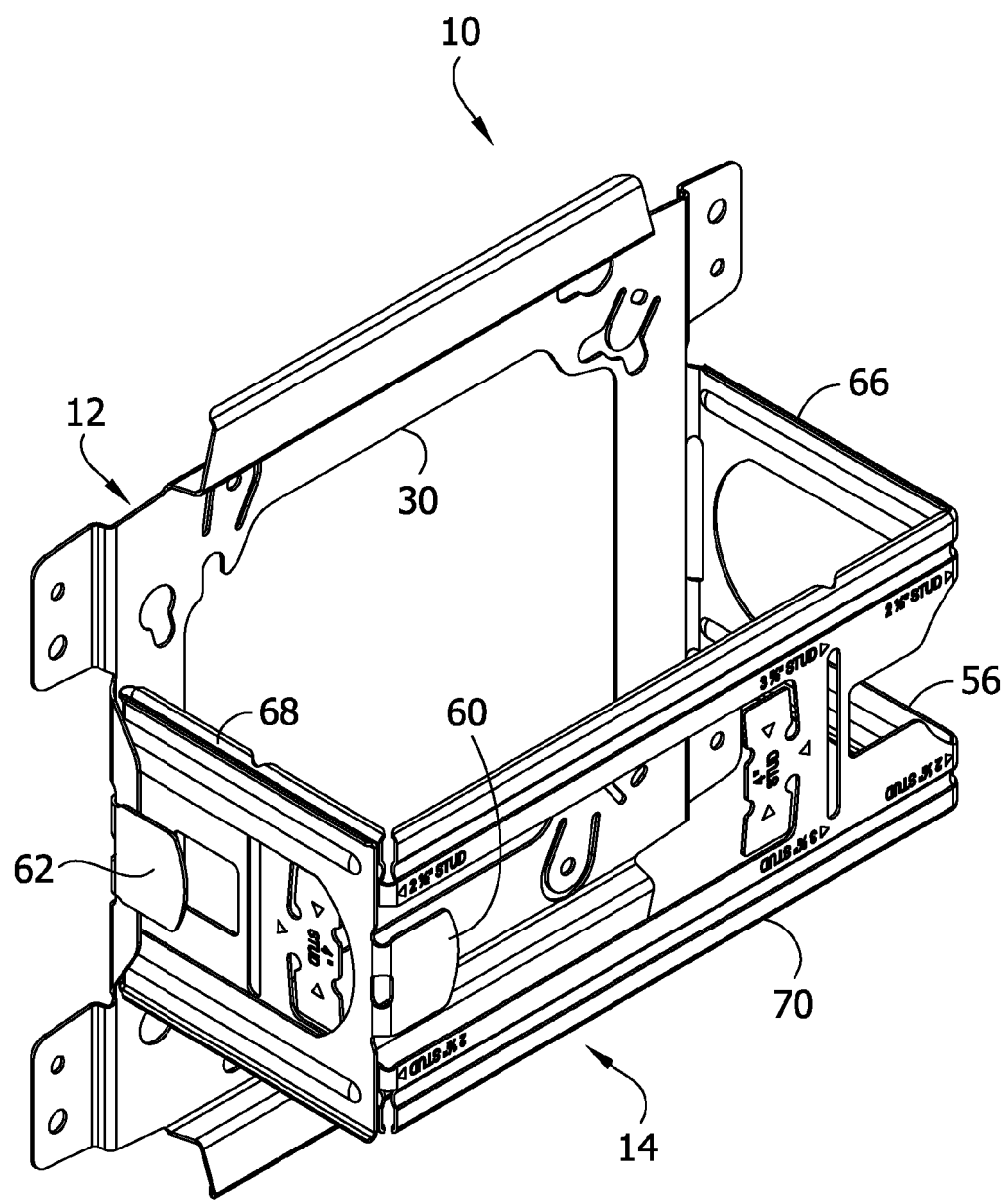
FIG. 27 is a rear perspective of the mounting bracket in the third stabilizing configuration.
Figure 28:
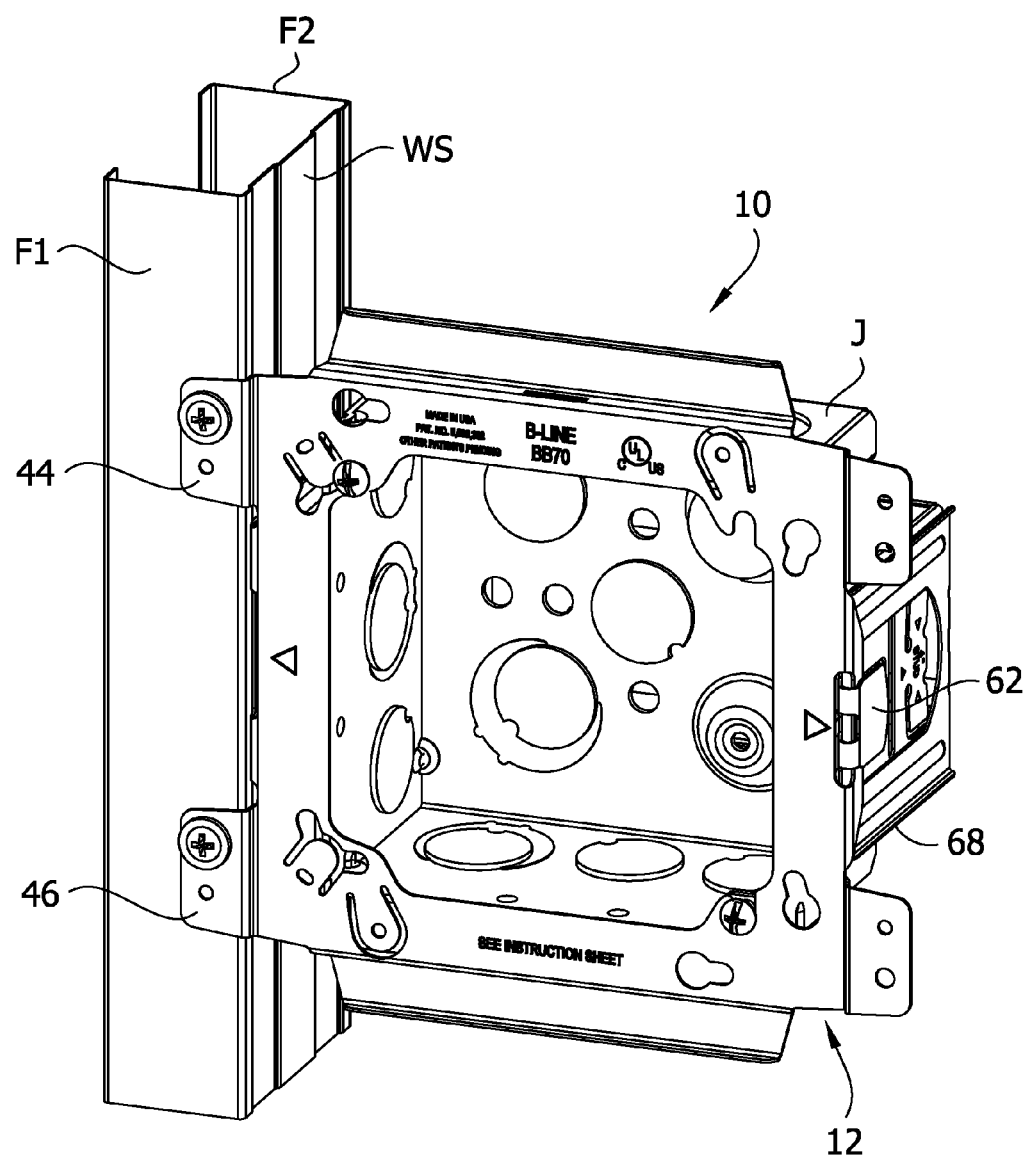
FIG. 28 is a perspective of the mounting bracket assembly in the third stabilizing configuration attached to a wall stud.
Figure 29:
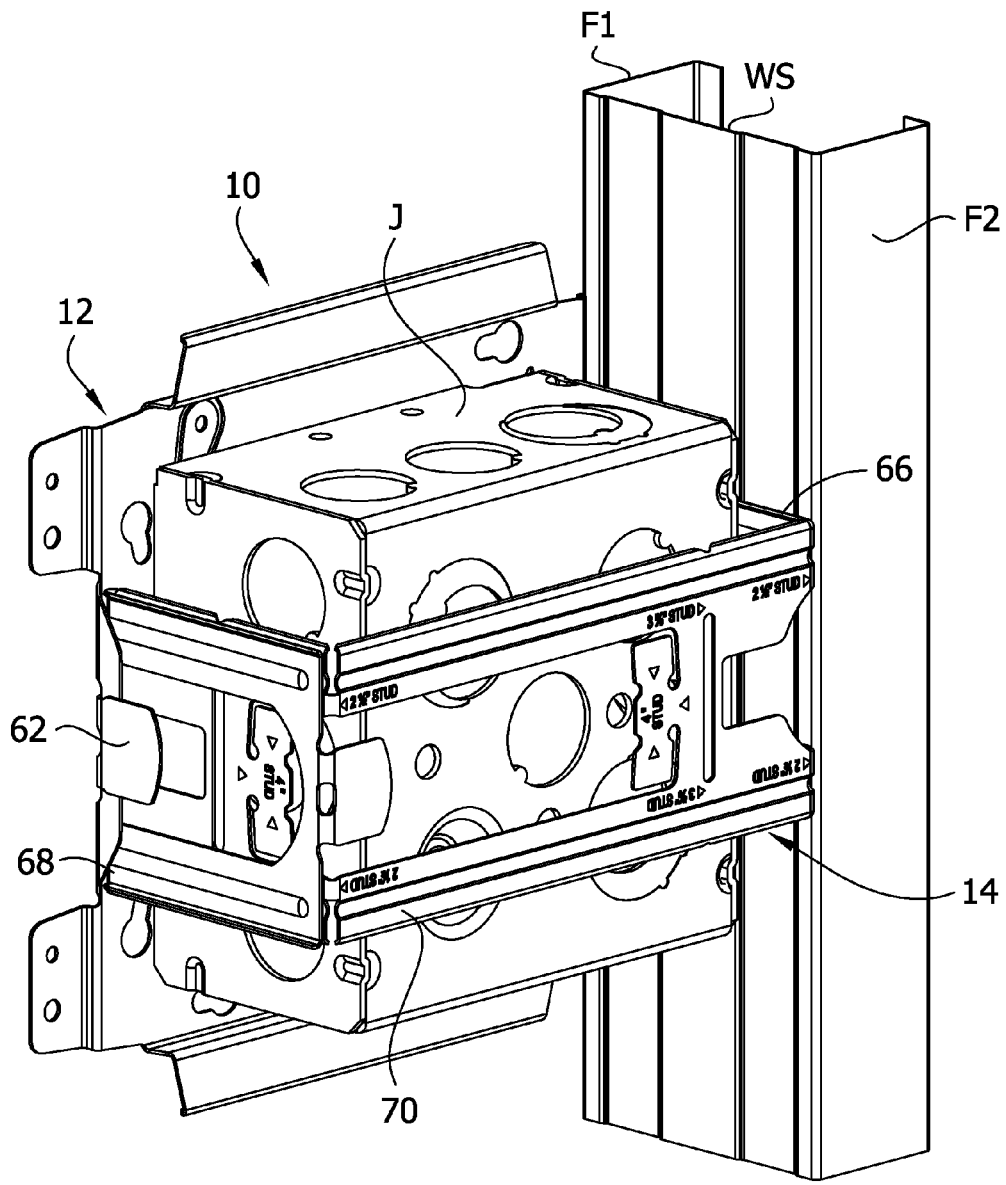
FIG. 29 is a rear perspective of the mounting bracket assembly in the third stabilizing configuration attached to the wall stud.

The stabilizing extension 14 is configurable from the initial configuration (FIGS. 1-3) to one of the plurality of stabilizing configurations by bending the stabilizing body 52 about selected bending axes 53*a*-53*f* at the respective bending areas. When the stabilizing extension 14 is in a selected stabilizing configuration (see, e.g., FIGS. 10, 15, and 27), the stabilizing body 52 defines first and second legs 66, 68 extending rearward from the face plate 12, and a leg connector 70 extending between and interconnecting the first and second legs. When the stabilizing extension 14 is in a stabilizing configuration and the mounting bracket 10 is secured to the wall stud WS (e.g., the mounting bracket is secured to the front mounting surface F1 of the wall stud WS), the stabilizing extension 14 restricts rearward deflection of the face plate 12 in the space between the two walls FW, RW secured to the stud WS, thus maintaining the face plate generally parallel to the front mounting surface of the stud and the front wall.

Figure 7:
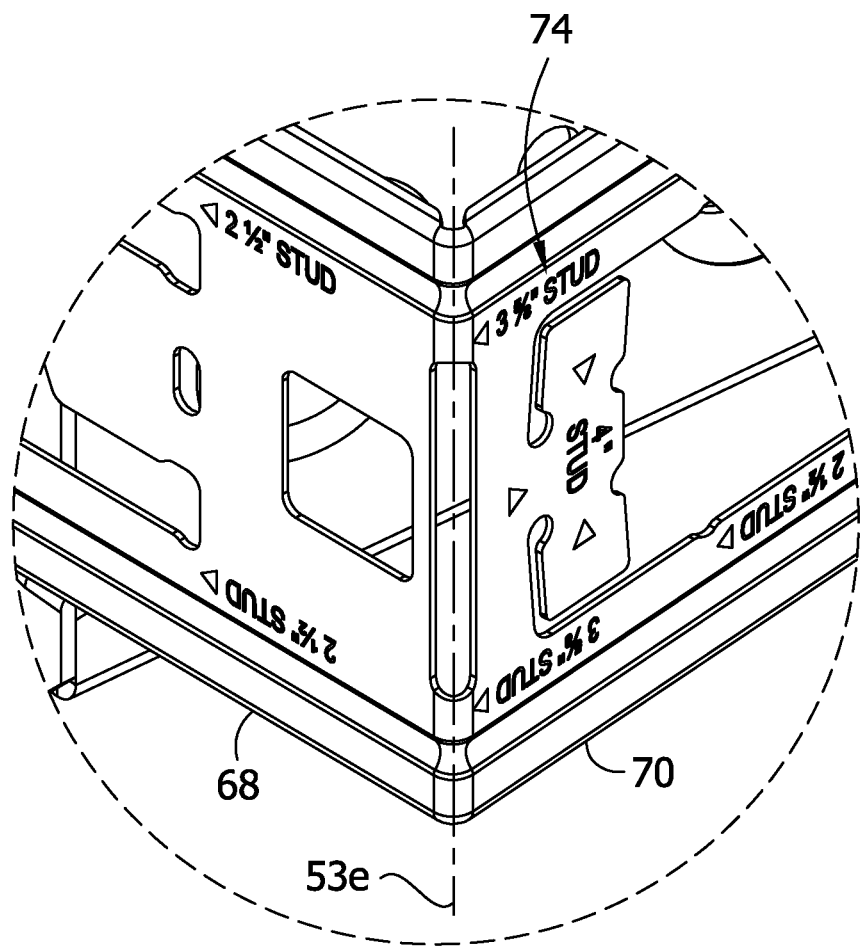
FIG. 7 is an enlarged, partial view of FIG. 6.
Figure 8:
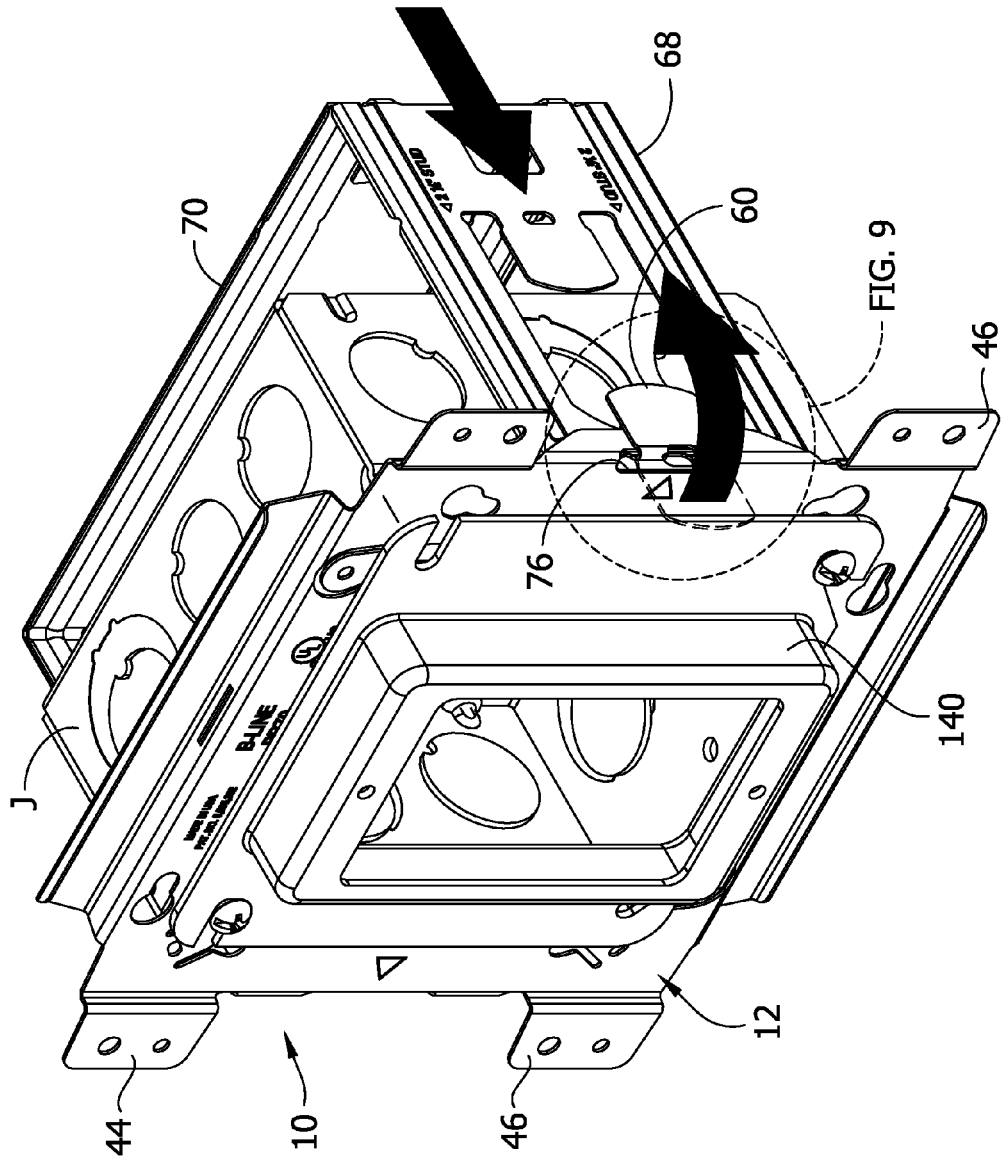
FIG. 8 is a perspective of the mounting bracket assembly of FIG. 6 with a plaster ring attached to the mounting bracket and illustrating further movement of the mounting bracket toward the first stabilizing configuration.
Figure 9:
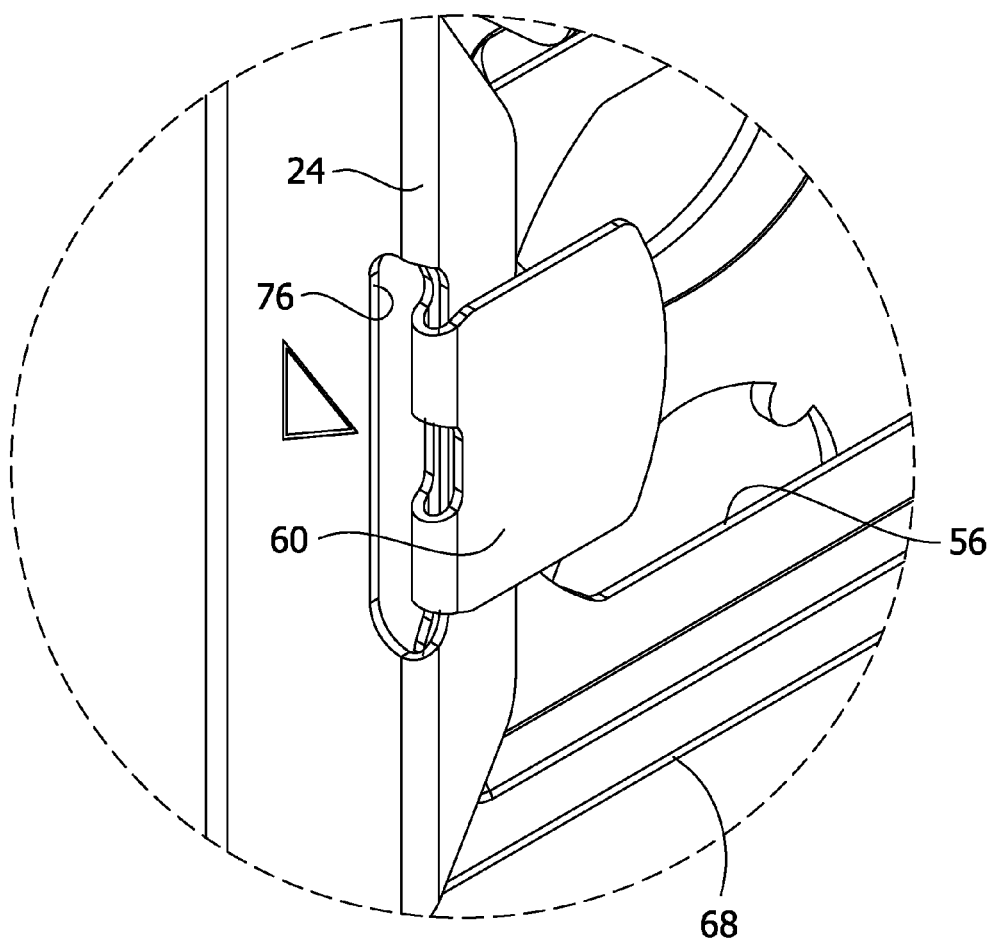
FIG. 9 is an enlarged, partial view of FIG. 8.

FIGS. 4-10 illustrate steps for configuring the stabilizing extension 14 from the initial configuration (in phantom in FIG. 4) to one embodiment of the stabilizing configuration (FIG. 10), suitable for use with a wall stud WS having a depth d of 3⅝ in. As shown in FIGS. 4 and 8, the junction box J (and a plaster ring 140) may be secured to the mounting bracket 10 before configuring the stabilizing extension 14 into one of the stabilizing configurations. An electrical or communications device (not shown) may also be secured in the junction box J. In other examples, the stabilizing extension 14 may be configured into one of the stabilizing configurations before attaching the junction box J and/or the plaster ring to the mounting bracket 10.

Figure 5:
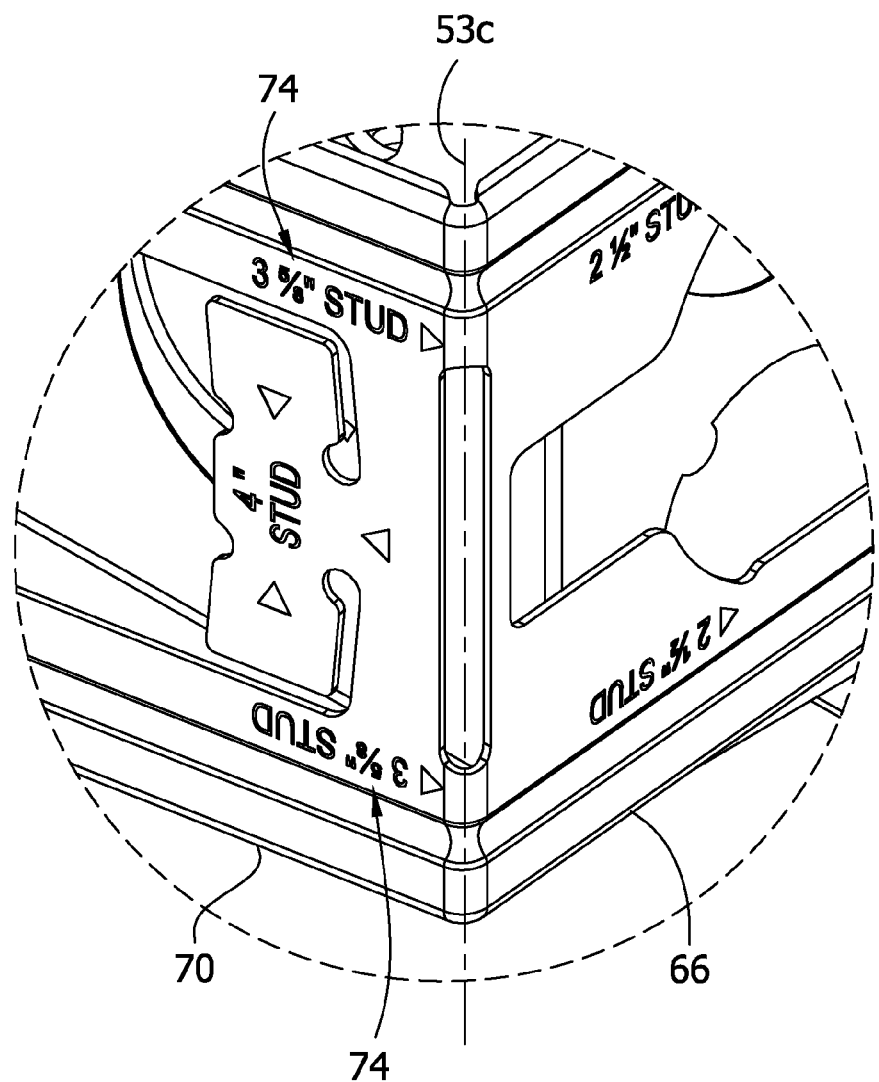
FIG. 5 is an enlarged, partial view of FIG. 4.
Figure 6:
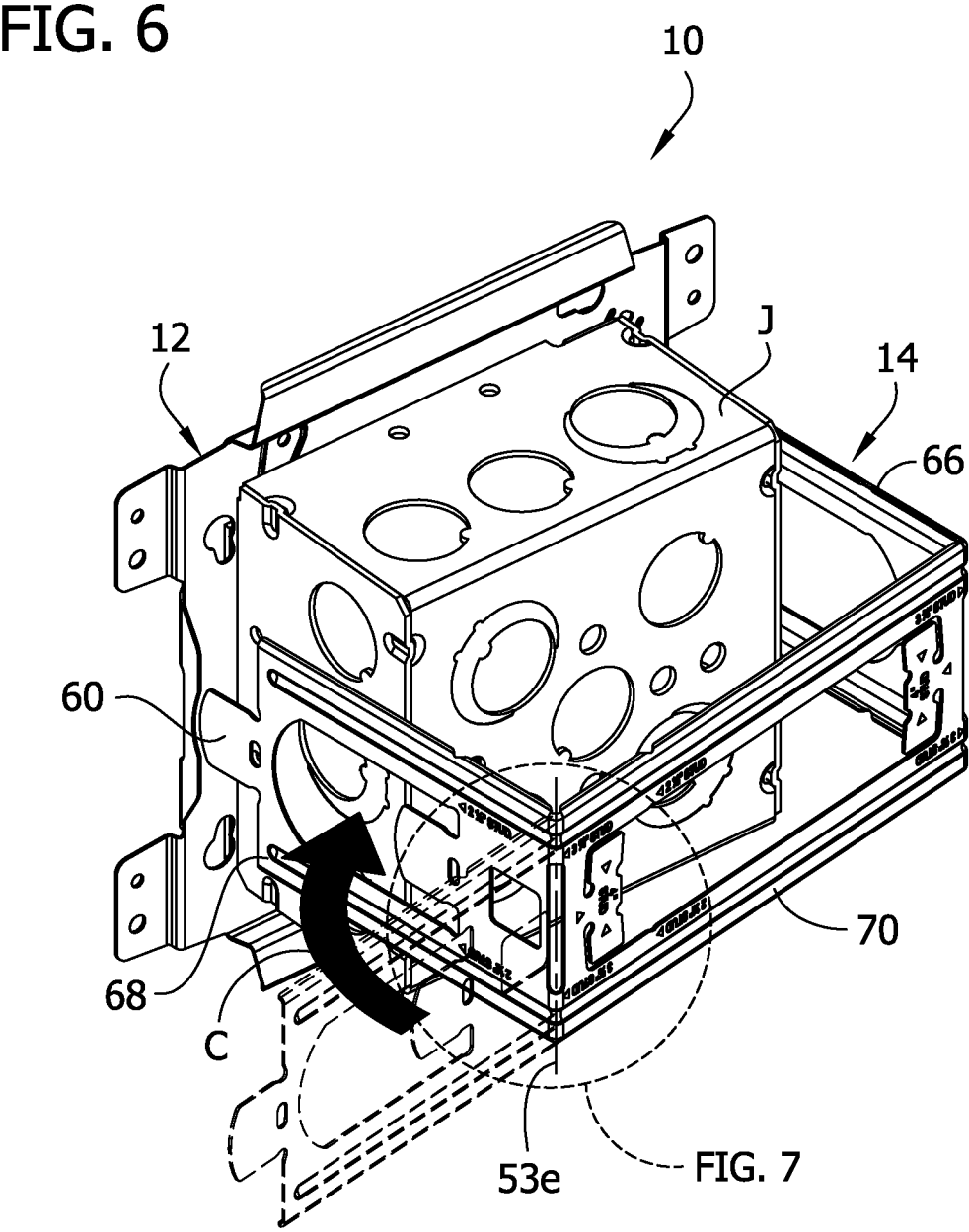
FIG. 6 is a rear perspective of the mounting bracket assembly of FIG. 4, illustrating further movement of the mounting bracket toward the first stabilizing configuration.

As Indicated by Arrow A in FIG. 4, the stabilizing body 52 is first bent rearward about the bending axis 53*a* at the left edge margin 22 of the face plate 12 such that the stabilizing body extends generally perpendicular to the face plate, thereby forming the first leg 66. The stabilizing body 52 is then bent about the bending axis 53*c* in the direction of arrow B to form the leg connector 70 extending generally perpendicular to the first leg 66 (see also FIG. 5). As indicated by arrow C in FIG. 6, the body 52 is further bent about the bending axis 53*e* to form the second leg 68 extending generally perpendicular to the leg connector 70 and parallel to the first leg 66. As seen in FIGS. 5 and 7, the bending axes 53*c*, 53*e* at the bending locations for use with a wall stud WS having a depth of 3⅝ in are marked by indicia, generally indicated at 74, including numbers corresponding to the wall stud depth and arrows pointing to the bending areas to inform a user of the proper configuration for the stabilizing extension. Finally, referring to FIGS. 8 and 9, to secure the stabilizing body 52 in the stabilizing configuration, the first locking tongue 60 is inserted through an opening 76 in the face plate 12 adjacent the right edge margin 24 and then bent back upon itself to secure the second stabilizing leg 68 to the face plate.

Figure 10:
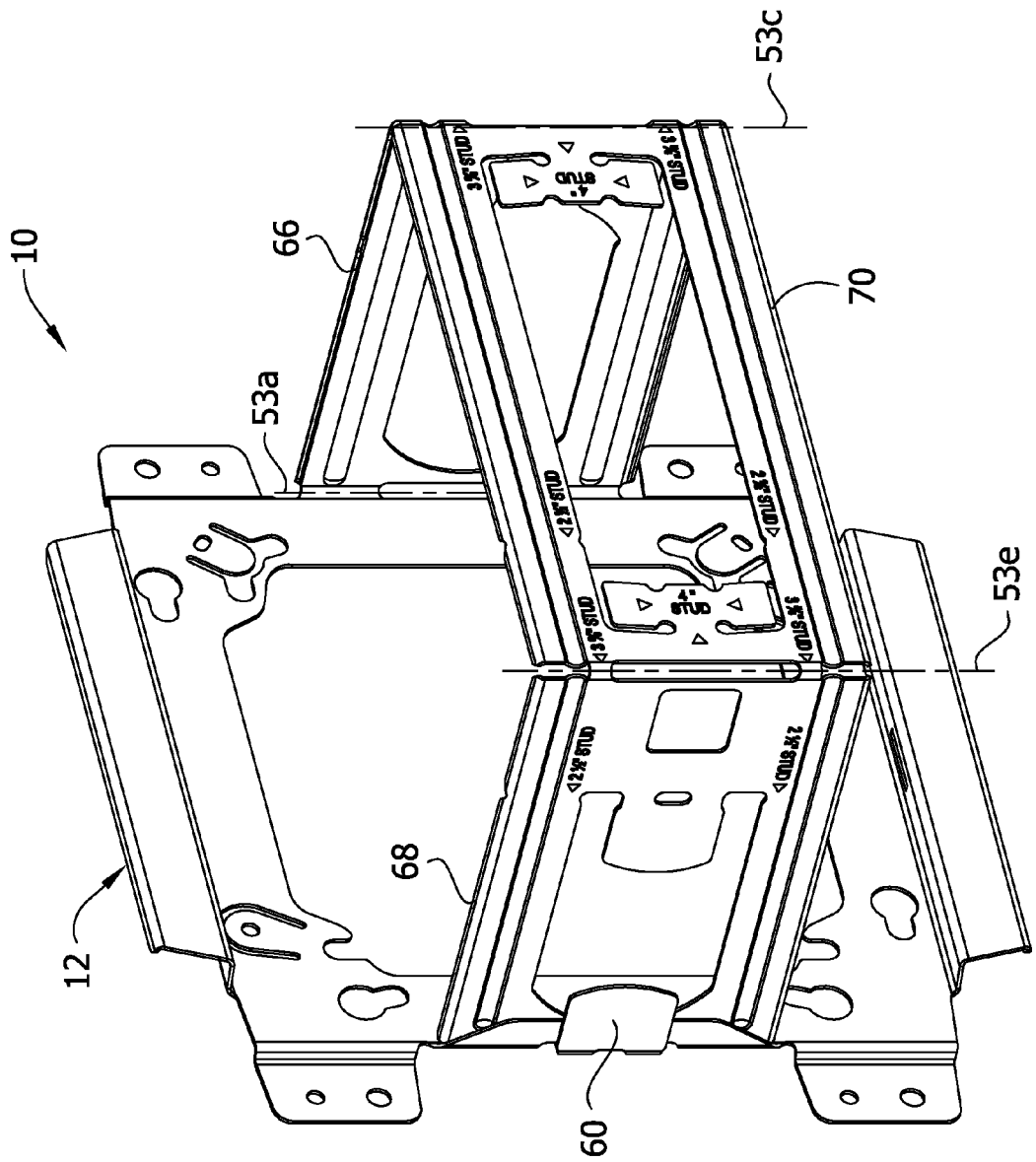
FIG. 10 is a rear perspective of the mounting bracket in the first stabilizing configuration.
Figure 10A:
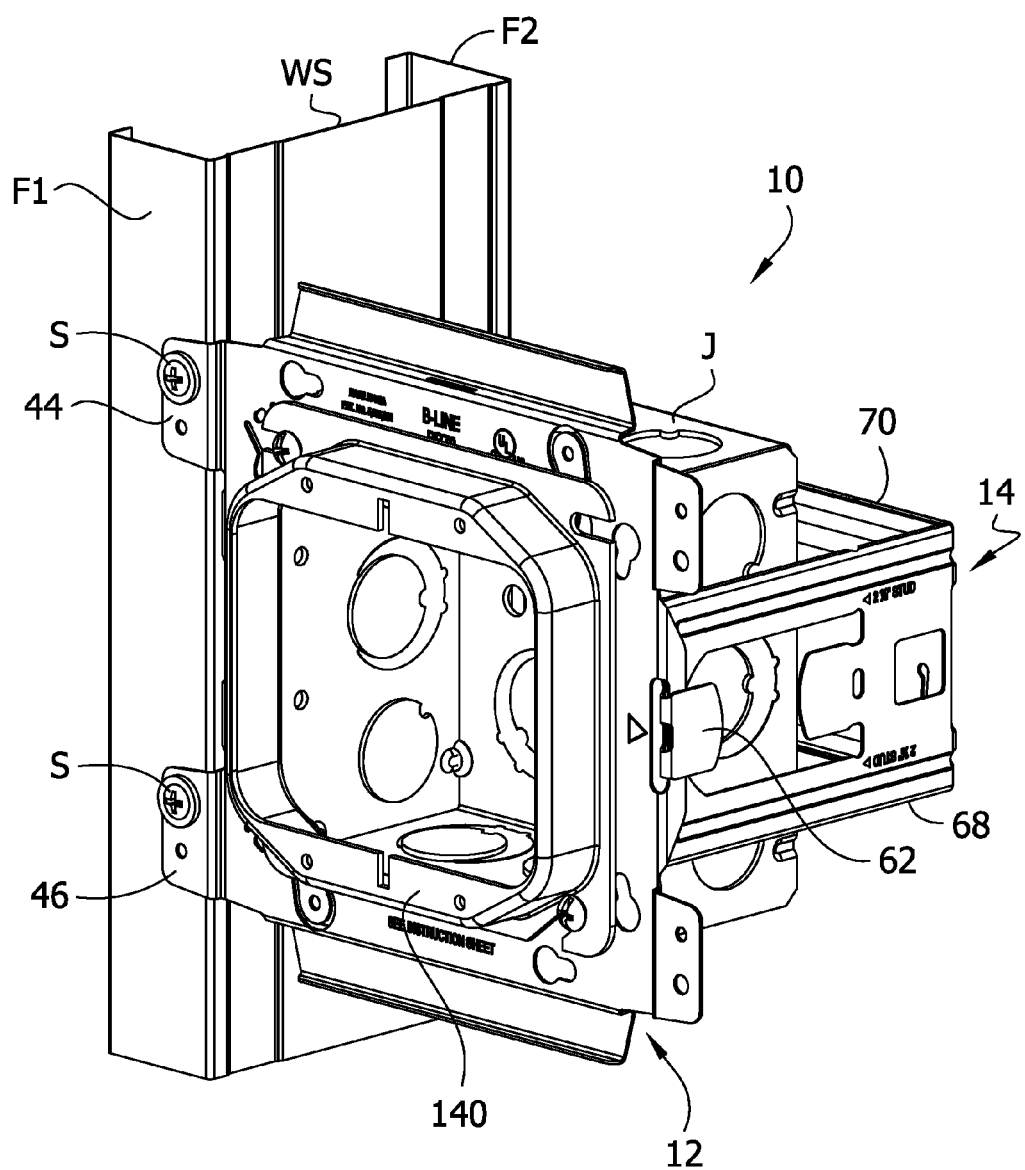
FIG. 10A is a perspective of the mounting bracket assembly in the first stabilizing configuration attached to a wall stud.
Figure 10B:
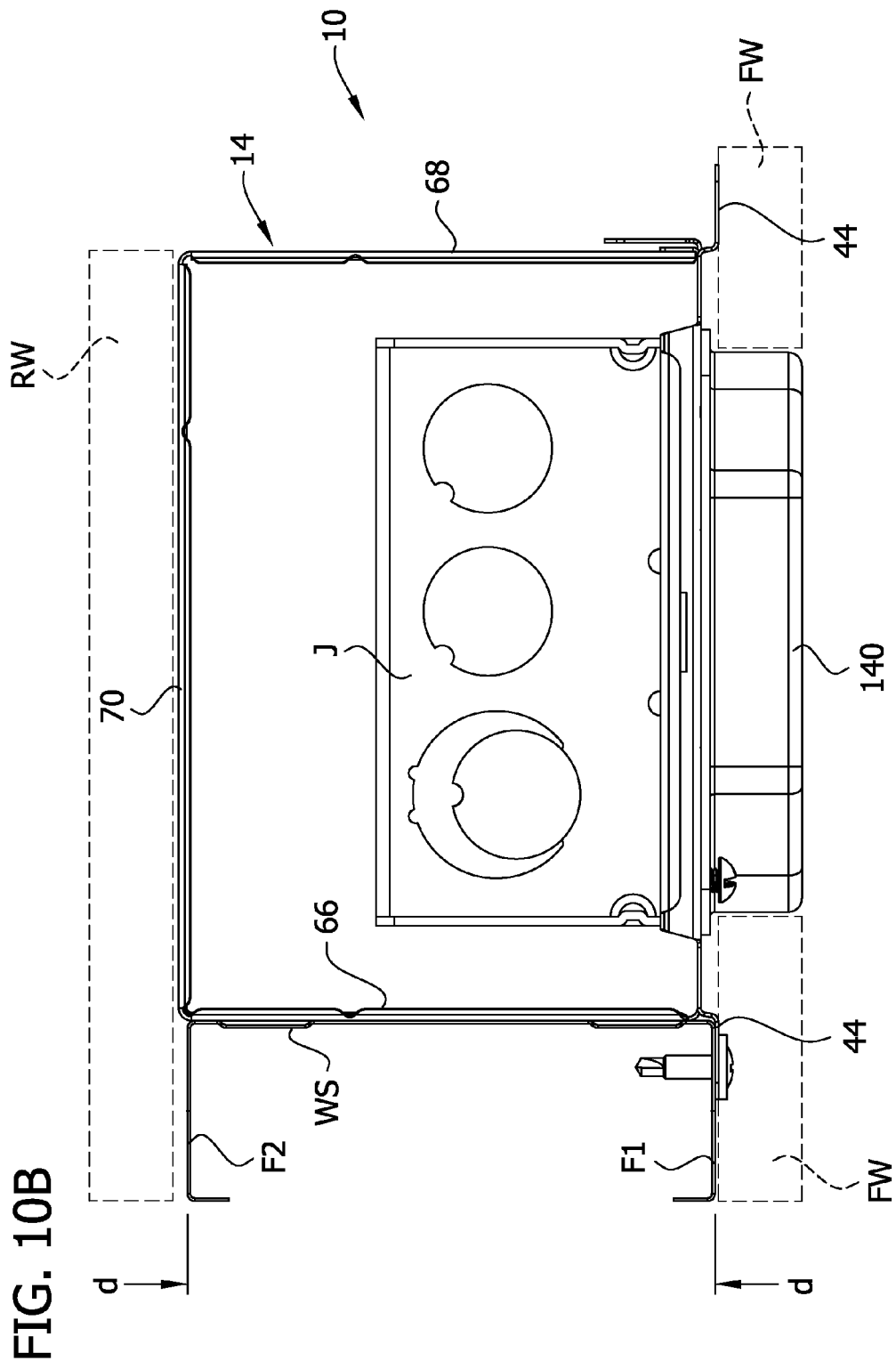
FIG. 10B is a top plan of the mounting bracket assembly in the first stabilizing configuration attached to the wall stud.
Figure 11:
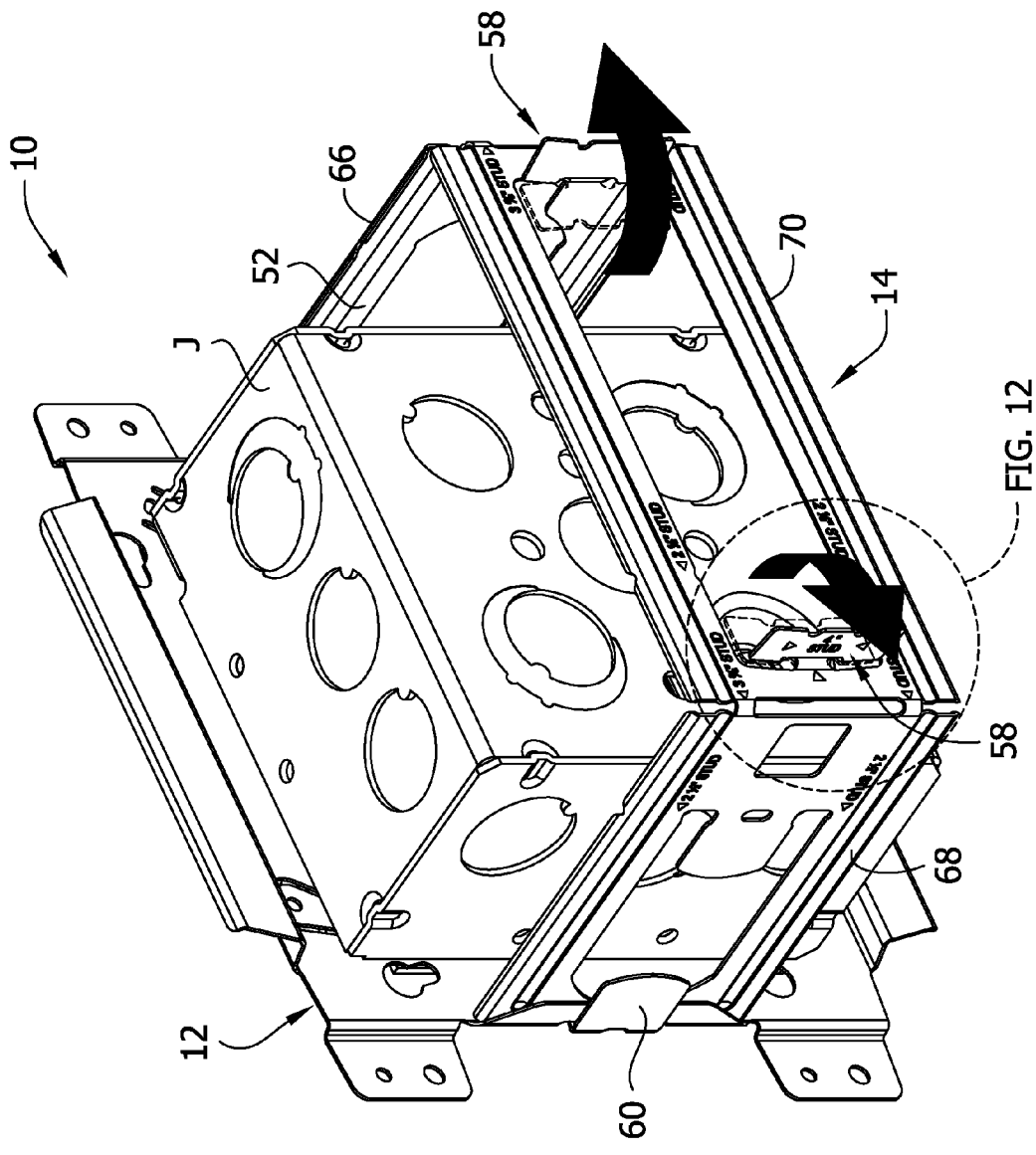
FIG. 11 is a rear perspective of the mounting bracket assembly, illustrating movement of the mounting bracket from the first stabilizing configuration to a second stabilizing configuration.

As seen in FIG. 10, when the stabilizing extension 14 is in the stabilizing configuration, the first and second legs 66, 68 extend generally perpendicular to the face plate 12 and the leg connector 70 extends generally parallel to the face plate, between and interconnecting the first and second legs. Accordingly, the first and second legs 66, 68 and the leg connector 70 and the face plate 12 are interconnected as a unit. When the stabilizing extension 14 is in the stabilizing configuration and the bracket 10 is installed on the wall stud WS, the legs 66, 68 are substantially co-extensive with the depth d of the wall stud, and the leg connector generally opposes the rear wall RW secured to the wall stud. (The leg connector may extend slightly beyond the rear mounting face F2 of the wall stud WS or slightly in front of the rear mounting face of the wall stud.) The leg connector 70 is generally rigid along its length such that it provides additional support to the generally rigid first and second legs 66, 68 to maintain the first and second legs extending rearward from and generally perpendicular to the face plate 12, which in turn, inhibits movement of the mounting bracket 10 rearward away from the front wall FW. The ribs 54 on the stabilizing body 52 provide rigidity to the legs 66, 68 and the leg connector 70 to inhibit bending along their respective lengths.

Because the legs 66, 68 are connected to the face plate 12 and connected to one another by the leg connector 70, if one of the legs moves relative to the face plate (e.g., horizontally to the left or right of the face plate), the other leg will move as well. That is, the legs 66, 68 and the leg connector 70 move relative to the face plate 12 as a unit. In particular, in this illustrated embodiment the legs 66, 68, leg connector 70 and face plate 12 function as a four bar linkage (e.g., parallelogram linkage) such that the leg connector is maintained generally parallel to the face plate (and parallel to the rear mounting face F2 of the wall stud WS when installed) during horizontal movement of the legs. Thus, when installed the leg opposite the attached side of the mounting bracket 10 (e.g., the right leg 68 in FIG. 10B) is inhibited from moving toward the wall stud WS because the leg on the attached side of the bracket (e.g., the left leg 66) is inhibited from moving toward the wall stud because it abuts the wall stud. Moreover, each of the legs 66, 68 can move only a limited horizontal distance away from the wall stud WS before the leg on the attached side (e.g., the left leg 66 in FIG. 10B) contacts the junction box J, thereby preventing additional movement of the leg opposite the attached side of the bracket (e.g., the right leg 68).

Figure 12:
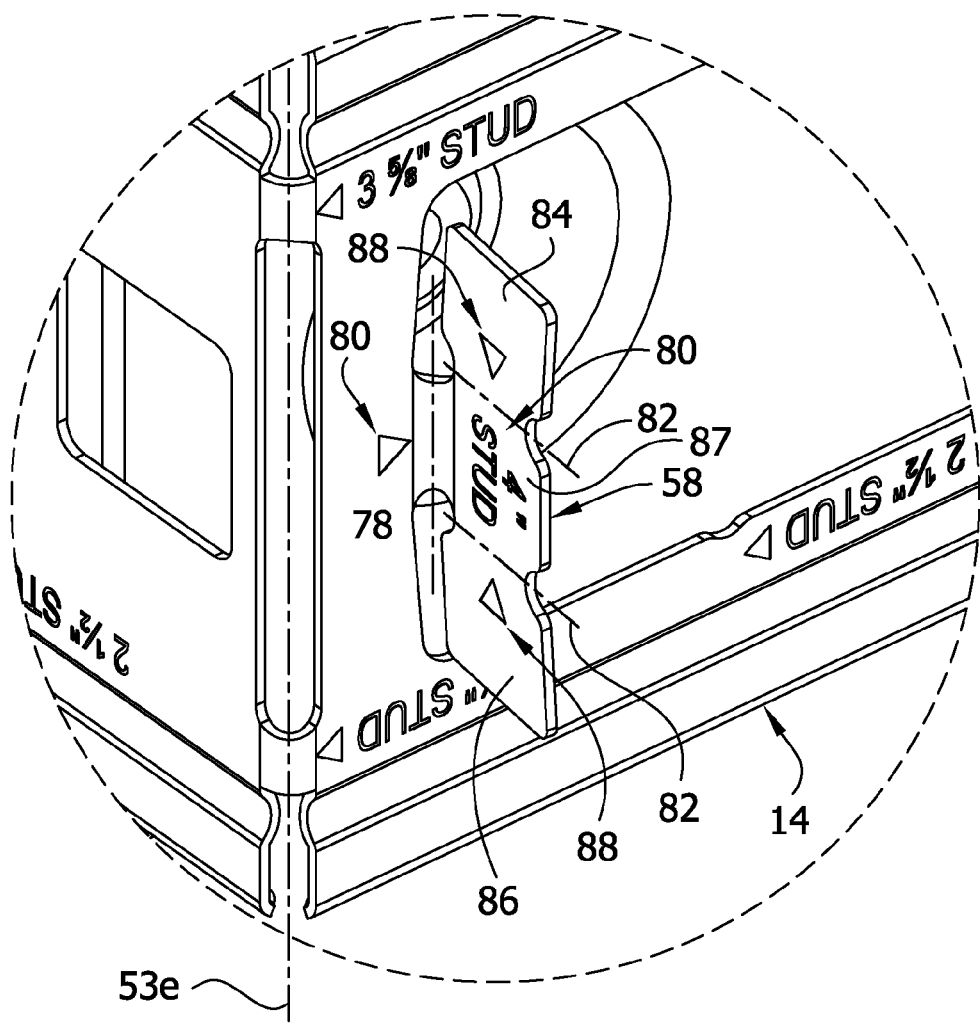
FIG. 12 is an enlarged, partial view of FIG. 11.
Figure 13:
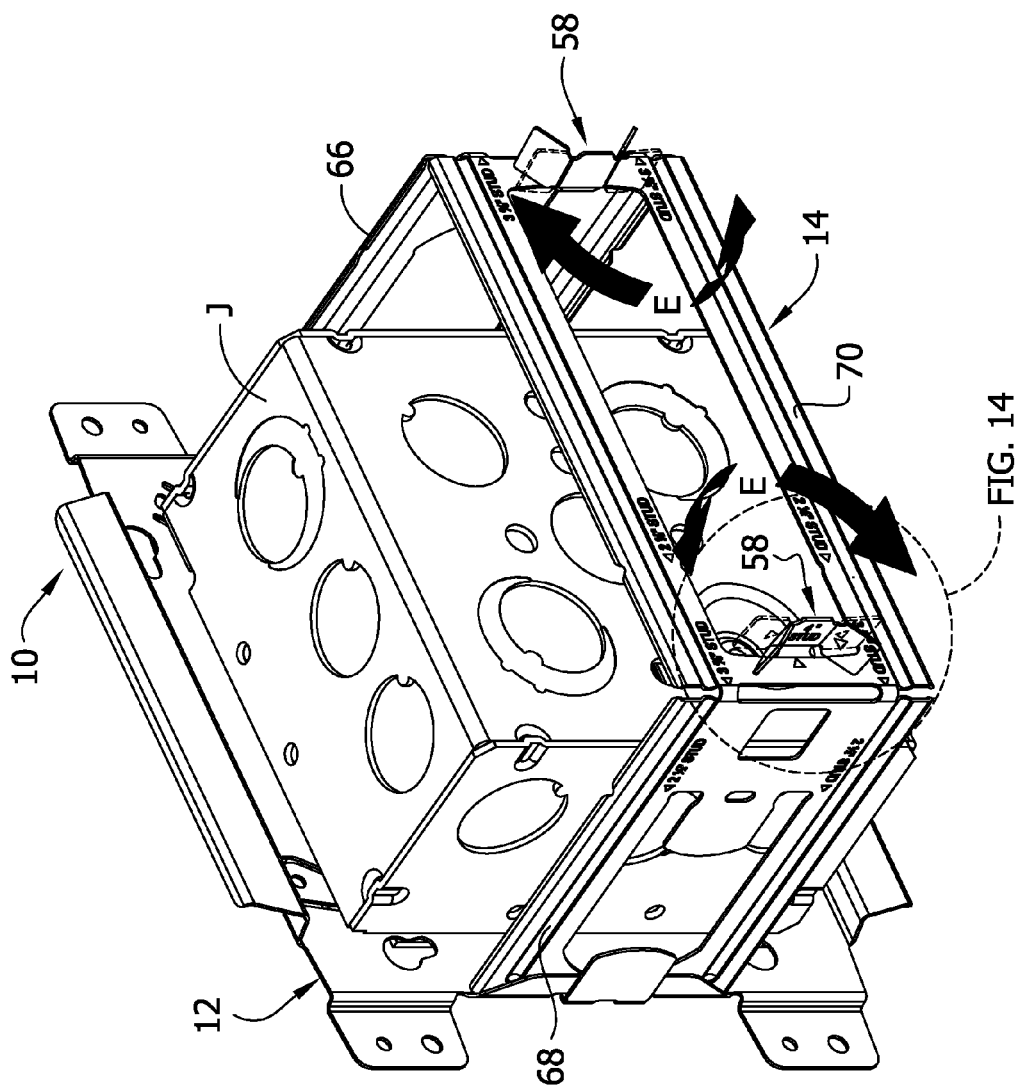
FIG. 13 is a rear perspective of the mounting bracket assembly, illustrating further movement of the mounting bracket from the first stabilizing configuration to the second stabilizing configuration.
Figure 14:
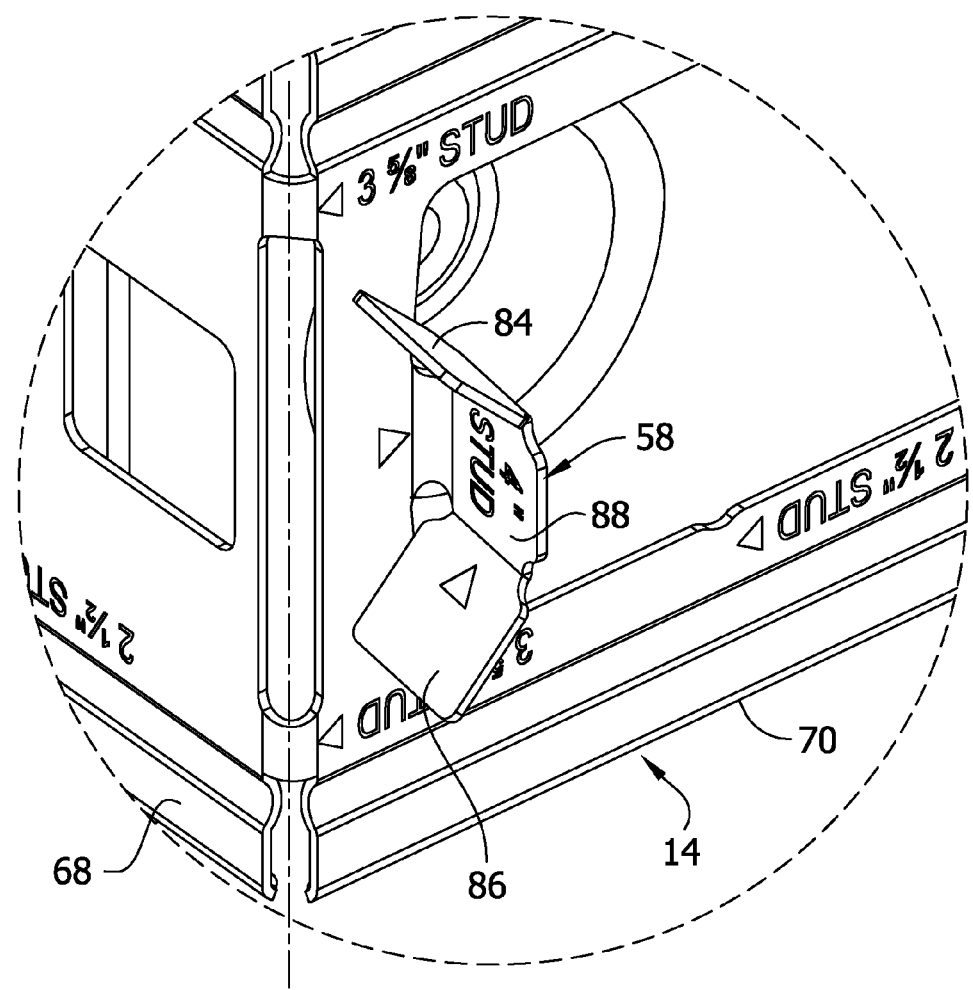
FIG. 14 is an enlarged, partial view of FIG. 13.

FIGS. 11-18 illustrate another stabilizing configuration of the stabilizing extension 14. The stabilizing body 52 is folded as described above with reference to FIGS. 4-10 for mounting the mounting bracket 10 on the wall stud WS having a depth d of 3⅝ in. Next, the extension tabs 58 are bent in the direction of arrows D along imaginary bending axes 78 (see FIG. 12) at bending areas to extend the depth of the stabilizing bracket and make it suitable for use with a wall stud WS having a depth d of 4 in. As shown in FIG. 12, extension tabs 58 and/or the stabilizing body 52 are preferably marked with indicia, generally indicated at 80, such as arrows pointing to the bending axes 78 and numbers identifying the use of the tabs for a wall stud having a depth of 4 in. As illustrated in FIGS. 13 and 14, upper and lower portions 84, 86 of each extension tab 58 are then bent about imaginary bending axes 82 toward a center portion 87 of the tab in the direction of arrow E to form upper and lower wings. As shown in FIG. 12, the extension tabs 58 preferably also include indicia such as arrows, generally indicated at 88, pointing to the bending axes 82 to indicate to a user that the tabs should be bent as illustrated in FIG. 14.

Figure 18:
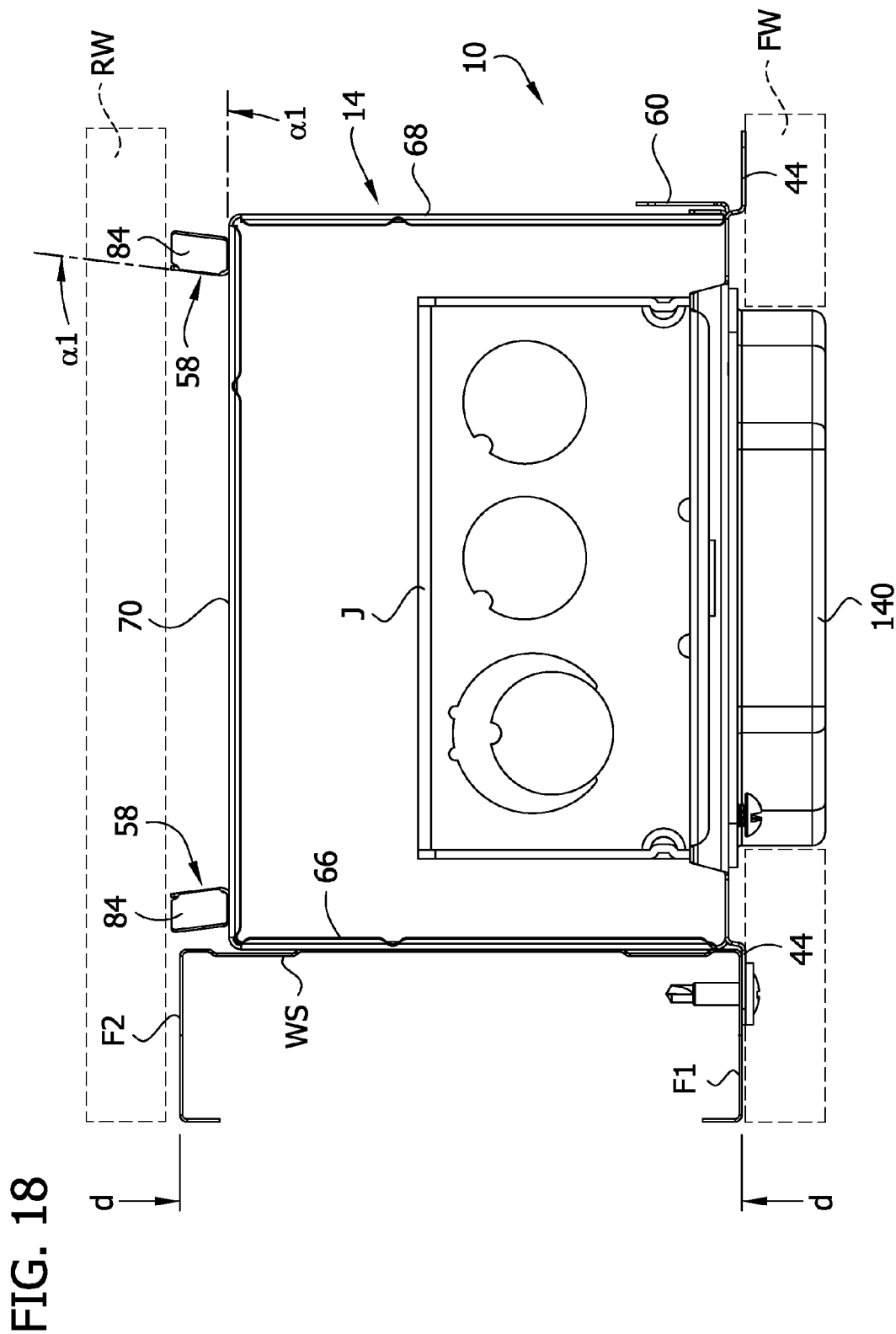
FIG. 18 is a top plan of the mounting bracket assembly in the second stabilizing configuration attached to the wall stud.

As shown in FIG. 18, in this illustrated stabilizing configuration, the stabilizing extension 14, which includes the extension tabs 58, is substantially co-extensive with the depth d of the wall stud WS (FIG. 18). Each extension tab 58 is configured such that the center portion 87 of the tab extends at an acute angle a1 relative to leg connector and 70 the upper and lower wings 84, 86 extend outward from the center portion toward the adjacent leg 66, 68 such that the wings overlie a portion of the leg connector. Thus, as can be understood from FIG. 18, if a rearward force is applied to the face plate 12 of the bracket 10, the force applied to the extension tabs 58, through their engagement with the rear wall RW, will be a rotational force urging the tab to rotate about the bending axis 78 toward the adjacent leg 66, 68. Because the wings 84, 86 overlie a portion of the leg connector 70, the wings will engage the leg connector when rotated toward the respective adjacent legs 66, 68, thereby inhibiting or restricting the rotational displacement of the extension tabs 58 to maintain the extension tabs in their stabilizing configurations.

FIGS. 19-30 illustrate steps for configuring the stabilizing extension 14 from the initial configuration to another embodiment of the stabilizing configuration (FIG. 27), suitable for use with a wall stud WS having a depth d of 2½ in. As indicated by arrow F in FIG. 19, the stabilizing body 52 is first bent rearward about the bending axis 53*a* at the left edge margin 22 of the face plate 12 (see FIG. 2) such that the stabilizing extension 14 extends generally perpendicular to the face plate, thereby forming the first leg 66. The body 52 is then bent about the bending axis 53*b* in the direction of arrow G to form the leg connector 70 extending generally perpendicular to the first leg 66. The first leg 66 of the stabilizing body 52 in this stabilizing configuration is shorter than the first leg of the stabilizing configuration of FIGS. 4-10. Thus, the bending axis 53*b* is closer to the left edge margin 22 than the bending axis 53*c* for the first stabilizing configuration shown in FIGS. 4-10.

Figure 19:
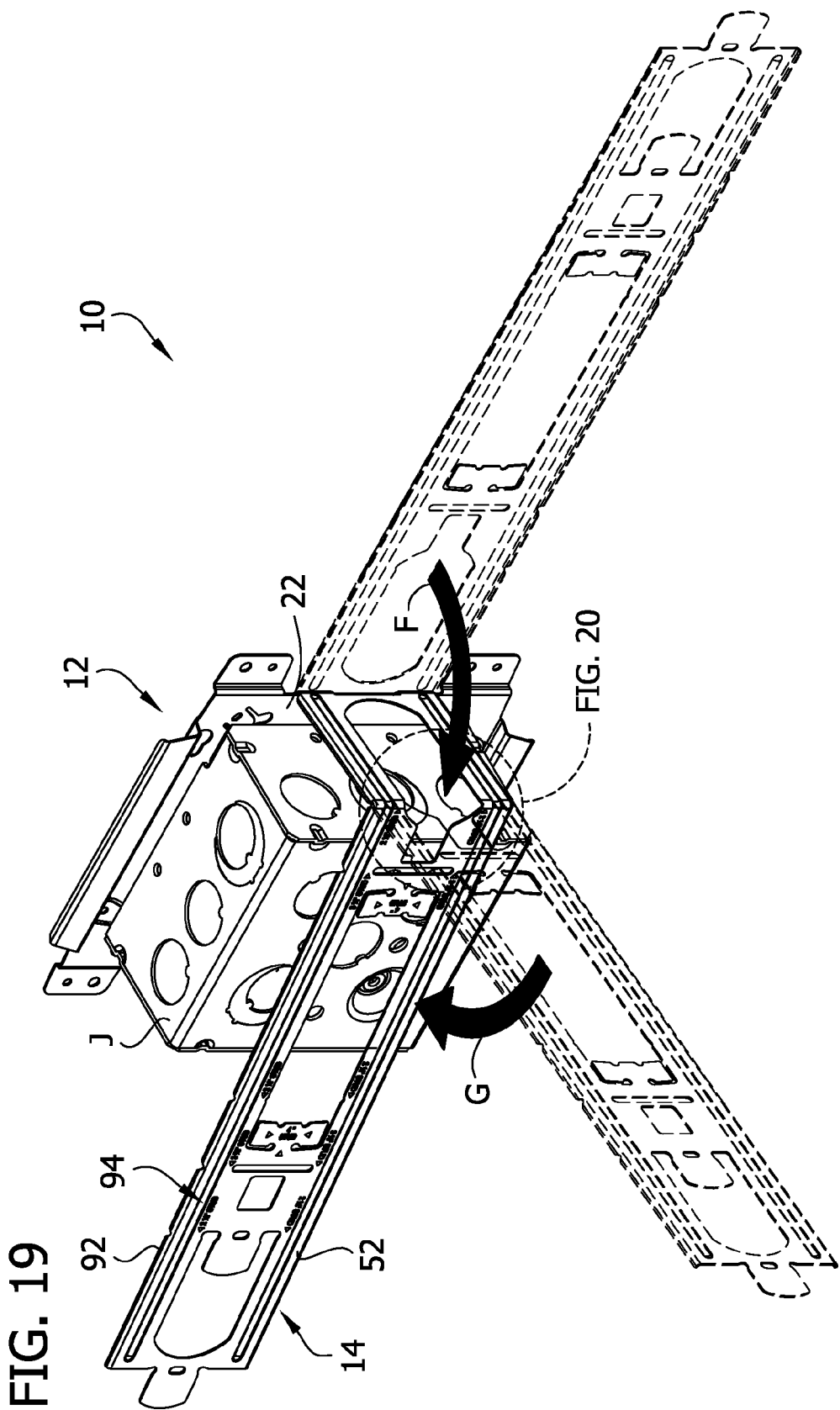
FIG. 19 is a rear perspective of the mounting bracket assembly, illustrating movement of the mounting bracket from the initial configuration to a third stabilizing configuration.
Figure 20:
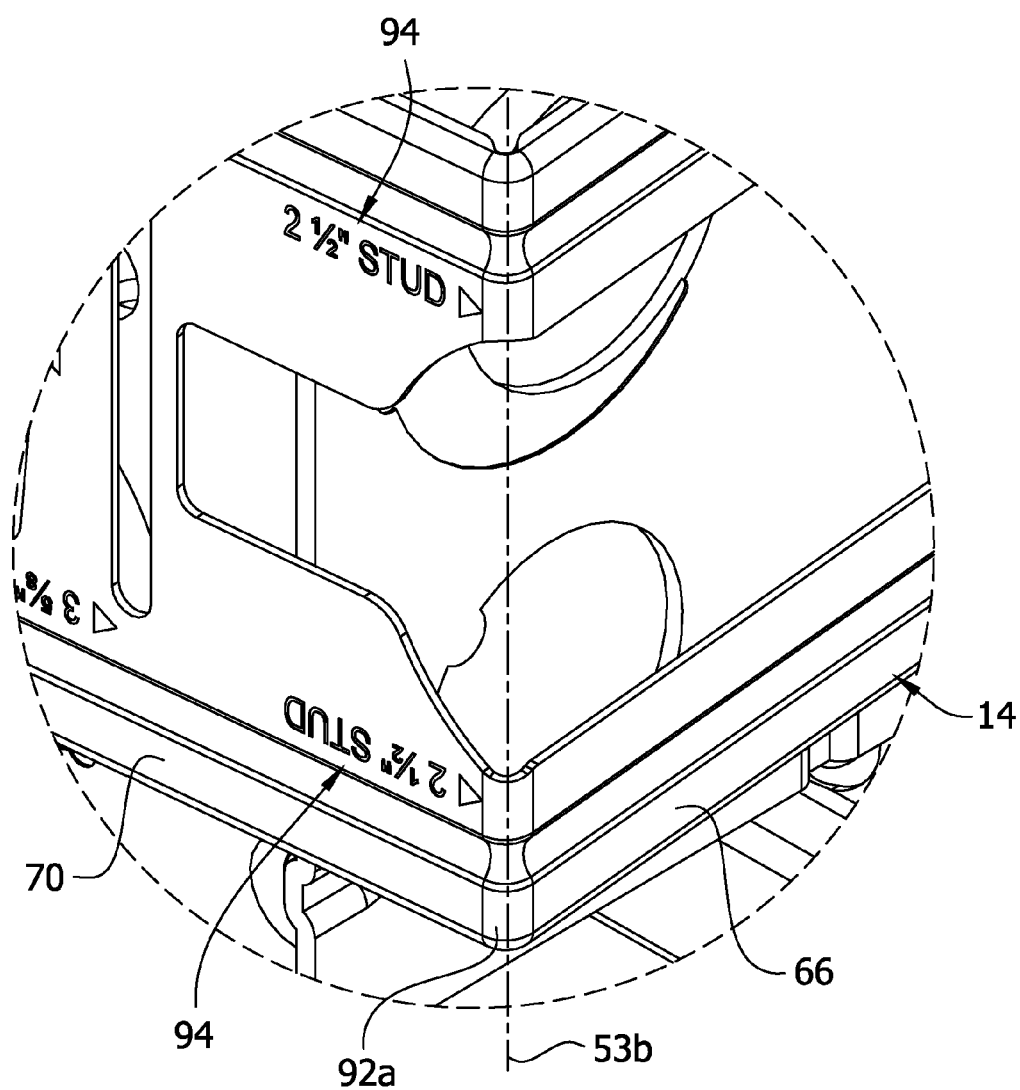
FIG. 20 is an enlarged, partial view of FIG. 19.
Figure 21:
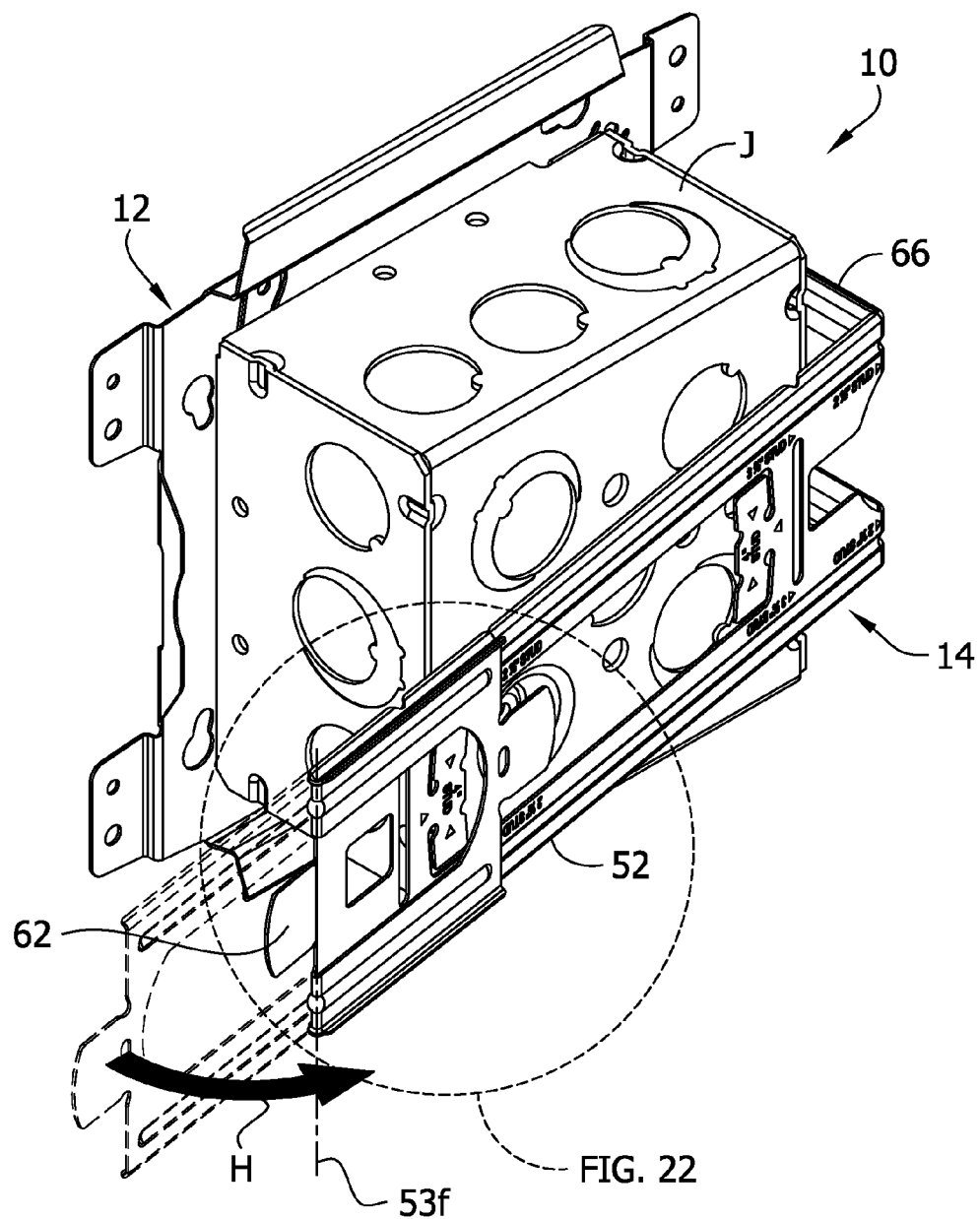
FIG. 21 is a rear perspective of the mounting bracket assembly, illustrating further movement of the mounting bracket toward the third stabilizing configuration.
Figure 22:
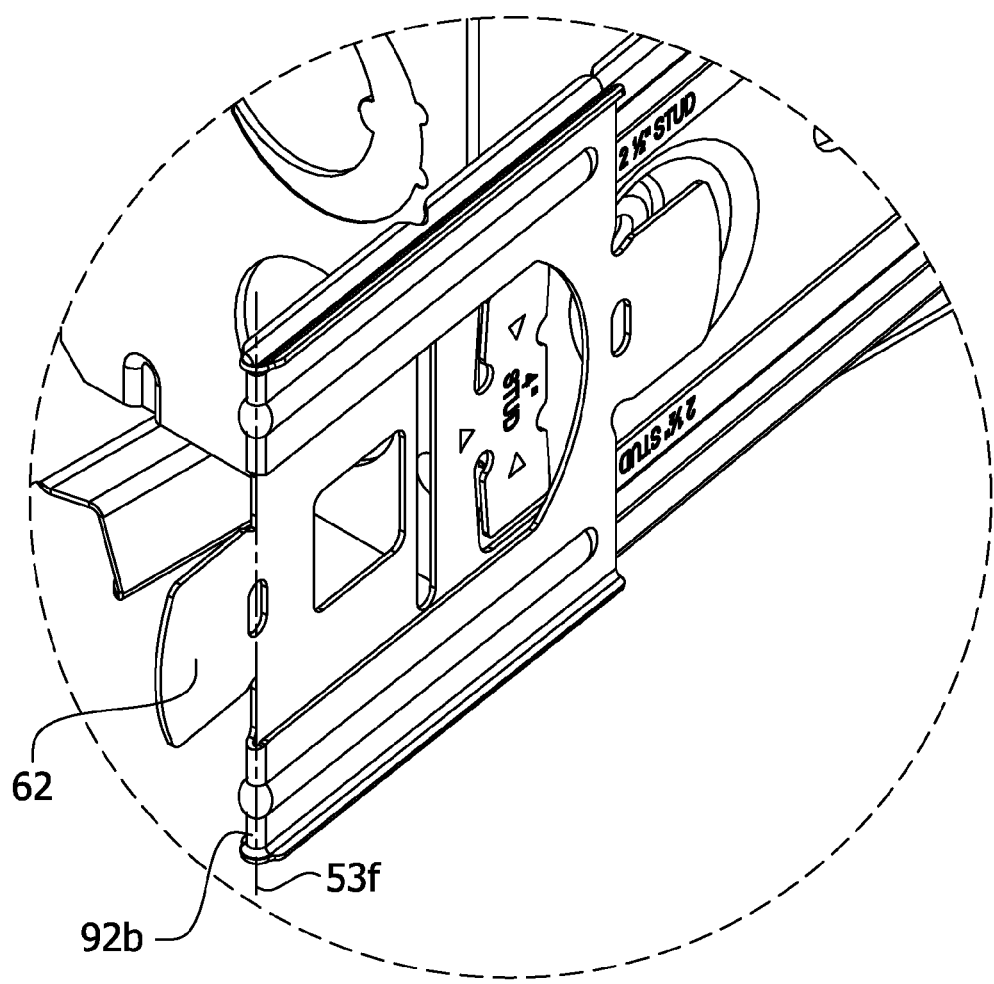
FIG. 22 is an enlarged, partial view of FIG. 21.
Figure 23:
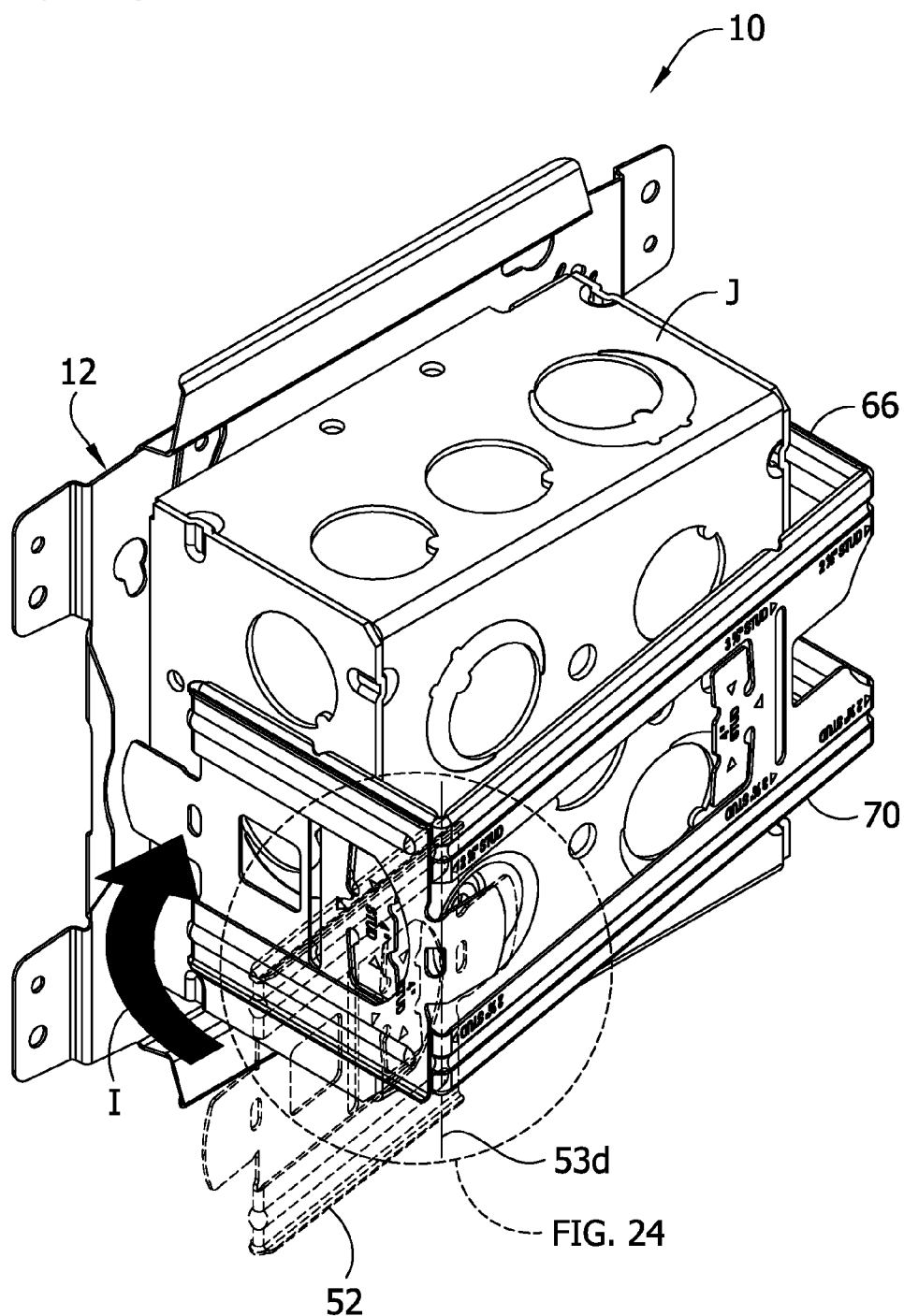
FIG. 23 is a rear perspective of the mounting bracket assembly, illustrating further movement of the mounting bracket toward the third stabilizing configuration.
Figure 24:
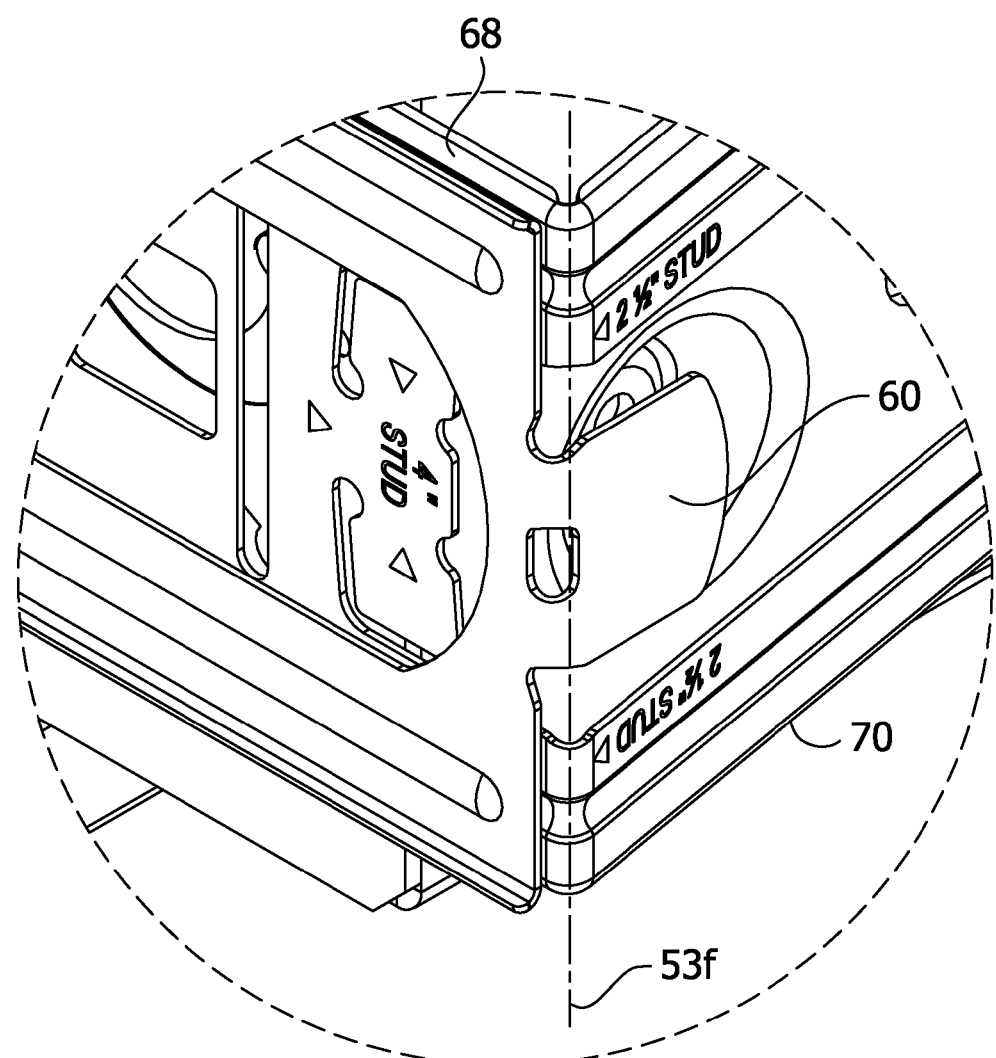
FIG. 24 is an enlarged, partial view of FIG. 23.
Figure 25:
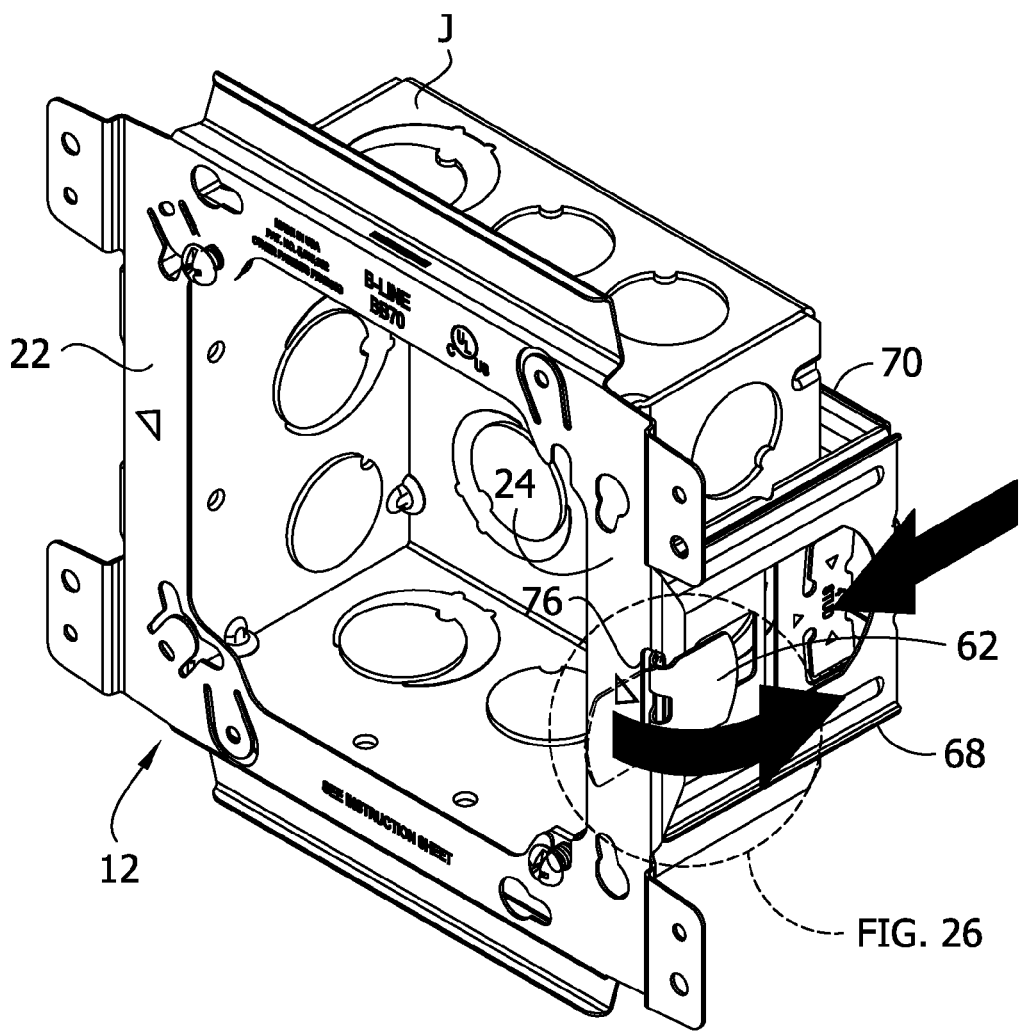
FIG. 25 is a perspective of the mounting bracket assembly, illustrating further movement of the mounting bracket toward the third stabilizing configuration.
Figure 26:
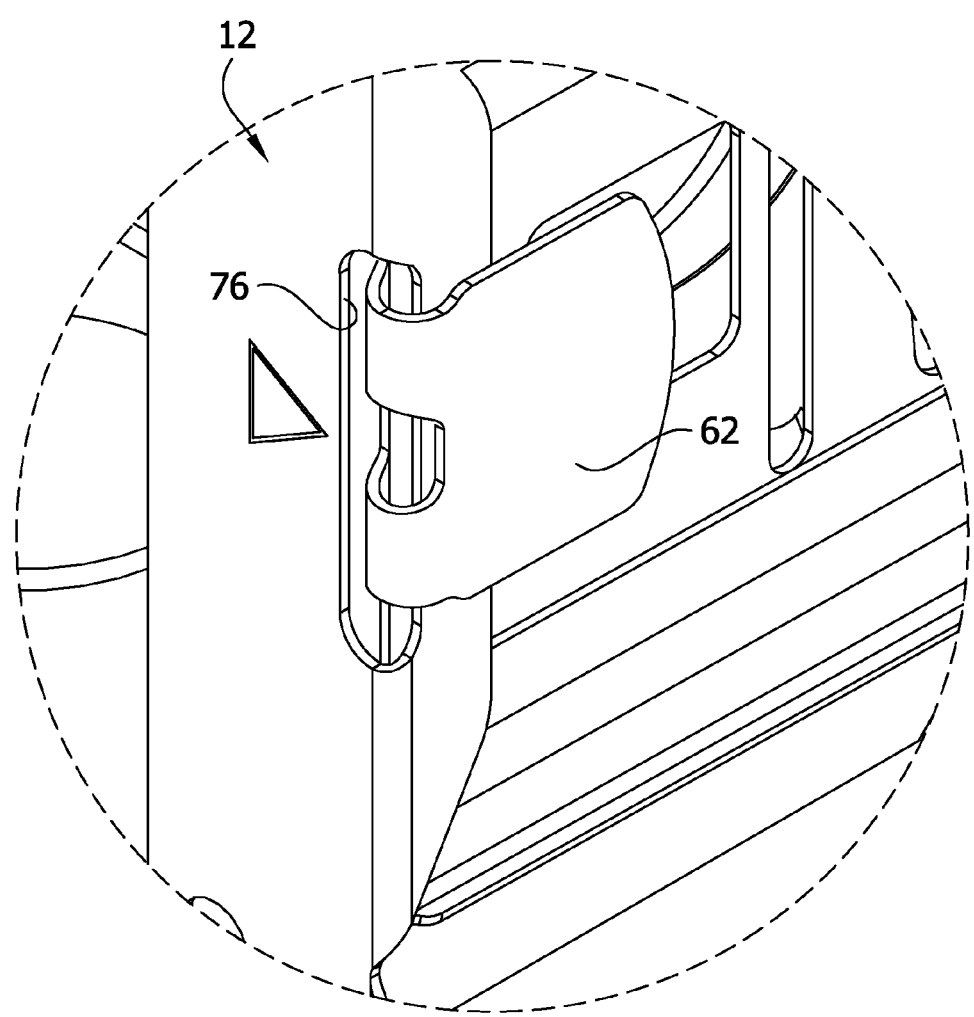
FIG. 26 is an enlarged, partial view of FIG. 25.

Referring to FIGS. 21 and 22, because the lengths of the legs 66, 68 in this embodiment are less than the lengths of the legs of the embodiment of FIGS. 4-10 described above, the body 52 is bent about bending axis 53*f* in the direction of arrow H (FIG. 21) to bend a portion of the body 52 that is unused in this stabilizing configuration back on itself. On other words, bending at the bending axis 53*f* shortens the second leg 68 that ultimately forms for the stabilizing configuration. Bending about bending axis 53*f* also exposes the locking tongue 62. As indicated by arrow I in FIG. 23, the body 52 is further bent about the bending axis 53*d* to form the second leg 68 extending generally perpendicular to the leg connector 70. As seen in FIGS. 2, 19 and 20, the bending axes 53*b*, 53*d*, 53*f* for use with a wall stud WS having a depth of 2½ in are marked by indicia 94 including numbers corresponding to the wall stud depth and arrows pointing to the respective bending areas to inform a user of the proper configuration for the stabilizing extension 14. As seen in FIG. 24, the portion of the body 52 bent back on itself generally extends along the second leg 68 and the first locking tongue 60 (which in this embodiment is not used to secure the stabilizing body) is bent to extend along and generally parallel to the leg connector 70. Finally, referring to FIGS. 25 and 26, to secure the stabilizing body 52 in the stabilizing configuration, the second locking tongue 62 is inserted through the opening 76 in the face plate 12 adjacent the right edge margin 24 and then bent back upon itself to secure the second stabilizing leg 68 to the face plate.

Figure 30:
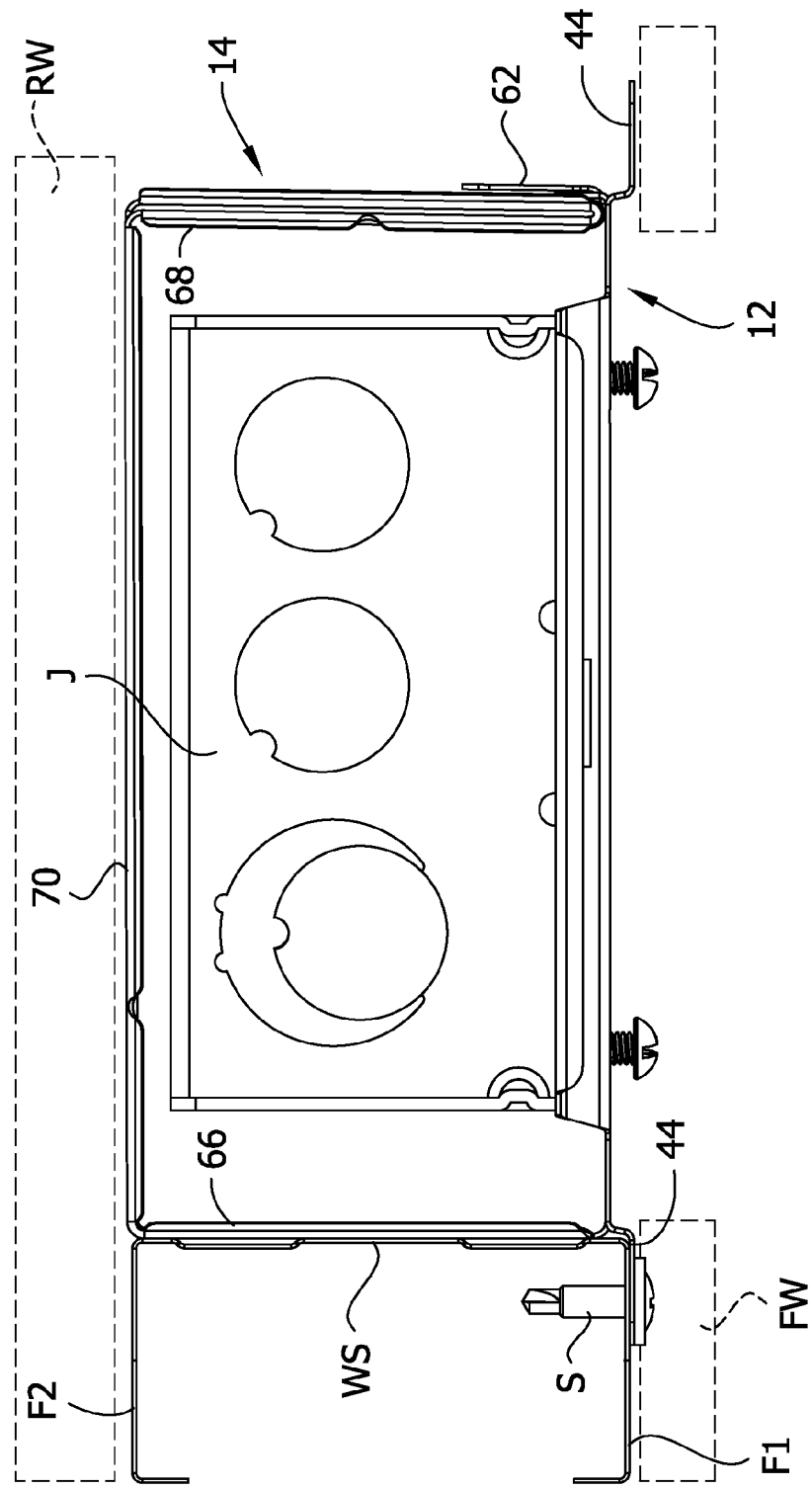
FIG. 30 is a top plan of the mounting bracket assembly in the third stabilizing configuration attached to the wall stud.

As seen in FIG. 30, when the stabilizing extension 14 is in the stabilizing configuration for the wall stud WS having a depth d of 2½ in, it functions similar to when the stabilizing extension is in the stabilizing configuration for the wall stud WS having a depth of 3⅝ in. In particular, the first and second legs 66, 68 extend generally perpendicular to the face plate 12 and the leg connector 70 extends generally parallel to the face plate, between and interconnecting the first and second legs. Accordingly, the first and second legs 66, 68 and the leg connector 70 and the face plate 12 are interconnected as a unit. When the stabilizing extension 14 is in the stabilizing configuration and the bracket 10 is installed on the wall stud WS, the legs 66, 68 are substantially co-extensive with the depth d of the wall stud, and the leg connector generally opposes the rear wall RW secured to the wall stud. (The leg connector may extend slightly beyond the rear mounting face F2 of the wall stud WS or slightly in front of the rear mounting face of the wall stud.) The leg connector 70 is generally rigid along its length such that it provides additional support to the generally rigid first and second legs 66, 68 to maintain the first and second legs extending rearward from and generally perpendicular to the face plate 12, which in turn, inhibits movement of the mounting bracket 10 rearward away from the front wall FW. The ribs 54 on the stabilizing body 52 provide rigidity to the legs 66, 68 and the leg connector 70 to inhibit bending along their respective lengths.

Because the legs 66, 68 are connected to the face plate 12 and connected to one another by the leg connector 70, if one of the legs moves relative to the face plate (e.g., horizontally to the left or right of the face plate), the other leg will move as well. That is, the legs 66, 68 and the leg connector 70 move relative to the face plate 12 as a unit. In particular, in this illustrated embodiment the legs 66, 68, leg connector 70 and face plate 12 function as a four bar linkage (e.g., parallelogram linkage) such that the leg connector is maintained generally parallel to the face plate (and parallel to the rear mounting face F2 of the wall stud WS when installed) during horizontal movement of the legs. Thus, when installed the leg opposite the attached side of the mounting bracket 10 (e.g., the right leg 68 in FIG. 30) is inhibited from moving toward the wall stud WS because the leg on the attached side of the bracket (e.g., the left leg 66) is inhibited from moving toward the wall stud because it abuts the wall stud. Moreover, each of the legs 66, 68 can move only a limited horizontal distance away from the wall stud WS before the leg on the attached side (e.g., the left leg 66 in FIG. 30) contacts the junction box J, thereby preventing additional movement of the leg opposite the attached side of the bracket (e.g., the right leg 68).

Figure 31:
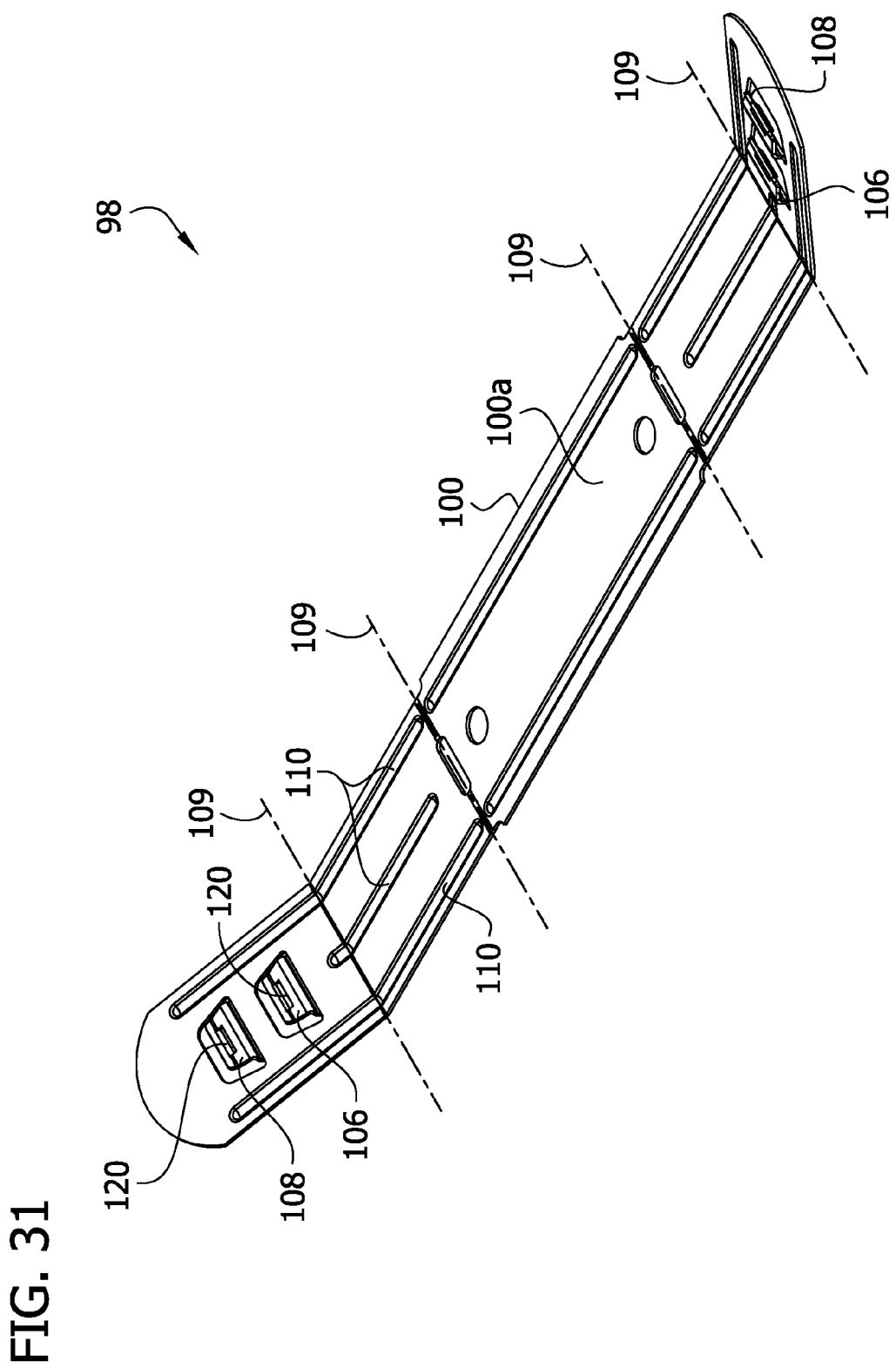
FIG. 31 is a perspective of a depth extender for use with the mounting bracket, illustrating an initial configuration of the depth extender.
Figure 32:
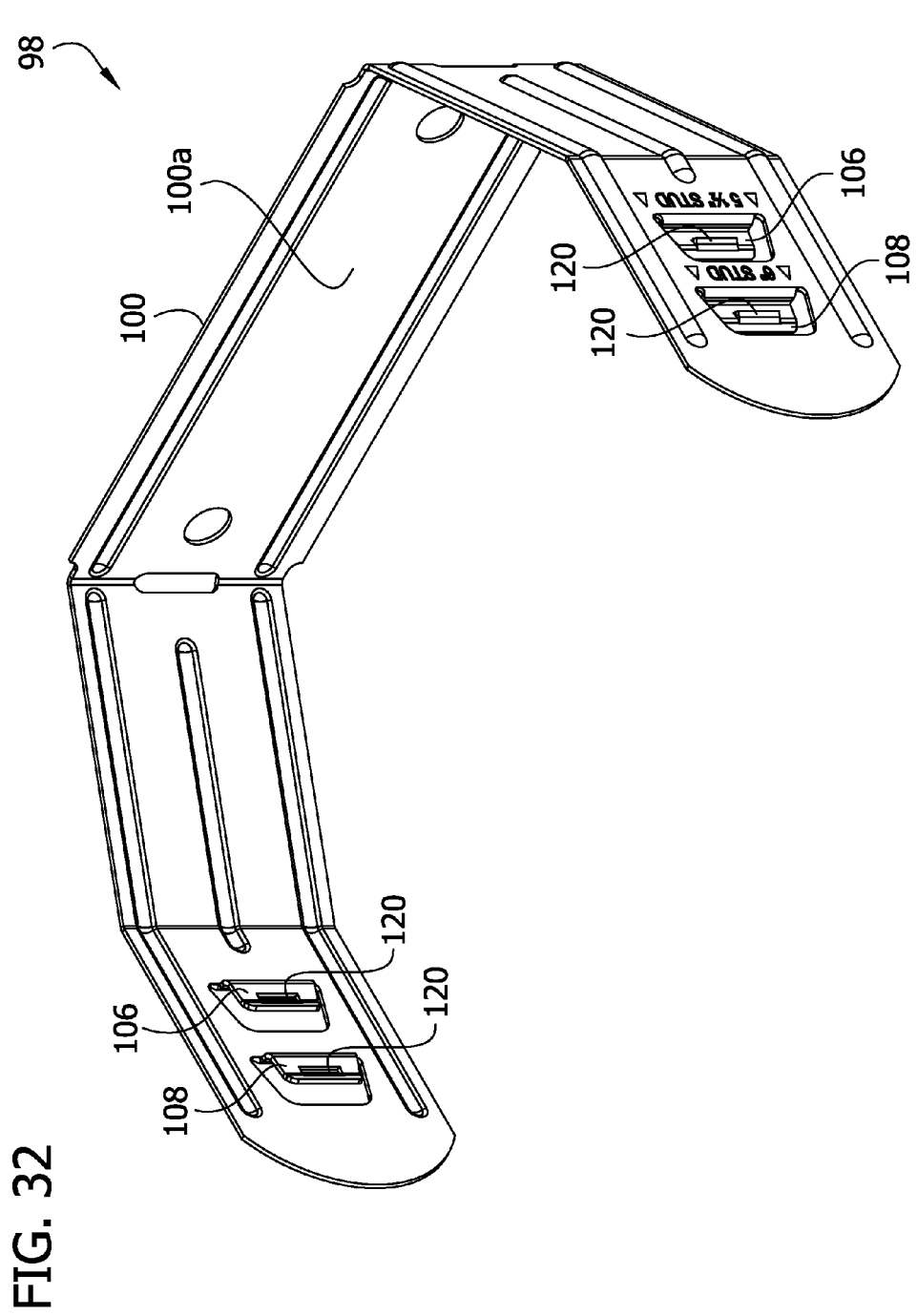
FIG. 32 is a perspective of the depth extender in a stabilizing configuration.
Figure 33:
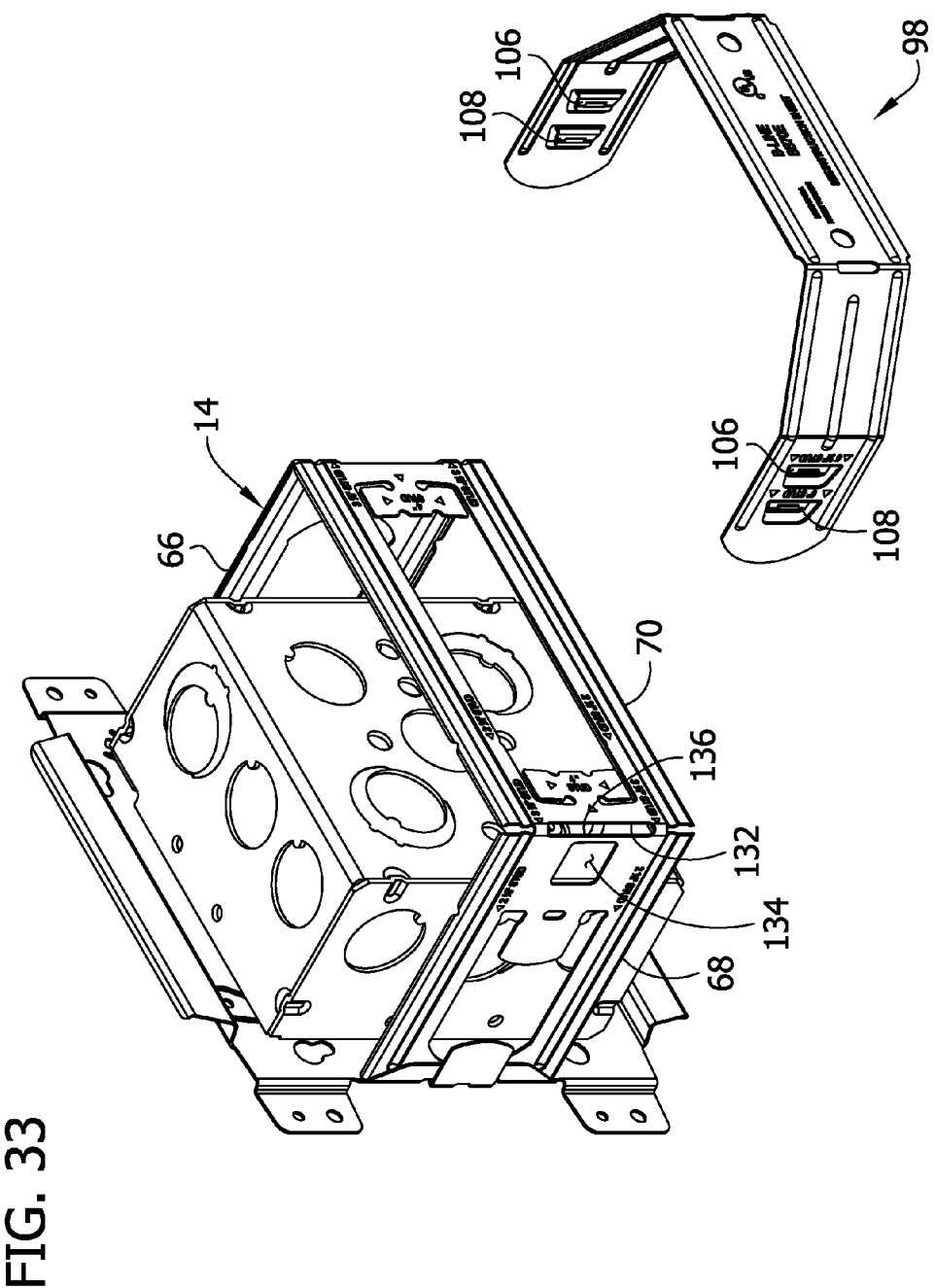
FIG. 33 is a separated rear perspective of the mounting bracket assembly and the depth extender.
Figure 34:
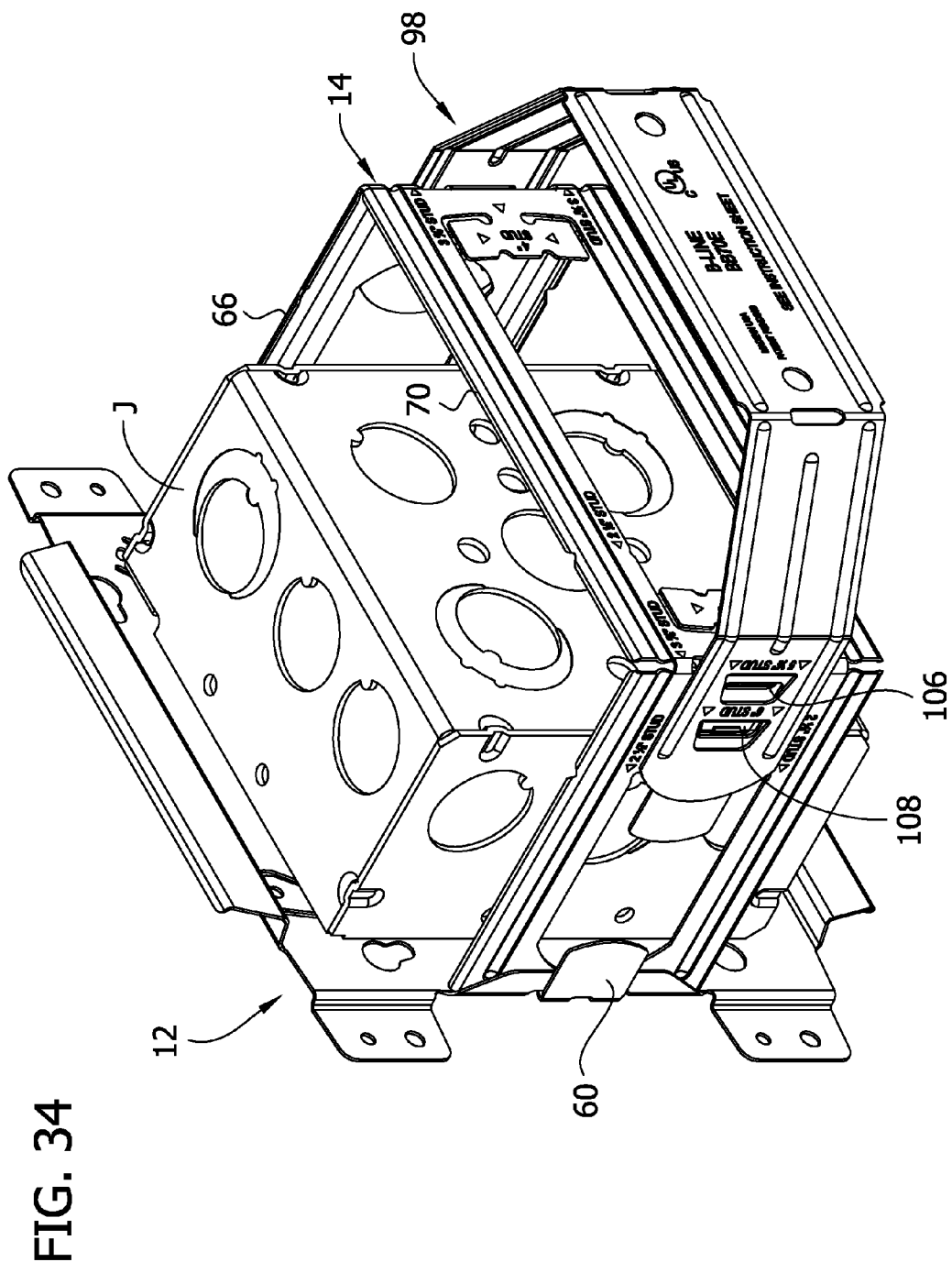
FIG. 34 is a rear perspective of the mounting bracket assembly with the depth extender attached in a first position.
Figure 35:
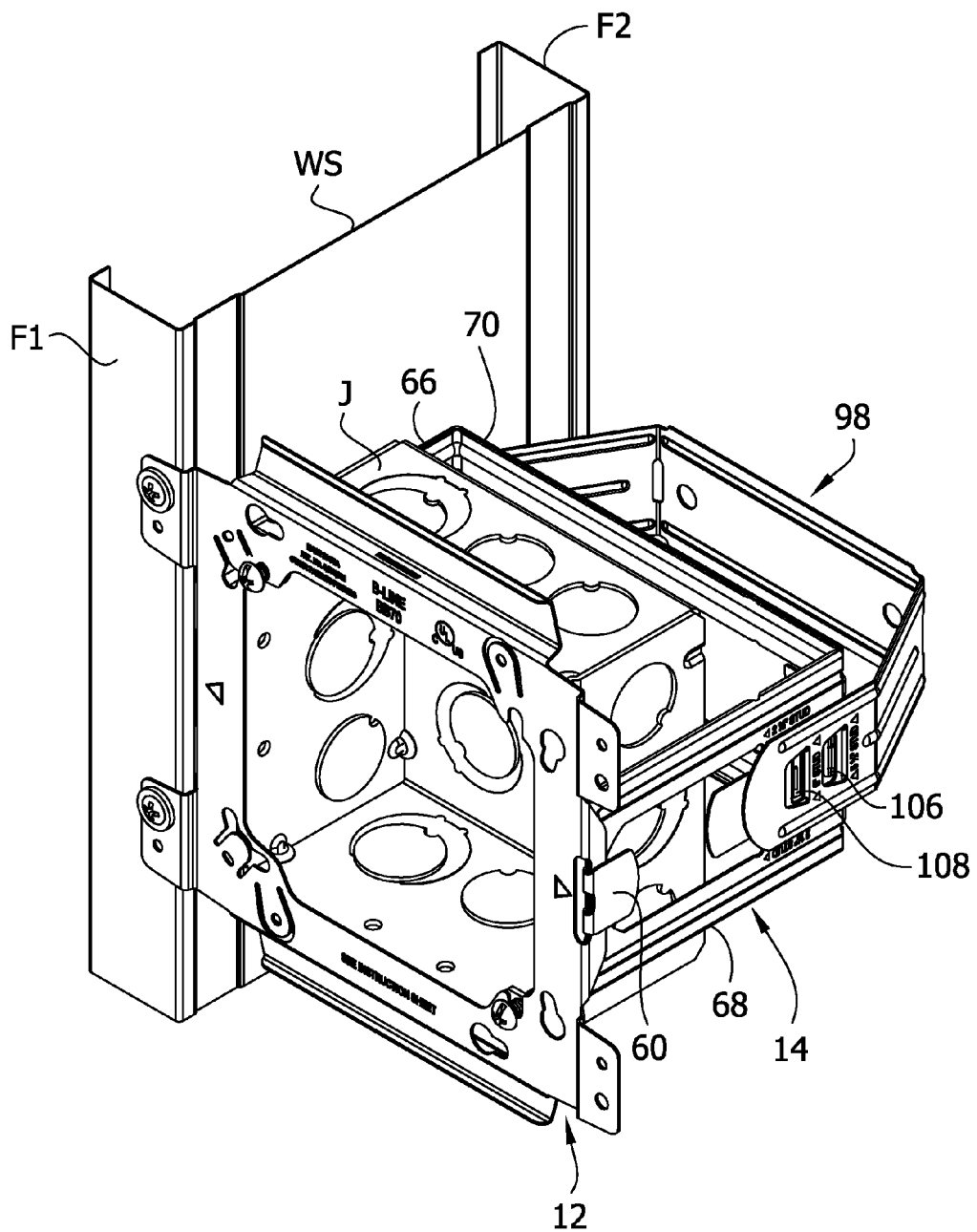
FIG. 35 is a perspective of the mounting bracket assembly attached to a wall stud with the depth extender attached in the first position.
Figure 36:
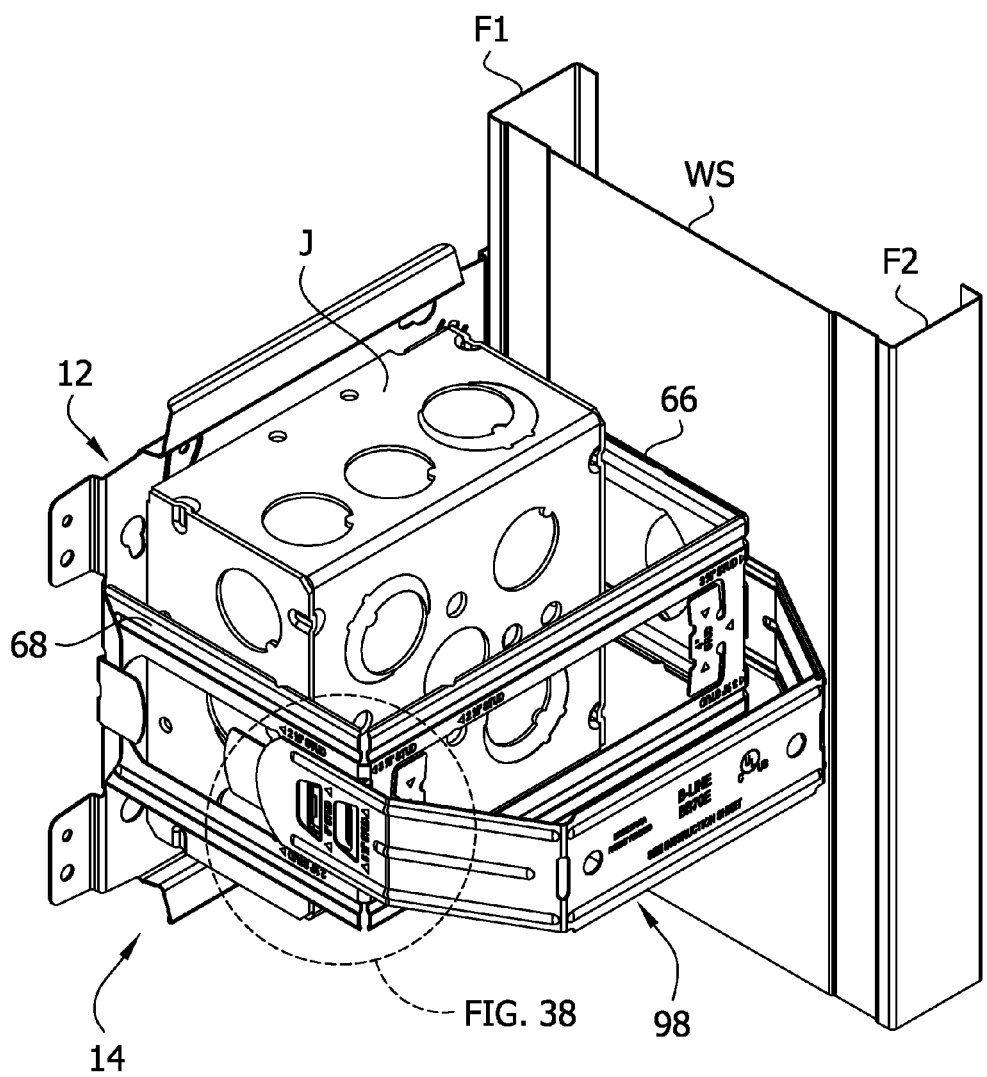
FIG. 36 is a rear perspective of the mounting bracket assembly attached to the wall stud with the depth extender attached in the first position.

As illustrated in FIGS. 31-43, in some embodiments the illustrated mounting bracket 10 may include a depth extender, generally indicated at 98, for extending the depth of the stabilizing extension 14, thereby increasing the number of wall studs WS for which the mounting bracket 10 is suitable for use. The depth extender 98 is configured for attachment to the stabilizing extension 14 to extend the effective depth of the stabilizing extension so that the mounting bracket 10 is further suitable for larger wall stud depths, such as 5½ in and 6 in. Referring to FIGS. 31 and 32, the depth extender 98 includes an elongate body 100 and first and second sets of attachment clips 106, 108 adjacent longitudinal ends of the body for attaching the depth extender to the stabilizing extension 14. The extender body 100 is bendable about bending axes 109 to configure the body into a generally C-shape. The body 100 also optionally includes strengthening ribs 110 to rigidify the body between the bending axes 109. In the illustrated embodiment, each attachment clip of the first and second sets 106, 108 extends generally laterally outward from an inner surface 100a of the body 100. A catch 120 extends laterally outward from an outer surface of each attachment clip 106, 108. In the illustrated embodiment, the depth extender 98, including the body 100, the first and second sets of clips 106, 108, and the catches 120, are formed as a one-piece construction from a single sheet of metal, although other configurations, such as separate attachment clips attached to the depth extender, are within the scope of the present invention.

Figure 37:
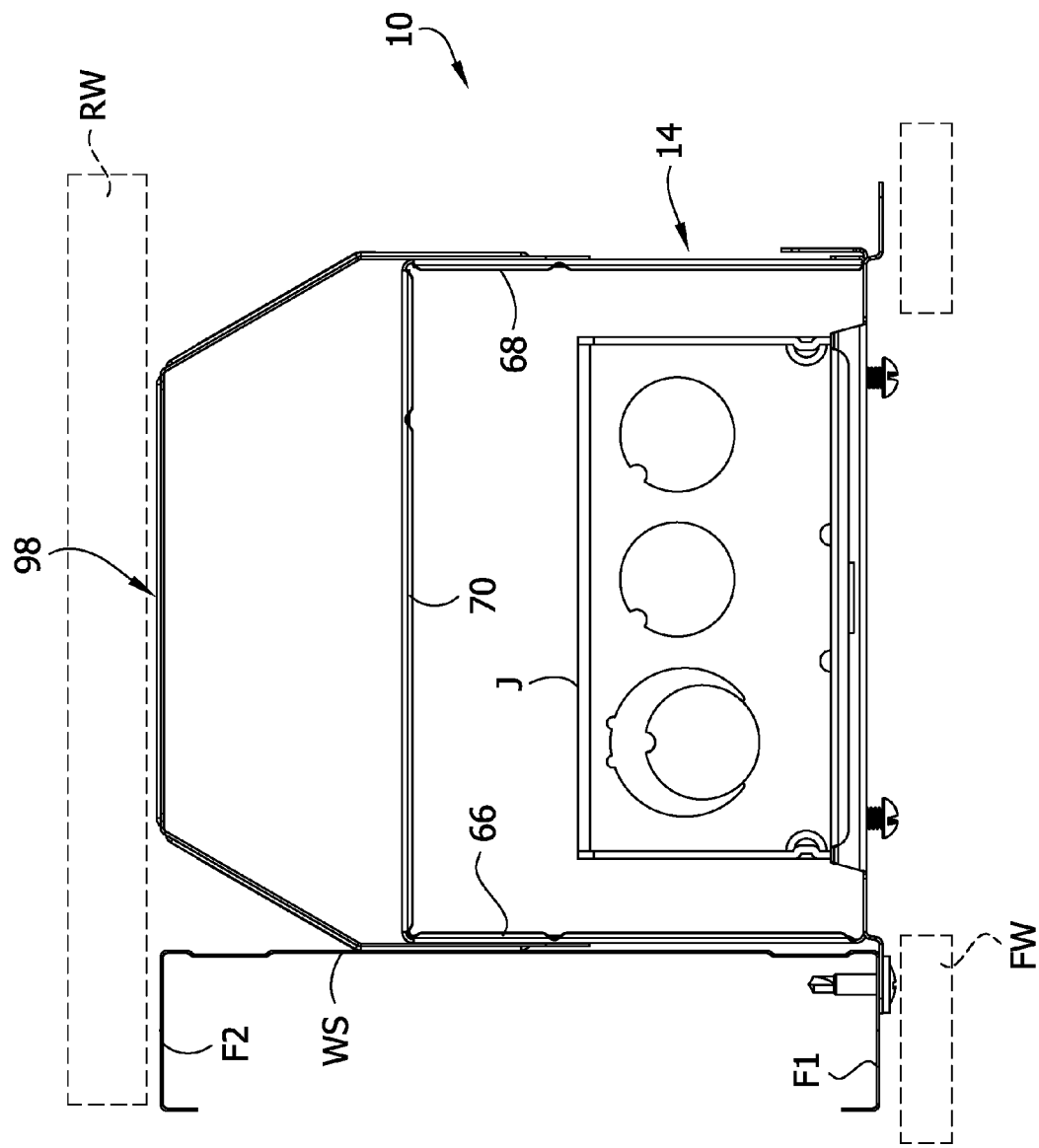
FIG. 37 is a top plan of the mounting bracket assembly attached to the wall stud with the depth extender attached in the first position.
Figure 38:
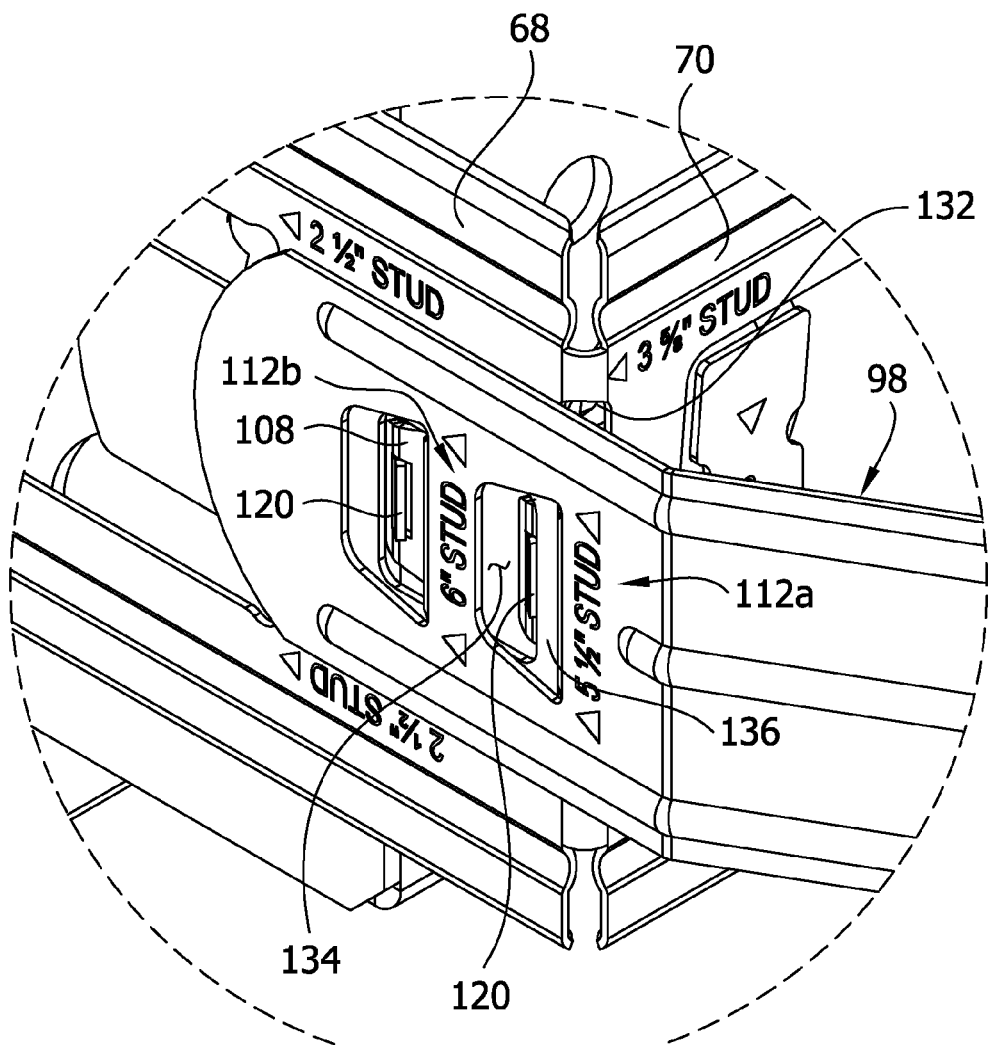
FIG. 38 is an enlarged, partial view of FIG. 36.
Figure 39:
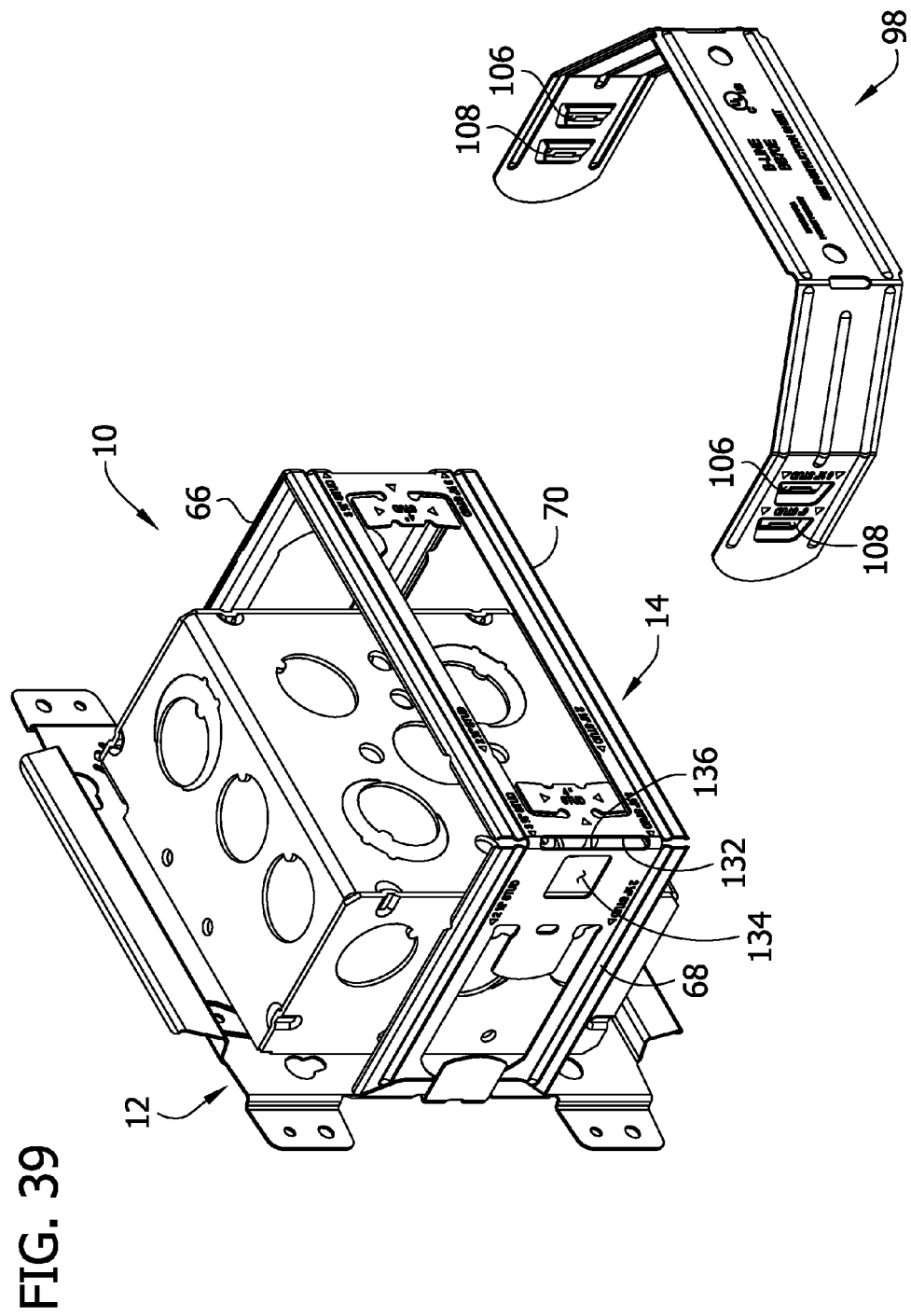
FIG. 39 is a separated rear perspective of the mounting bracket assembly and the depth extender.
Figure 40:
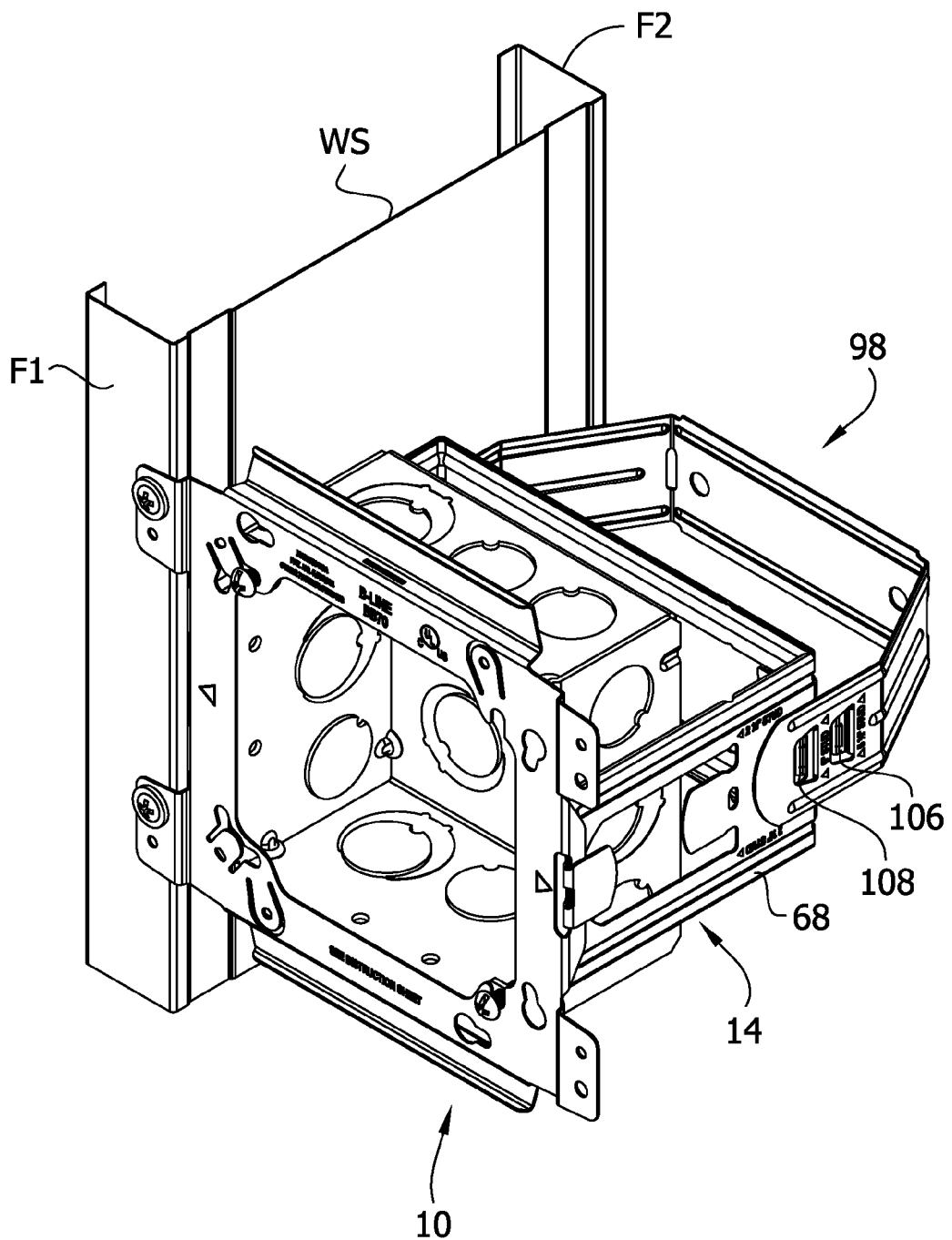
FIG. 40 is a perspective of the mounting bracket assembly attached to a wall stud with the depth extender attached in a second position.
Figure 41:
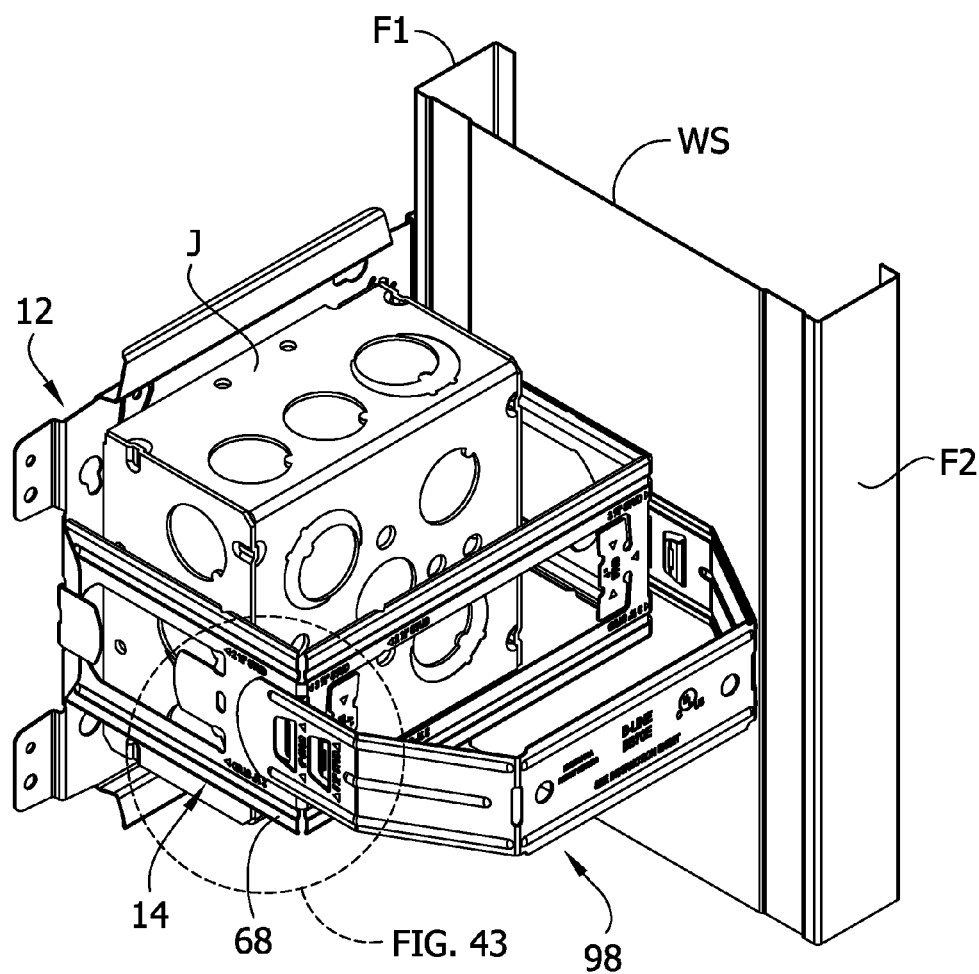
FIG. 41 is a rear perspective of the mounting bracket assembly attached to the wall stud with the depth extender attached in the second position.
Figure 42:
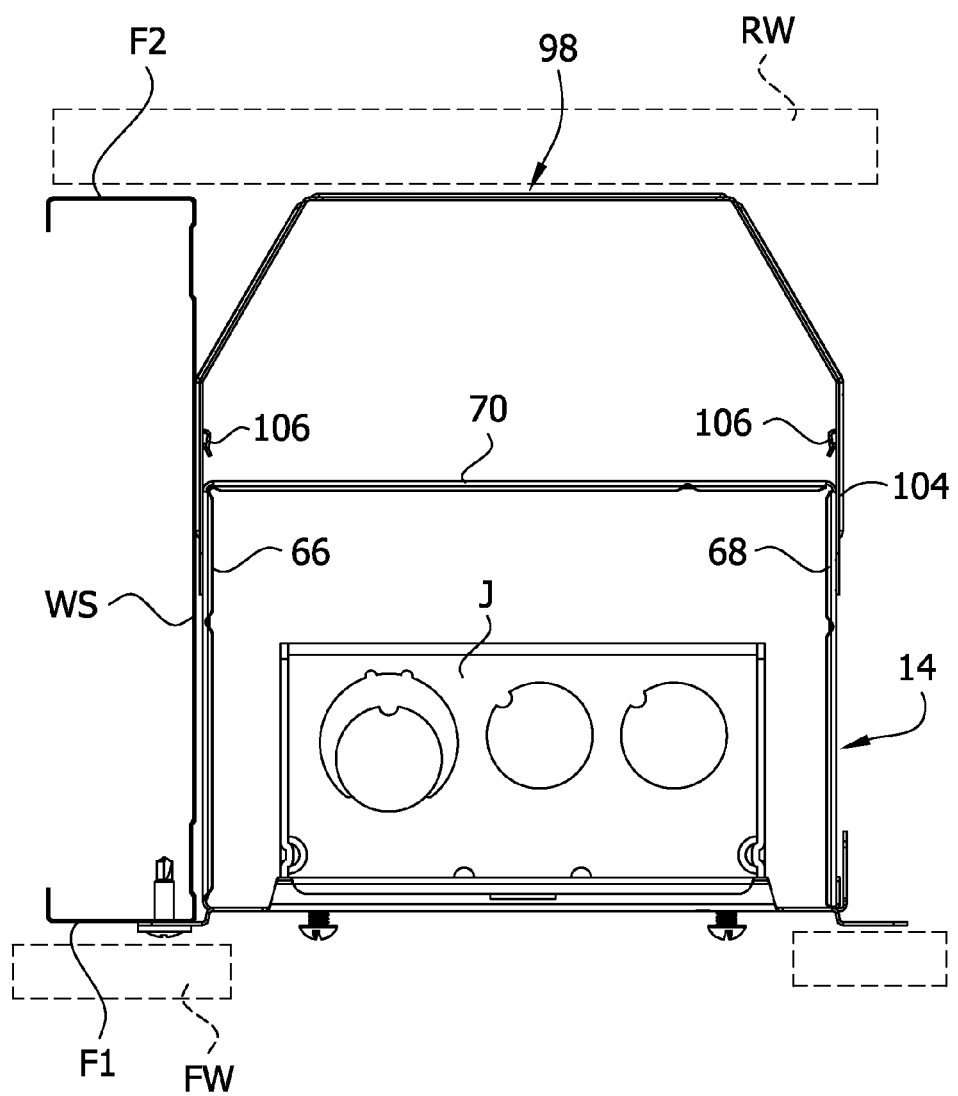
FIG. 42 is a top plan of the mounting bracket assembly attached to the wall stud with the depth extender attached in the second position.
Figure 43:
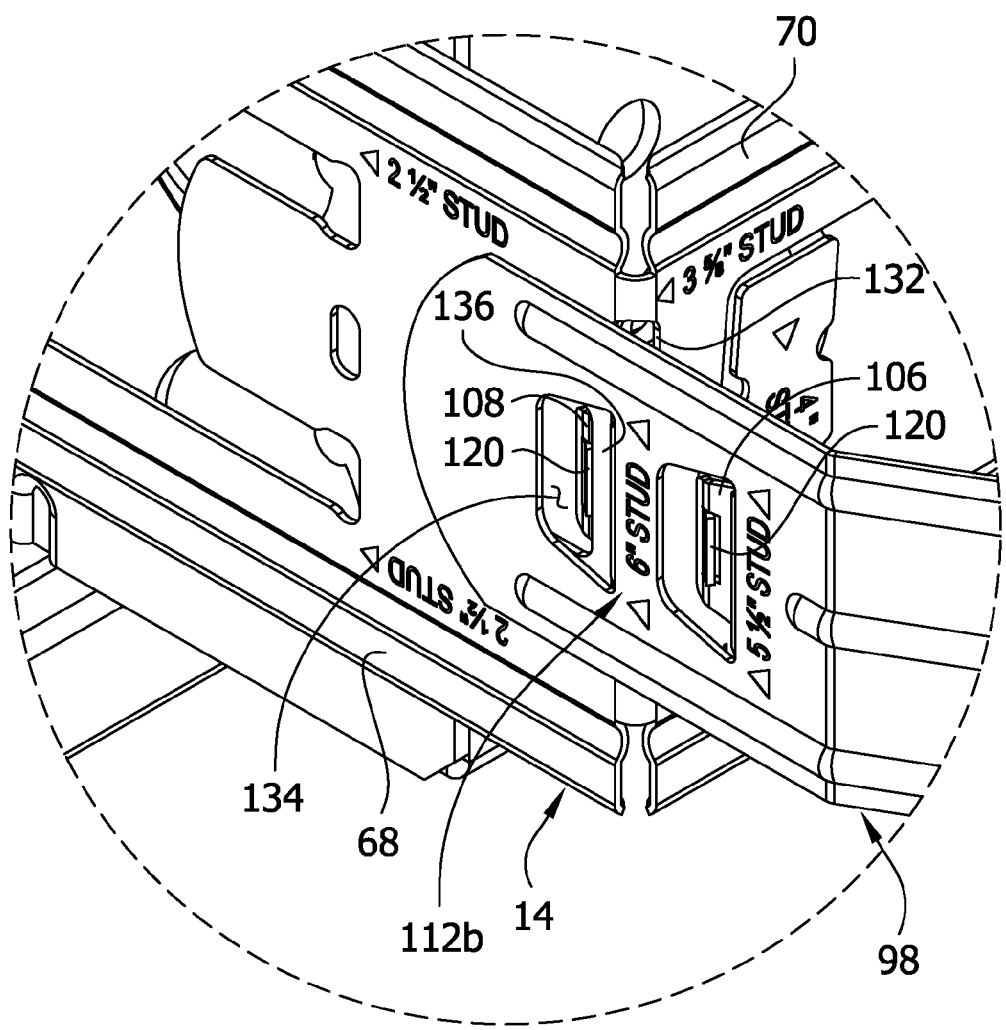
FIG. 43 is an enlarged, partial view of FIG. 41.

As seen in FIGS. 33-38, to configure the mounting bracket 10 for use with a wall stud WS having a 5½ in depth, the depth extender 98 is attached to the stabilizing extension 14 when it is in the stabilizing configuration suitable for use with a wall stud depth of 3⅝ in (as shown and described with reference to FIGS. 4-10). The first set of clips 106 of the depth extender 98 are inserted into openings 132 at the respective junctures or bending areas between the leg connector 70 and the first and second legs 66, 68 of the stabilizing extension 14. The depth extender 98 has indicia 112a including arrows and markings identifying the first set of attachments tabs 106 are for use with a wall stud having a 5½ in depth. When the first set of clips 106 is inserted into the openings 132, the catches 120 on the first set of clips extend through respective clearance openings 134 in the first and second legs 66, 68, respectively, and engage respective webs 136 of the first and second legs disposed between the openings 132, 134 to secure the depth extender 98 to the stabilizing extension 14. As seen in FIG. 37, the depth extender 98 extends the depth of the mounting bracket 10 so that it is substantially co-extensive with the depth of the wall stud WS. Moreover, the depth extender 98 functions as a second leg connector that extends between and interconnects the first and second legs 66, 68, such that the depth extender may function in a similar manner to the leg connector 70, as set forth above herein.

Similarly, as seen in FIGS. 39-43, to configure the mounting bracket 10 for use with a wall stud WS having a 6 in depth, the depth extender 98 is attached to the stabilizing extension 14 when it is in the stabilizing configuration suitable for use with a wall stud depth of 3⅝ in (as shown and described with reference to FIGS. 4-10). The second set of clips 108 of the depth extender 98 are inserted into the openings 132 at the respective junctures or bending areas between the leg connector 70 and the first and second legs 66, 68 of the stabilizing extension 14. The depth extender 98 has indicia 112b including arrows and markings identifying the second set of attachments clips 108 for use with a wall stud having a 6 in depth. When the second set of clips 108 is inserted into the openings 132, the catches 120 on the second set of clips extend through respective clearance openings 134 in the first and second legs 66, 68, respectively, and engage respective webs 136 of the first and second legs disposed between the openings 132, 134 to secure the depth extender 98 to the stabilizing extension 14. As seen in FIG. 37, the depth extender 98 extends the depth of the mounting bracket 10 so that it is substantially co-extensive with the depth of the wall stud WS. Moreover, the depth extender 98 functions as a second leg connector that extends between and interconnects the first and second legs 66, 68, such that the depth extender may function in a similar manner to the leg connector 70, as set forth above herein.

As can be seen from the above disclosure and FIGS. 1-43, the stabilizing extension 14 of the mounting bracket 10 can be configured in a plurality of stabilizing configurations for use with the typical wall studs WS having depths of 3⅝ in, 4 in, 2½ in, 5½ in, and 6 in, thereby eliminating the need for a number of mounting brackets of different depths. Moreover, as disclosed above, the leg connector 70 offers additional support and stability to the mounting bracket 10 when it is installed. Typical mounting brackets may not include a stabilizer, or may include only one or two stabilizing legs extending rearward from the face plate of the mounting bracket. However, these mounting brackets can easily be moved out of position (i.e., moved so the face plate is no longer parallel with the front wall or is moved back away from the wall) if the leg(s) is bent out of position. For example, when installed the leg opposite the attached side of the conventional mounting bracket can be bent substantially out of position if bent away from the wall stud. Unlike the conventional brackets, the legs 66, 68 of the illustrated mounting bracket are connected by the rigid leg connector 70 such that the legs and the leg connector move as a unit. Thus, each of the legs 66, 68 of the illustrated stabilizing extension 14 can rotate relative to the face plate 12 only a limited horizontal distance away from the wall stud WS before the leg on the attached side (e.g., the left leg 66) contacts the junction box J, thereby preventing additional movement of the leg opposite the attached side of the bracket (e.g., the right leg 68). Thus, leg connector 70 as described above limits movement of the legs 66, 68 and thereby prevents the bracket 10 from being moved out of position.

Figure 47:
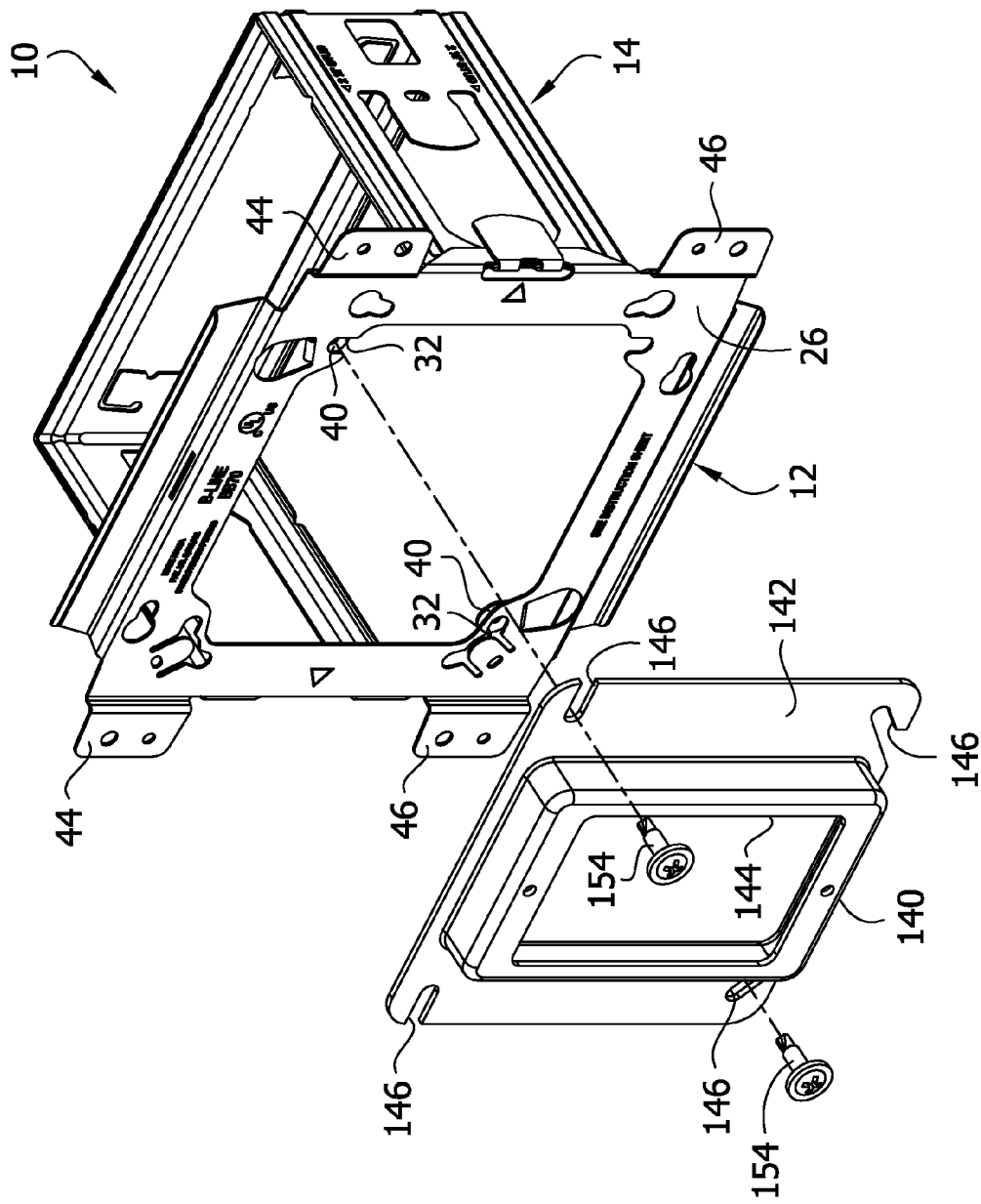
FIG. 47 is a separated perspective of a mounting bracket assembly including the mounting bracket, a plaster ring, and fasteners for attaching the plaster ring to the mounting bracket.
Figure 48:
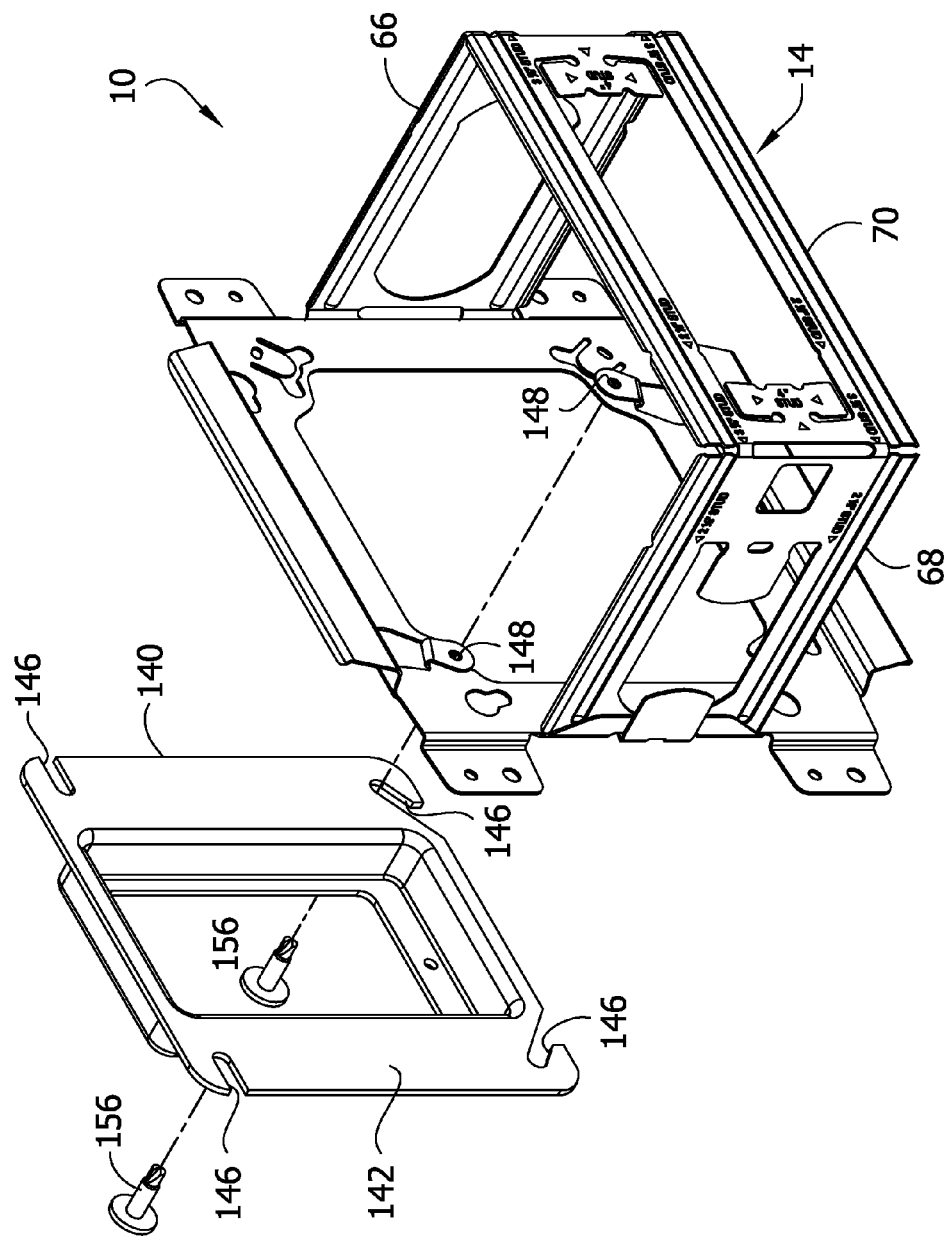
FIG. 48 is a separated rear perspective of the mounting bracket assembly of FIG. 47.
Figure 49:
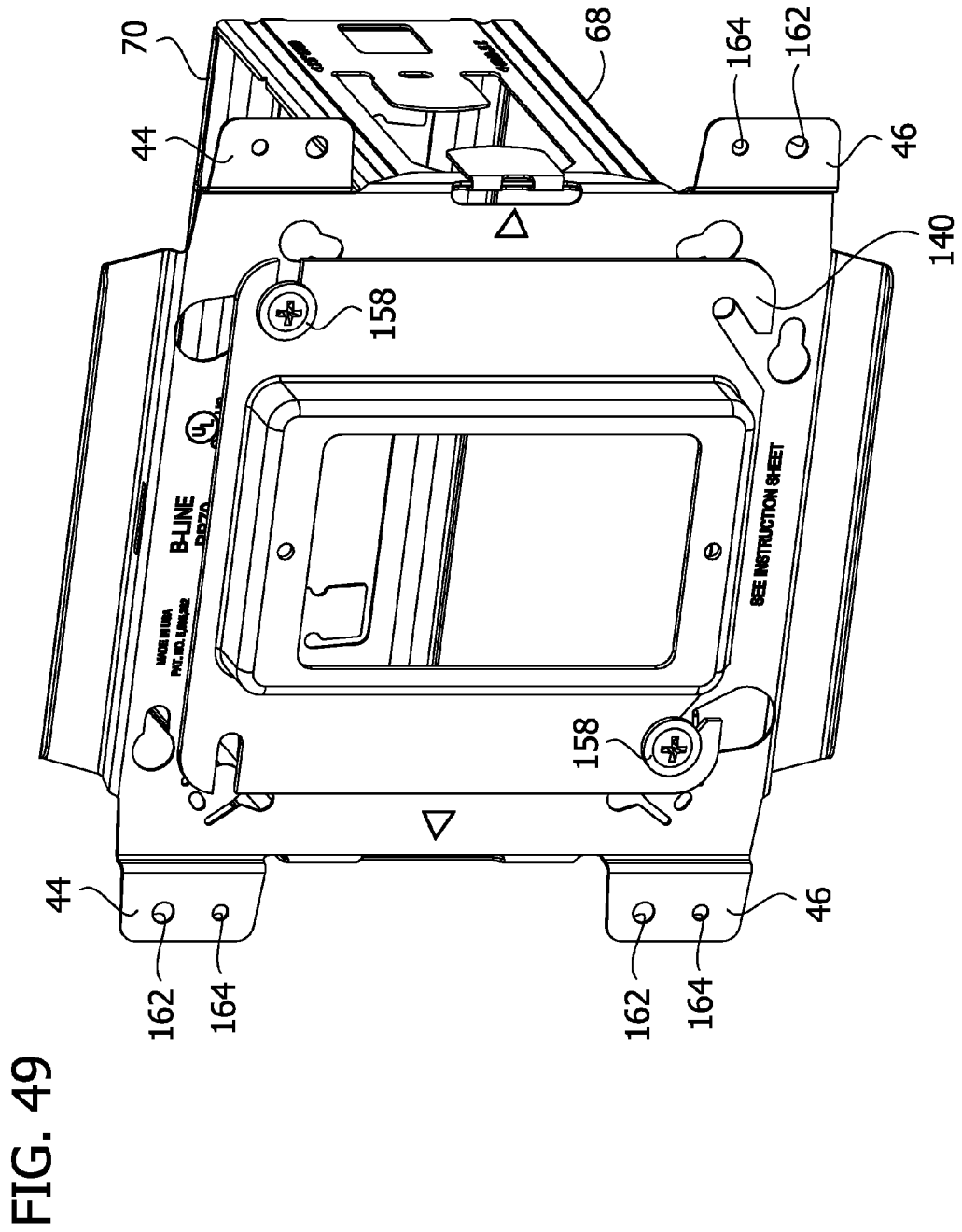
FIG. 49 is a perspective of the mounting bracket assembly of FIG. 47, illustrating the plaster ring attached to the mounting bracket with the fasteners.

As set forth above, the face plate 12 includes a pair of plaster ring mounting tabs 40. The plaster ring mounting tabs 40 are for use in attaching a plaster ring (also known as a mud ring) 140 to the mounting bracket 10 without first securing (or ever securing) a junction box to the mounting bracket. As seen in FIGS. 47-49, plaster ring 140 is mounted on the front face 26 of the face plate 12. In the illustrated embodiment, the plaster ring 140 has a peripheral flange 142, a central opening 144, and slots 146 configured to receive mounting screws. Typically, the mounting screws MS on the junction box J are received in the slots 146 and tightened to connect the plaster ring 140 to the mounting bracket 10 and to the junction box J (see, e.g., FIG. 8). The illustrated mounting bracket 10, however, includes plaster ring mounting tabs 40 to permit the plaster ring 140 to be attached to the mounting bracket without the junction box J.

Figure 44:
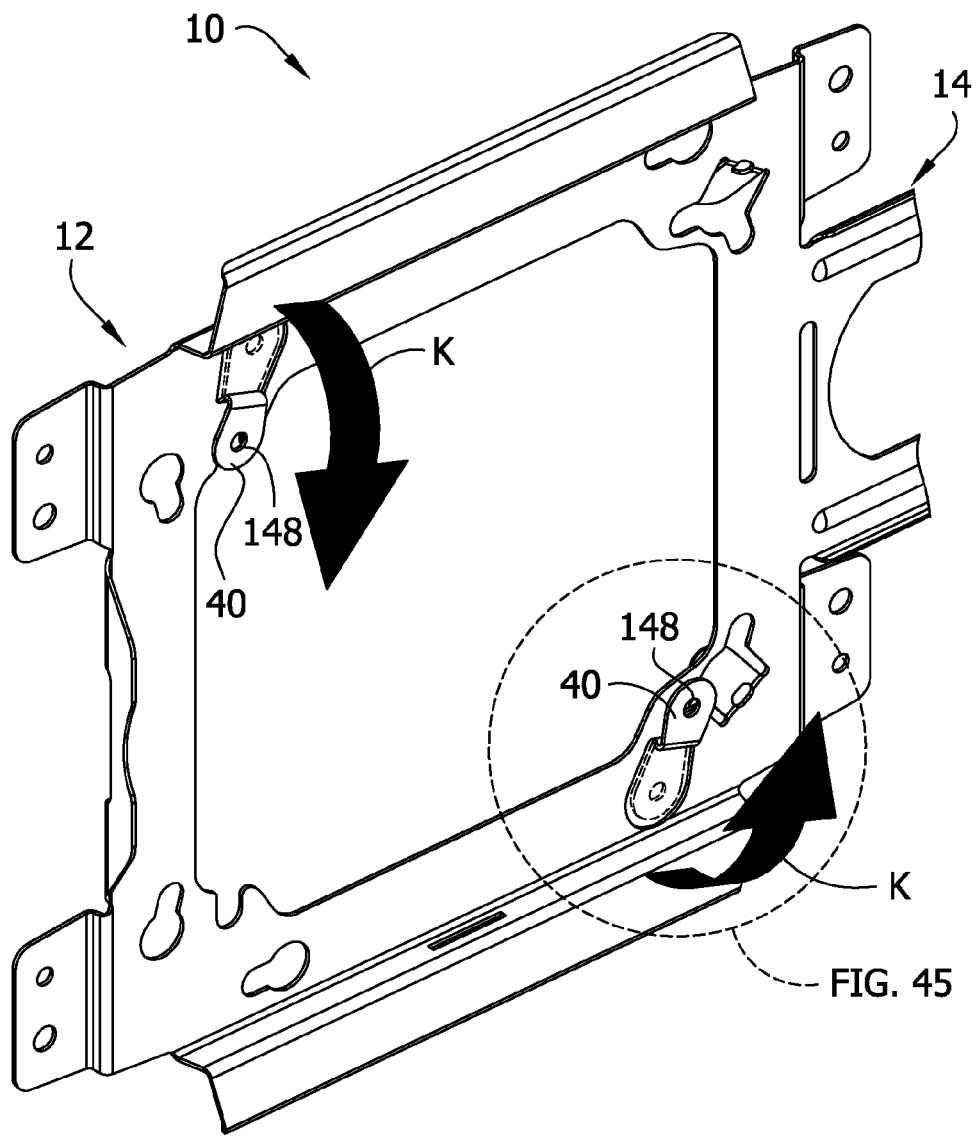
FIG. 44 is a partial rear perspective of the mounting bracket, illustrating bending movement of plaster ring mounting tabs from an initial position to a bent position.
Figure 45:
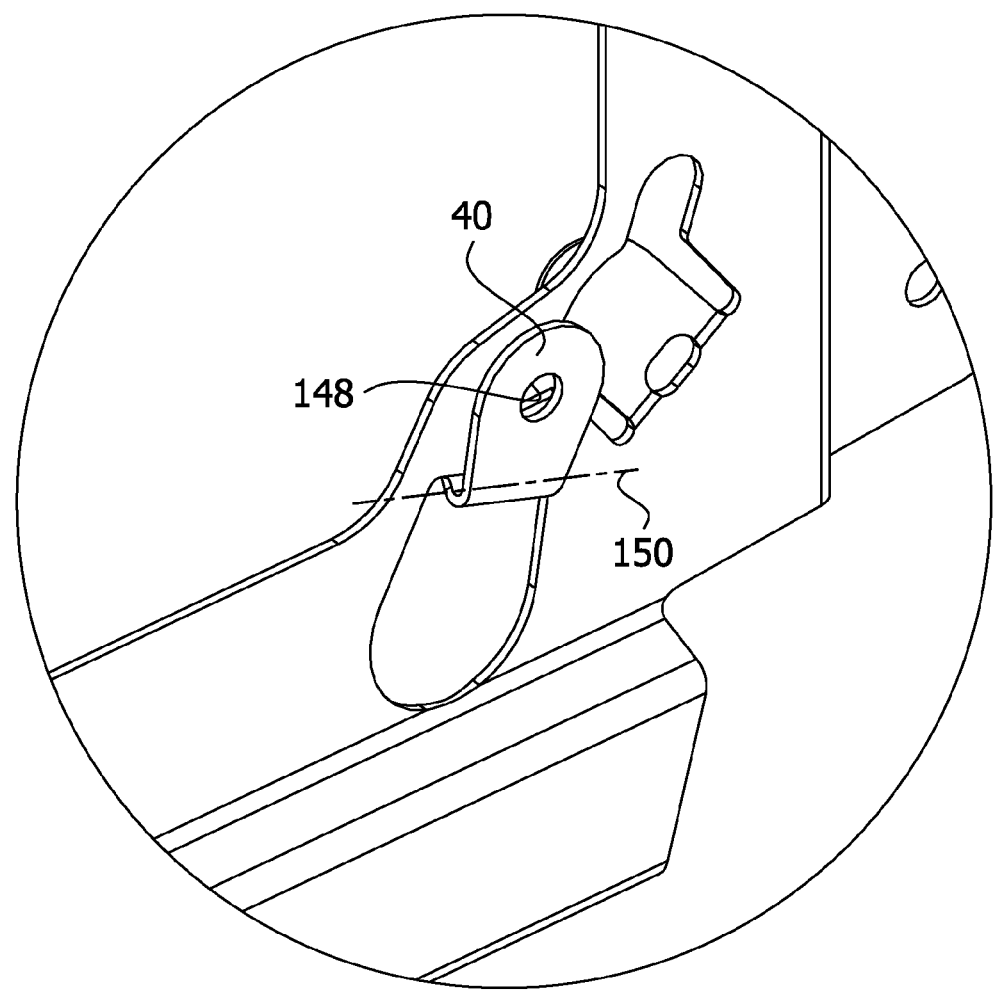
FIG. 45 is an enlarged, partial view of FIG. 44.

Referring to FIGS. 1, 2 and 44-49, the face plate 12 includes two plaster ring mounting tabs 40 adjacent diagonally opposite corners of the central opening 30. In other embodiments, the face plate 12 may include any suitable number of plaster ring mounting tabs 40, or the plaster ring mounting tabs may be omitted. Each plaster ring mounting tab 40 includes a pilot hole 148. As shown in FIGS. 44 and 45, each plaster ring mounting tab 40 is located on the face plate 12 such that they can be bent about a bending axis 150 in a direction K (i.e., rearward) to overlie one of the mounting openings (e.g., one of the mountings opening 32 for the 4×4 in junction box J) at the rear face 28 of the face plate. When the mounting tab 40 is in the bent configuration, the pilot hole 148 of the tab is aligned with one of the mounting openings 32, 34, 38 in the face plate 12. In the illustrated embodiment, the mounting tabs 40 are bendable about the bending axes 150 such that the pilot holes of the tabs are aligned with mounting openings 32 for the 4×4 in junction box J. It is understood that the mounting tabs 40 may be configured to overlie, in addition to or in lieu of the mounting openings 32, other mounting openings in the face plate, such as the mounting openings 34 for the $4^{11}/_{16} \times 4^{11}/_{16}$ in junction box J or the mounting openings 38 for the 5×5 in data box.

Once the mounting tabs 40 are in the bent configuration and the pilot hole 148 of each tab is aligned with a corresponding opening 32 in the face plate 12, the plaster ring 140 can be attached to the mounting bracket 10 with a suitable threaded fastener 154, such as self-tapping sheet metal screws (see FIGS. 47-49). The plaster ring 140 is aligned with the mounting bracket 10 so diagonally opposite slots 146 in the plaster ring are aligned with respective pilot holes 148 of the mounting tabs 40 and the corresponding mounting openings 32 in the face plate 12. The screws 154 (e.g., self-tapping sheet metal screws) are then threaded into the pilot holes 148 and tightened to clamp the plaster ring 140 (specifically, the peripheral flange 142) and the face plate 12 between the heads of the screws and the mounting tabs 40, thereby attaching the plaster ring to the mounting bracket 10. In one embodiment, the diameters of the pilot holes are suitable for allowing threaded fasteners 154 (e.g., a self-tapping sheet metal screw) to thread into the holes.

As can be understood, the mounting tabs 40 allow the plaster ring 140 to be secured to the mounting bracket 10 without a junction box. In typical applications, the mounting screws or bolts MS on the junction box J are used to attach the plaster ring 140 to the mounting bracket 10. Previously, the plaster ring 140 could not be attached to the mounting bracket 10 without the junction box. However, in some applications (e.g., data lines, phone lines, etc.), a junction box is not necessary or desired. Accordingly, the mounting tabs 40 permit the plaster ring 140 to be attached to the mounting bracket 10 without a junction box when desired.

In the illustrated embodiment, the mounting tabs 40 are part of the mounting bracket 10 described above, however, the mounting tabs are not limited for use with the illustrated bracket. In other embodiments, the mounting tabs 40 may be part of a different type of mounting bracket. In particular, the mounting tabs 40 may be part of any type of mounting bracket mounting an electrical or communication device on a wall stud. For example, the mounting tabs 40 may be added to any conventional and/or commercially available mounting bracket.

Figure 46:
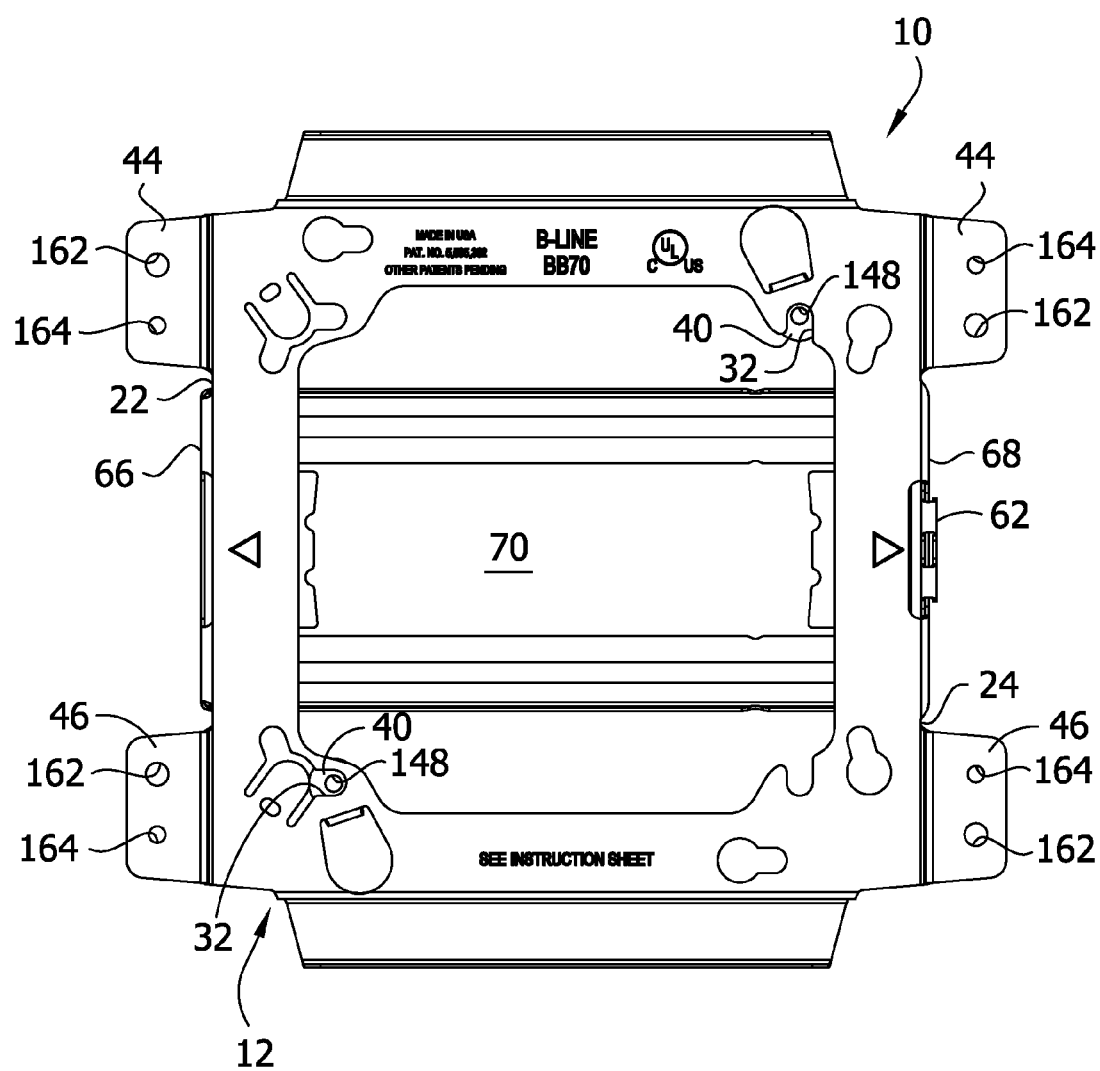
FIG. 46 is a front elevation of the mounting bracket with the plaster ring mounting tabs in the bent position.

As set forth above, the face plate 12 includes pairs of upper and lower stud mounting tabs 44, 46 extending laterally outward from the left and right edge margins 22, 24 of the main body 16. In the illustrated embodiment, the stud mounting tabs 44, 46 are configured for both mounting the mounting bracket 10 to the wall stud WS using suitable fasteners 166, e.g., self-tapping sheet metal screws, (see FIGS. 46-49) and attaching adjacent mounting brackets to one another to form a daisy chain of mounting brackets. As seen in FIG. 46, each stud mounting tab 44, 46 includes a clearance hole 162 and a pilot hole 164, which are vertically offset (e.g., vertically aligned) on the corresponding tab (i.e., one hole is an upper hole, and the other hole is a lower hole). The arrangement of the clearance hole 162 and the pilot hole 164 is reversed on opposite sides of the face plate 12. For example, in the illustrated embodiment seen in FIG. 46, the clearance holes 162 in the left mounting tabs 44, 46 are disposed above the pilot hole 164 (i.e., the clearance holes are upper holes and the pilot holes are lower holes), and the clearance holes 162 in the right mounting tabs are disposed below the pilot holes 164 (i.e., the clearance holes are lower holes and the pilot holes are upper holes). Through this alternating configuration, the mounting tabs 44, 46 of adjacent first and second mounting brackets 10 are can be overlapped so that the clearance holes 162 in the corresponding mounting tabs of the first bracket, for example, are aligned with the pilot holes 164 in the corresponding mounting tabs of the second bracket.

Figure 50:
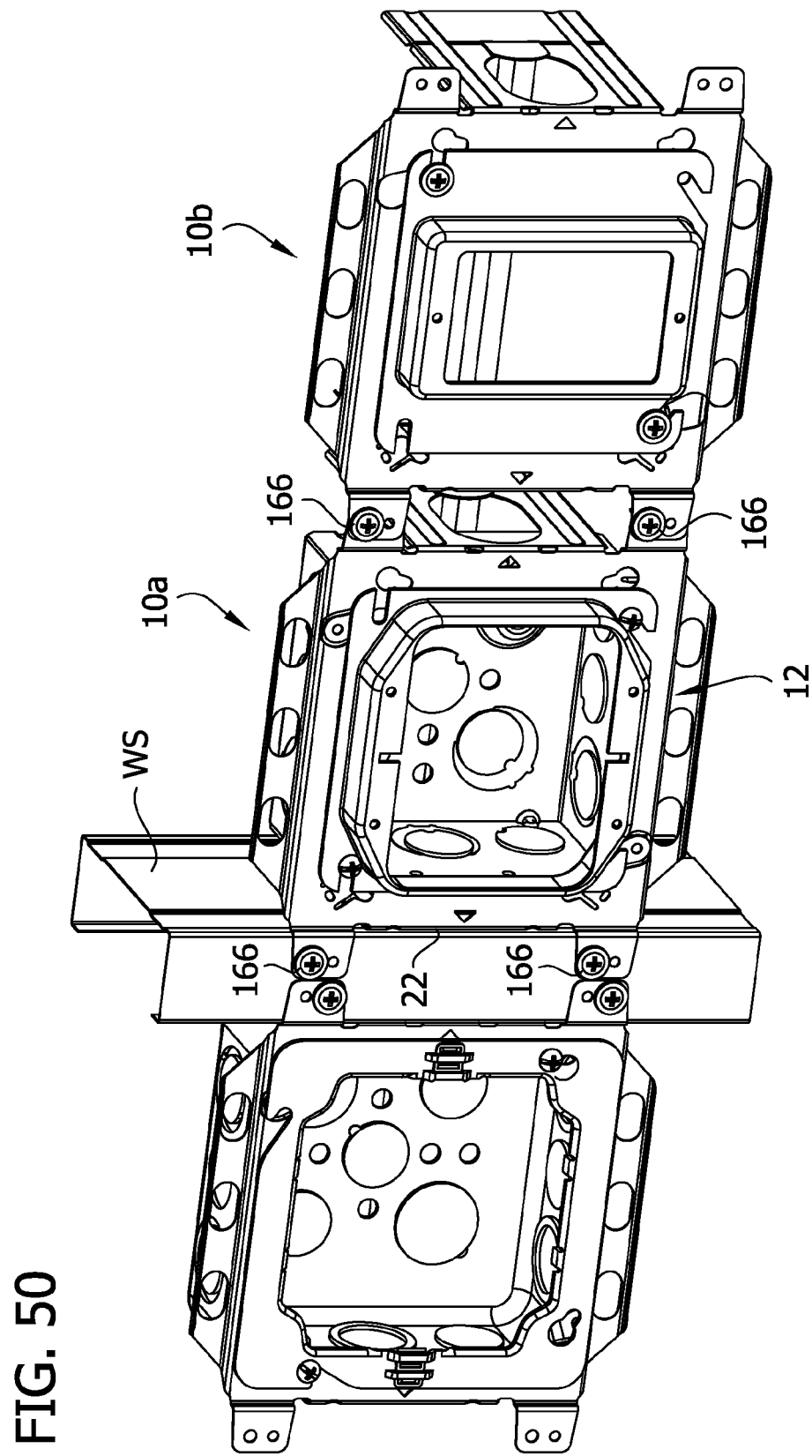
FIG. 50 is a perspective of a daisy chain of mounting brackets attached to a wall stud and to adjacent mounting brackets.
Figure 51:
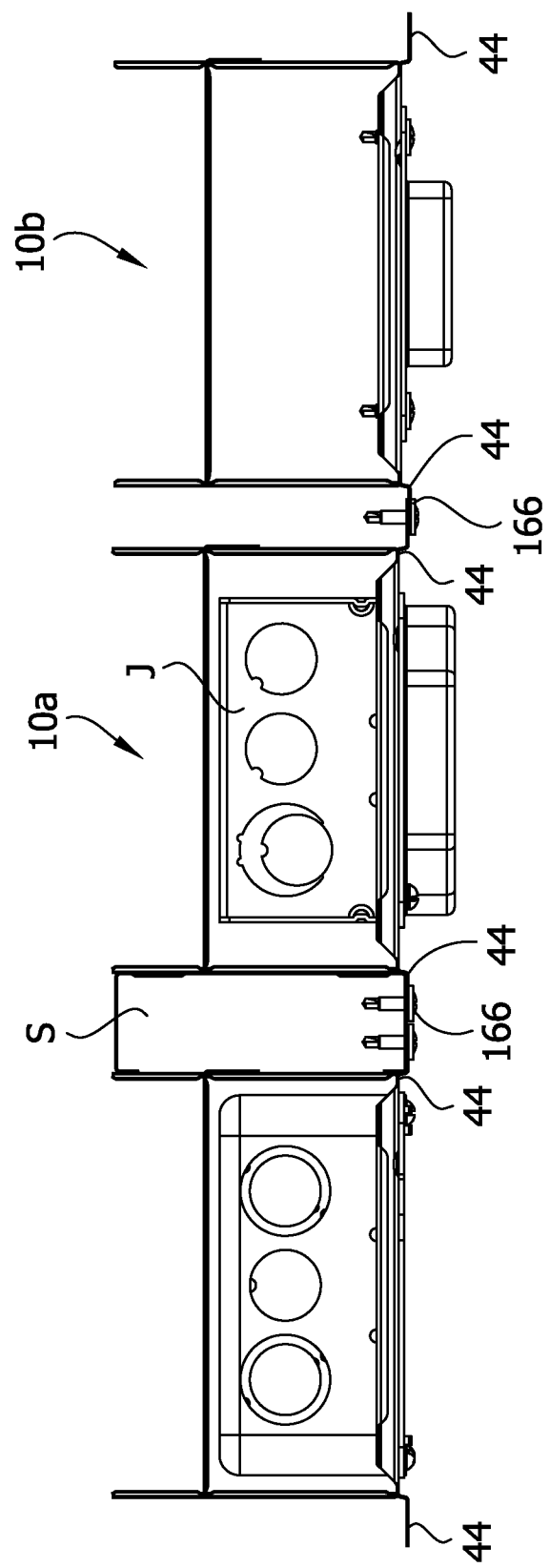
FIG. 51 is a top plan of FIG. 50.
Figure 52:
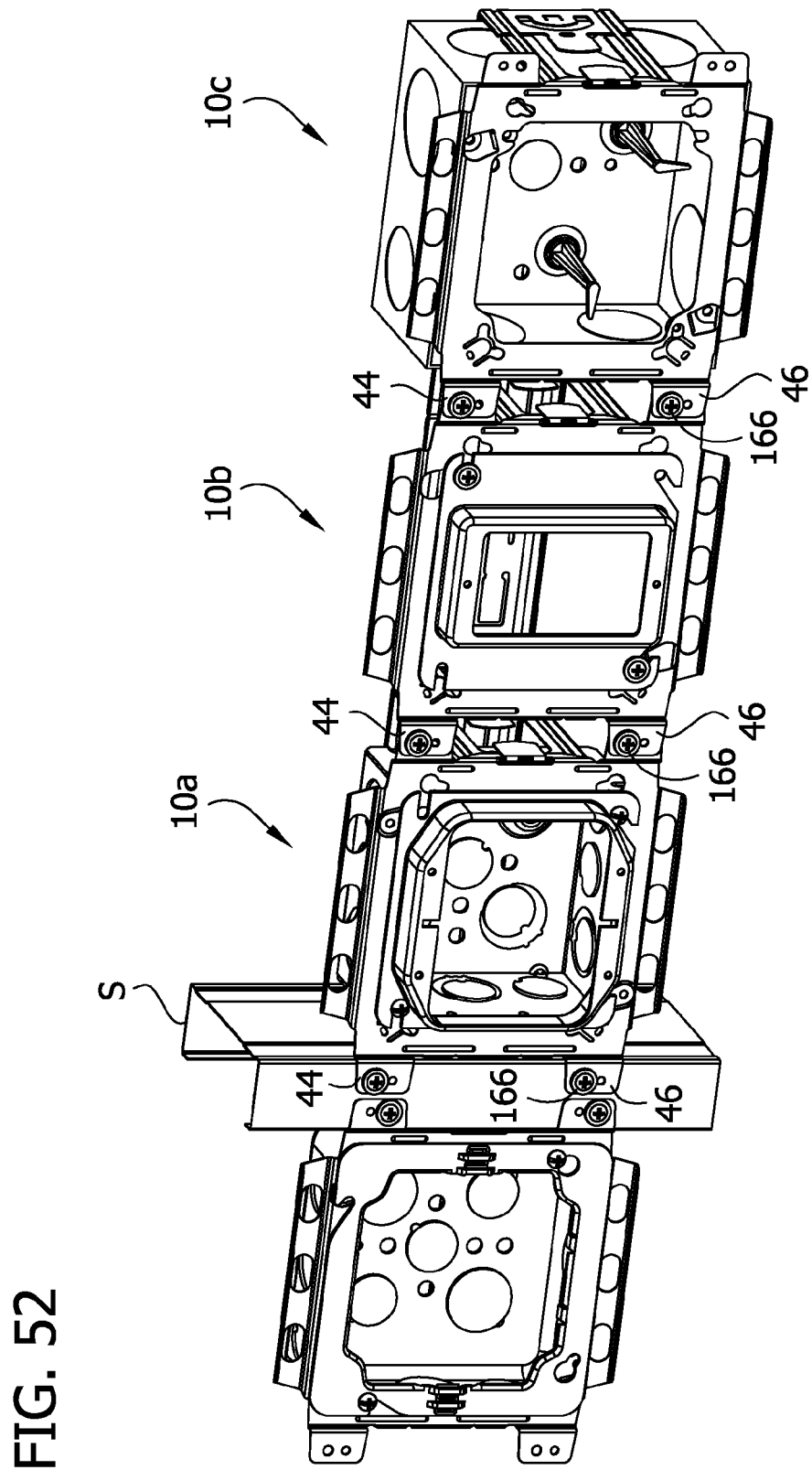
FIG. 52 is a perspective of a daisy chain of mounting brackets attached to a wall stud and to adjacent mounting brackets.

Referring to FIG. 50, in one example a first mounting bracket 10a is attached to the stud WS with a fastener 166 (e.g., a self-tapping sheet metal screw) extending through each of the clearance holes 162 (e.g., upper holes) in the upper and lower left stud mounting tabs 44, 46. A second mounting bracket 10b is positioned on an unattached side (e.g., the right side) of the first mounting bracket 10a so that the left stud mounting tabs 44, 46 of the second mounting bracket overlie the front surface of the corresponding right mounting tabs of the first mounting bracket. In this position, the respective clearance holes 162 (e.g., the upper holes) in the left stud mounting tabs 44, 46 of the second mounting bracket 10b are aligned with (and in front of) the corresponding pilot holes 162 (e.g., the upper holes) in the right stud mounting tabs 44, 46 of the first mounting bracket 10a. (In other embodiments, the second mounting bracket 10b can be positioned so that the stud mounting tabs 44, 46 of the second bracket either overlie, as illustrated, or underlie the stud mounting tabs 44, 46 of the first bracket 10a.) The second mounting bracket 10b is then attached to the first mounting bracket 10a by threaded fasteners 166 (e.g., self-tapping sheet metal screws) extending through the respective aligned pairs of clearance and pilot holes 162, 164 in the corresponding stud mounting tabs 44, 44. In particular, it is preferred that the fasteners be threaded into the aligned pairs of holes 162, 164 where the clearance hole is in front of the pilot hole. In this way, threading the fastener 166 through the pilot hole 164 brings the underlying or rear bracket (e.g., the first bracket 10a in the illustrated embodiment) forward to clamp the front bracket (e.g., the second bracket 10b) between the head of the fastener and the rear bracket. As illustrated, the tabs 44, 46 of the second bracket 10b overlie the tabs 44, 46 of the first bracket 10a. Accordingly, the threaded fasteners 166 are inserted only into the top pair of aligned clearance and pilot holes 162, 164 on each of the overlapping upper and lower tabs 44, 46, because the top pairs of holes are the pairs with the pilot holes 164 positioned behind the clearance holes 162.

Additional mounting brackets can be attached to the second bracket 10b in the same manner to form a daisy chain of mounting brackets. As illustrated in FIGS. 50-53, a user may wish to attach mounting brackets holding different types of junction boxes and/or different electrical or communication devices. Any of the mounting brackets can also be free of a junction box as described above. The daisy chain of mounting brackets can include as many brackets as necessary, and may extend until the last bracket in the daisy chain attaches to an adjacent stud (not shown) via a screw extending through the clearance holes on the stud mounting tabs. Typical stud mounting tabs of conventional mounting brackets include a clearance hole for receiving a fastener (e.g., a screw) to attach the mounting bracket to a stud. The configuration of the stud mounting tabs described above and the inclusion of both clearance and pilot holes on each tab permits the mounting bracket to be mounted to a stud, to adjacent brackets, or to both. In addition, because the clearance and pilot holes alternate between opposite stud mounting flanges, the mounting brackets can be attached in any desired orientation.

In the illustrated embodiment, the stud mounting tabs 44, 46 are part of the mounting bracket 10 described above; however, the stud mounting tabs are not limited for use with the illustrated bracket. In other embodiments, the stud mounting tabs 44, 46 may be part of a different type of mounting bracket. In particular, the stud mounting tabs 44, 46 may be part of any type of mounting bracket mounting an electrical or communication device on a wall stud. For example, the stud mounting tabs 44, 46 may added to any conventional and/or commercially available mounting bracket.

The mounting bracket 10 can be sold and shipped to customers separately or as part of an assembly, such as a pre-assembled electrical unit, or as part of a kit. In one embodiment, a mounting bracket assembly includes the mounting bracket 10 as described above and a junction box J for attachment to the mounting bracket. The junction box J can be attached to the mounting bracket as-sold with the mounting bracket either in the initial configuration (FIG. 3) or in a stabilizing configuration for use with a certain wall stud depth. Alternatively, the mounting bracket 10 and junction box J can be sold together as a kit for assembly by the user. In another embodiment, the mounting bracket 10, junction box J, and plaster ring 140 can be sold together, either assembled or disassembled. In yet another embodiment, a mounting bracket assembly includes the mounting bracket 10 and the plaster ring 140. The mounting bracket and plaster ring can be sold assembled or disassembled. In any of the above embodiments, the assembly can further include one or more depth extenders 98 for extending the depth of the stabilizing extension 14. Other configurations and assemblies are within the scope of the present invention.

FIGS. 54-75 illustrate alternate embodiments for the mounting bracket with stabilizing extension. Corresponding reference numbers are used to refer to corresponding elements. Where elements are substantially similar to the embodiments described above, they will not be described in detail again below. The mounting brackets of the embodiments of FIGS. 54-75 described below can each include plaster ring mounting tabs and stud mounting tabs as described above.

In the embodiment of FIGS. 54-63, the mounting bracket 1010 is a unitary, one piece construction. As described above with reference to the previous embodiment, the mounting bracket 1010 is configured to be bent from an initial configuration to a plurality of stabilizing configurations. The mounting bracket 1010 includes a mounting face plate 1012 and a stabilizing extension 1014. The face plate 1012 is substantially similar to the face plate 12 described above, and as such will not be described in detail. The stabilizing extension 1014 is configurable to one of a plurality of stabilizing configurations for maintaining the face plate 1012 generally parallel to a front wall FW secured to a wall stud WS.

The stabilizing extension 1014 includes a first leg 1066 attached to one of the side edge margins (e.g., the left edge margin 1022) of the face plate 1012 and a second leg 1068 attached to the other side edge margin (e.g., the right edge margin 1024) of the face plate. A leg connector 1070 extends from one of the legs (e.g., the first leg 1066). In the initial configuration, the first and second legs 1066, 1068 extend laterally outward from the face plate 1012 and the leg connector 1070 extends generally parallel to the first leg and laterally outward therefrom. The stabilizing extension 1014 is configured for bending about bending axes 1053a-d extending generally transverse (e.g., perpendicular) to and spaced apart along the stabilizing extension. Bending areas of the stabilizing extension 1014 define the bending axes 1053a-d to allow for configuring the stabilizing extension into a selected one of the stabilizing configurations depending on the depth d of the wall stud WS to which the mounting bracket 1010 will be secured. For example, the bending areas may comprise lines of weakness as described above with reference to FIGS. 1-53. The stabilizing extension 1014 can include indicia (not shown) indicating where the extension should be bent for different stabilizing configurations, as described above with reference to previous embodiments. The stabilizing extension 1014 also includes openings 1056 for permitting the passage of wires (not shown) to a junction box J mounted on the mounting bracket 1010. The stabilizing extension 1014 includes extension tabs 1058 extending from each of the first and second legs 1066, 1068 for use in certain stabilizing configurations, as explained below.

The stabilizing extension 1014 is configurable from the initial configuration to one of a plurality of stabilizing configurations by bending the extension about selected bending axes 1053a-d at the specified bending areas. When the stabilizing extension 1014 is in a selected stabilizing configuration (see, e.g., FIGS. 56-63), the stabilizing extension defines first and second legs 1066, 1068 extending generally perpendicular to and rearward from the face plate 1012 and the leg connector 1070 extends between and interconnects the first and second legs. When the stabilizing extension 1014 is in a stabilizing configuration, it engages a rear surface (e.g., a rear wall RW secured to the wall stud WS) spaced rearward of the face plate 1012 to inhibit rearward deflection of the face plate in the space between the two walls, thus maintaining the plate generally parallel to the wall.

Referring to FIGS. 56-59, in order to position the stabilizing extension 1014 in the stabilizing configuration for a first wall stud depth (e.g., 3⅝ in), the first and second legs 1066, 1068 are bent rearward about the bending axes 1053*a,d* at the left and right edge margins 1022, 1024 to extend generally rearward from and perpendicular to the face plate 1012. The leg connector 1070 is bent about the bending axis 1053*b* to extend generally parallel to the face plate 1012. To secure the leg connector 1070 in the stabilizing configuration where it extends between and interconnects the legs 1066, 1068, a locking tongue 1060 on the end of the leg connector is inserted through an opening 1076 on the second leg 1068. The locking tongue 1060 is bent (e.g., bent forward toward the face plate 1012) to secure the leg connector 1070 in position between the first and second legs 1066, 1068. The extension tabs 1058 extend rearward beyond the leg connector 1070. With the extension tabs 1058 extended, the first and second legs 1066, 1068 are substantially co-extensive with the depth of the wall stud WS. The leg connector 1070 provides additional support to the first and second legs 1066, 1068 to maintain the face plate 1012 generally parallel to the wall and to prevent movement of the mounting bracket 1010 away from the front wall. The first and second legs 1066, 1068 and the leg connector 1070 and the face plate 1012 are interconnected as a unit, as describe above with reference to previous embodiments. The leg connector 1070 is generally rigid along its length such that it provides additional support to the generally rigid first and second legs 1066, 1068 to maintain the first and second legs extending rearward from and generally perpendicular to the face plate 1012, which in turn inhibits movement of the mounting bracket 1010 rearward away from the front wall FW. Because the legs 1066, 1068 are connected by the leg connector 1070, if one of the legs moves relative to the face plate 1012, the other leg will move as well, thereby assuring that the face plate remains generally parallel to the wall. In addition, each of the legs 1066, 1068 can move only a limited horizontal distance before it contacts the junction box J, thereby preventing additional movement of the legs that might move the face plate 1012 out of alignment with the wall. Ribs 1054 on the stabilizing extension 1014 provide rigidity to the legs 1066, 1068 and the leg connector 1070 to inhibit bending along their respective lengths.

FIGS. 60-63 illustrate another stabilizing configuration of the stabilizing extension 1014. The stabilizing extension is folded as described above with reference to FIGS. 56-59 for the first wall stud depth. Then, the extension tabs 1058 are bent about bending axes 1053*b,c* to decrease the depth of the stabilizer to make it suitable for use with a second wall stud depth smaller than the first wall stud depth (e.g., 2½ in). As seen in FIGS. 60-63, the extension tabs 1058 are bent inward until they are generally parallel with the leg connector 1070.

In another embodiment, illustrated in FIGS. 64-68, the mounting bracket 2010 is similar to the embodiment of FIGS. 54-63, but the stabilizing extension is configured for use with a separate leg connector. The mounting bracket 2010 includes a mounting face plate 2012 and a stabilizing extension 2014 that is configurable to one of a plurality of stabilizing configurations for maintaining the face plate generally parallel to a front wall secured to a wall stud WS.

The stabilizing extension 2014 includes a first leg 2066 attached to the left edge margin 2022 of the face plate 2012 and a second leg 2068 attached to the right edge margin 2024 of the face plate. A leg connector 2070 is initially attached to the first leg 2066 and is configured for removal from the first leg, although the leg connector can be initially separate from the first leg within the scope of the present invention. The leg connector 2070 includes a main body 2180 and a locking tongue 2060 at each end of the main body. The first and second legs 2066, 2068 include a plurality of openings 2076 configured to receive the locking tongues 2060 of the leg connector 2070. The stabilizing extension 2014 is configured for bending about bending axes 2053*a-j* extending generally transverse (e.g. perpendicular) to and spaced apart along the stabilizing extension. Bending areas of the stabilizing extension 2014 define the bending axes 2053*a -j* to allow for configuring the stabilizing extension into a selected one of the stabilizing configurations depending on the depth d of the wall stud WS to which the mounting bracket 2010 will be secured. For example, the bending areas may comprise lines of weakness as described above. The stabilizing extension 2014 can include indicia (not shown) indicating where the extension should be bent and where the leg connector 2070 should be attached for different stabilizing configurations.

The stabilizing extension 2014 is configurable from the initial configuration (FIG. 64) to one of a plurality of stabilizing configurations by attaching the leg connector 2070 at selected openings 2076 in the first and second legs 2066, 2068 and bending the extension about selected bending axes 2053*a-j*. When the stabilizing extension 2014 is in a selected stabilizing configuration (see, e.g., FIGS. 65-68), the first and second legs 2066, 2068 extend generally perpendicular to and rearward from the face plate 2012, and the leg connector 2070 extends between and interconnects the first and second legs. When the stabilizing extension 2014 is in a stabilizing configuration, it engages a rear surface (e.g., a rear wall secured to the wall stud WS) spaced rearward of the face plate 2012 to inhibit rearward deflection of the face plate in the space between the two walls, thus maintaining the plate generally parallel to the wall.

Figure 65:
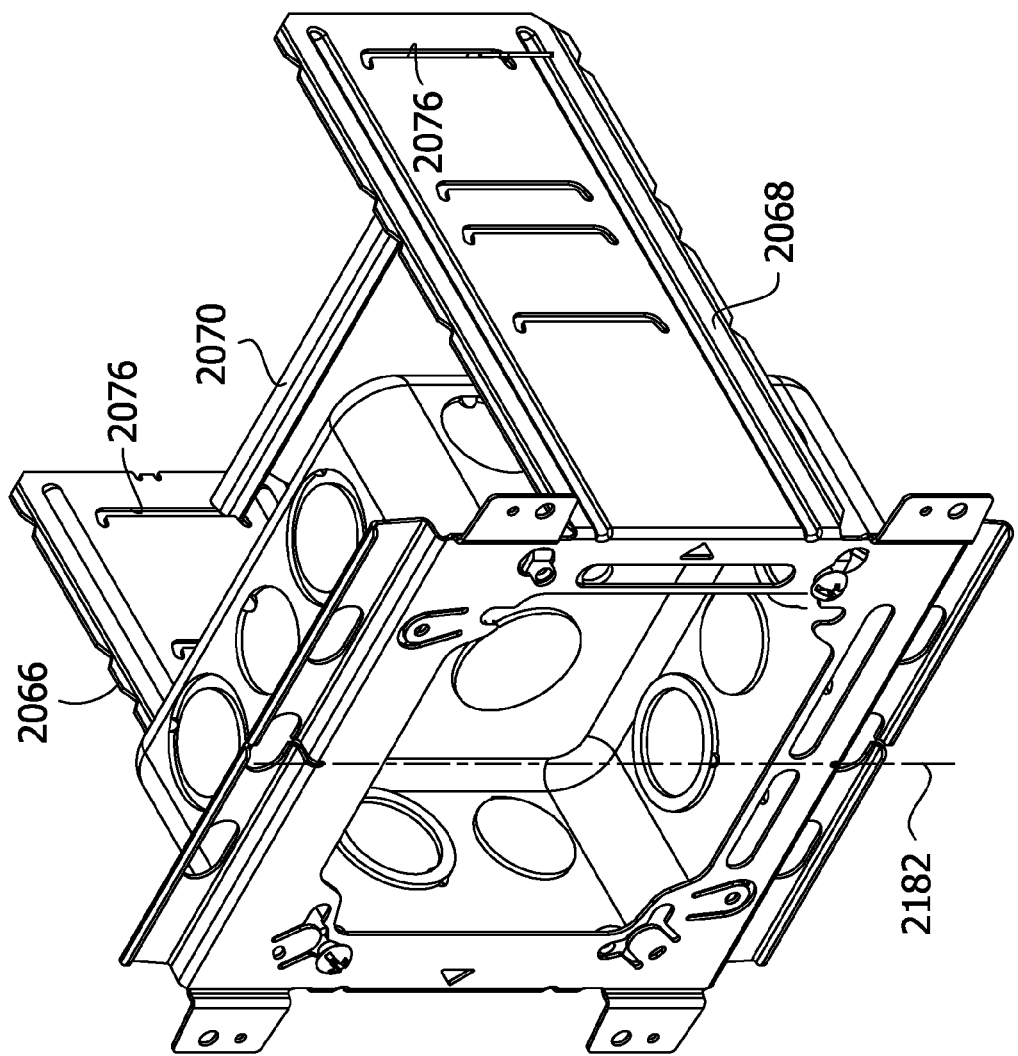
FIG. 65 is a perspective of a mounting bracket assembly including the mounting bracket in a first stabilizing configuration and a junction box attached to the mounting bracket.
Figure 66:
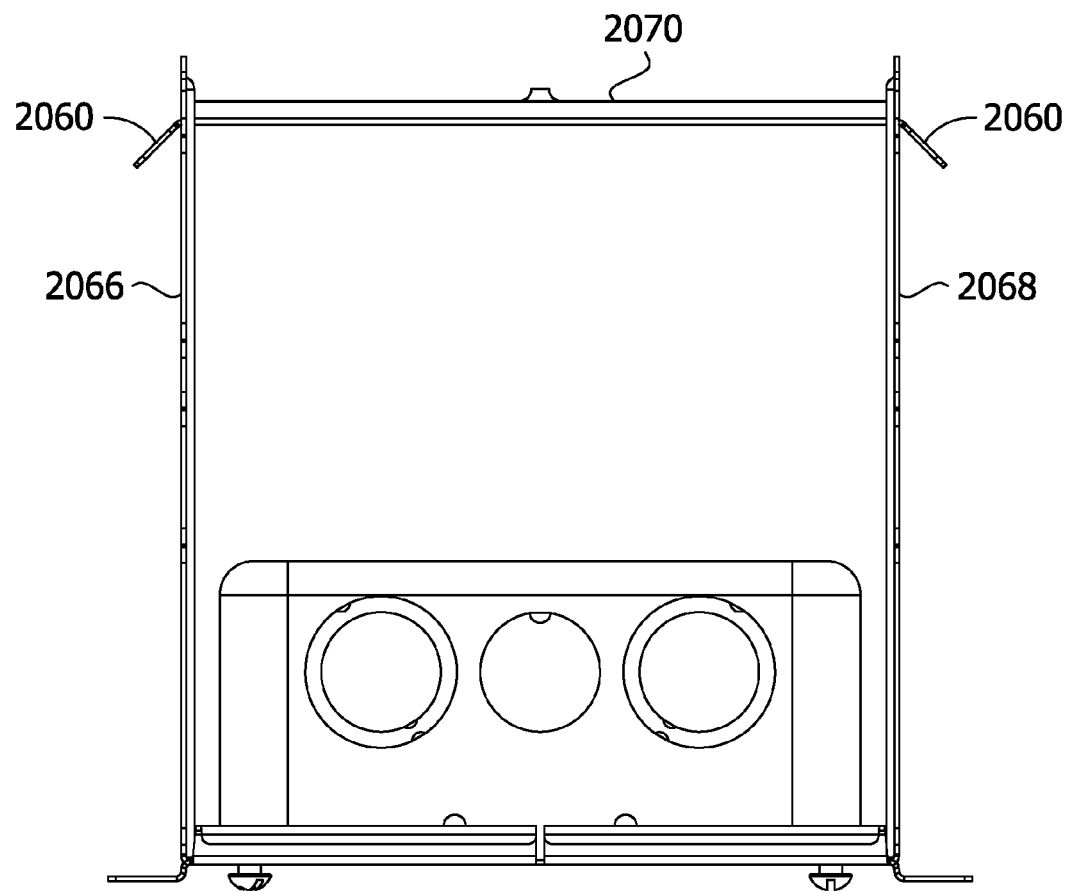
FIG. 66 is a top plan of the mounting bracket assembly of FIG. 65.

In order to position the stabilizing extension 2012 in the stabilizing configuration for a first wall stud depth (e.g., 3⅝ in), the leg connector 2070 is first removed from the first leg 2066 of the extension. The first and second legs 2066, 2068 are bent rearward about the bending axes 2053*a,j* at the left and right edge margins 2022, 2024 to extend generally rearward from and perpendicular to the face plate 2012. The locking tongues 2060 of the leg connector 2070 are inserted into corresponding opposed openings 2076 in the first and second legs 2066, 2068, such as the rearmost openings as seen in FIGS. 65 and 66. In order to facilitate insertion of the leg connector 2070 between the first and second legs 2066, 2068 and the locking tongue 2060 into the openings 2076, the face plate 2012 is configured to bend about a central bending axis 2182 to separate the legs, thereby easing insertion of the leg connector and locking tongue into position for the stabilizing configuration. The locking tongues 2060 are then bent (e.g., bent forward toward the face plate 2012) to secure the leg connector 2070 in position between the first and second legs 2066, 2068. The leg connector 2070 provides additional support to the first and second legs 2066, 2068 to maintain the face plate 2012 generally parallel to the wall and to prevent movement of the mounting bracket 2010 away from the front wall. The first and second legs 2066, 2068 and the leg connector 2070 and the face plate 2012 are interconnected as a unit, as described above with reference to previous embodiments. The leg connector 2070 is generally rigid along its length such that it provides additional support to the generally rigid first and second legs 2066, 2068 to maintain the first and second legs extending rearward from and generally perpendicular to the face plate 2012, which in turn inhibits movement of the mounting bracket 2010 rearward away from the front wall FW. Because the legs 2066, 2068 are connected by the leg connector 2070, if one of the legs moves relative to the face plate 2012, the other leg will move as well, thereby assuring that the face plate remains generally parallel to the wall. In addition, each of the legs 2066, 2068 can move only a limited distance before it contacts the junction box J, thereby preventing additional movement of the legs that might move the face plate out of alignment with the wall.

Figure 67:
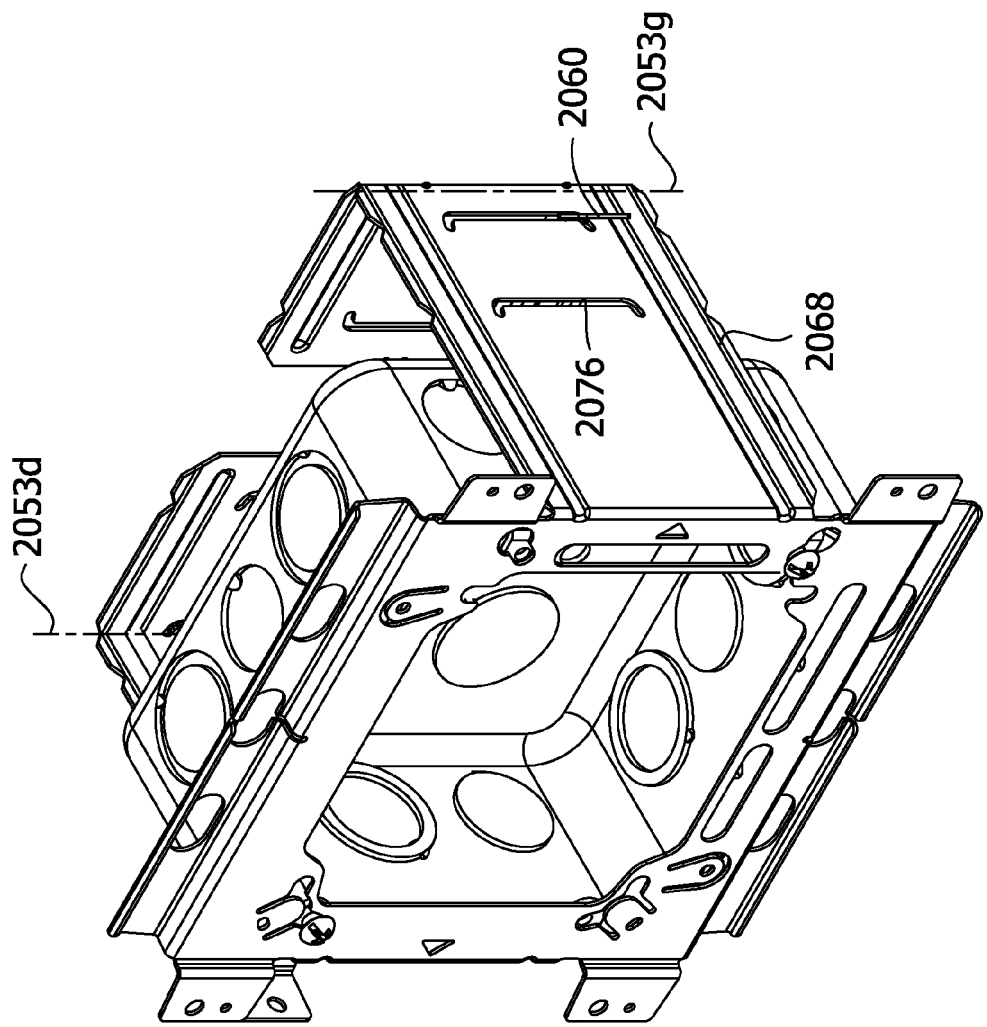
FIG. 67 is a perspective of the mounting bracket assembly with the mounting bracket in a second stabilizing configuration.
Figure 68:
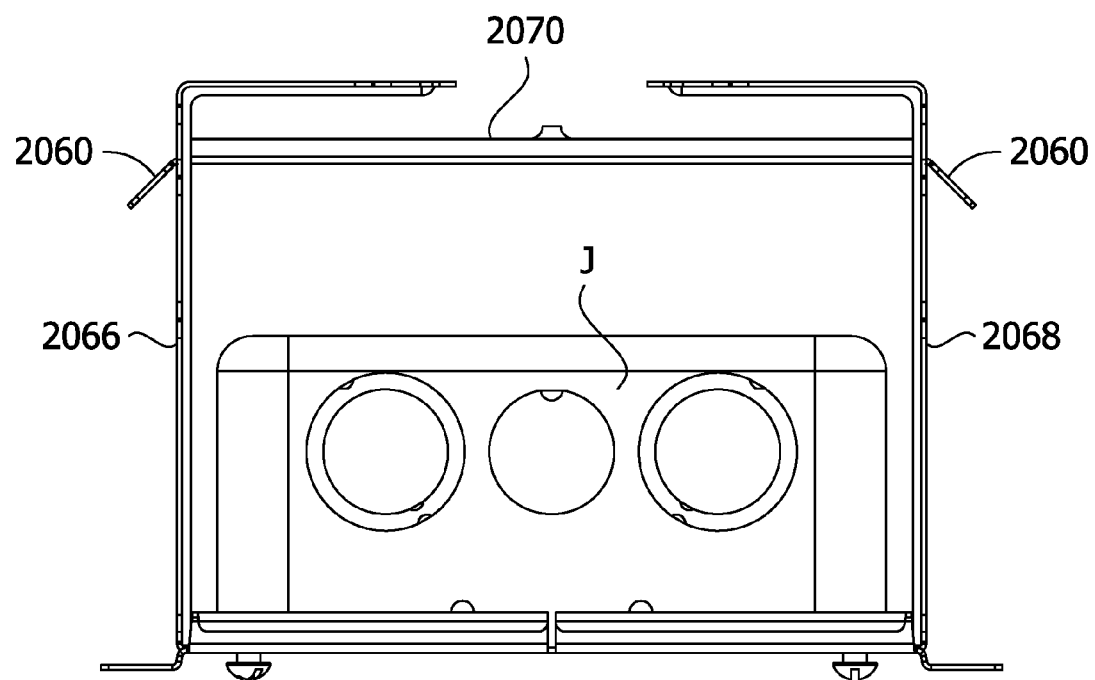
FIG. 68 is a top plan of FIG. 67.
Figure 69:
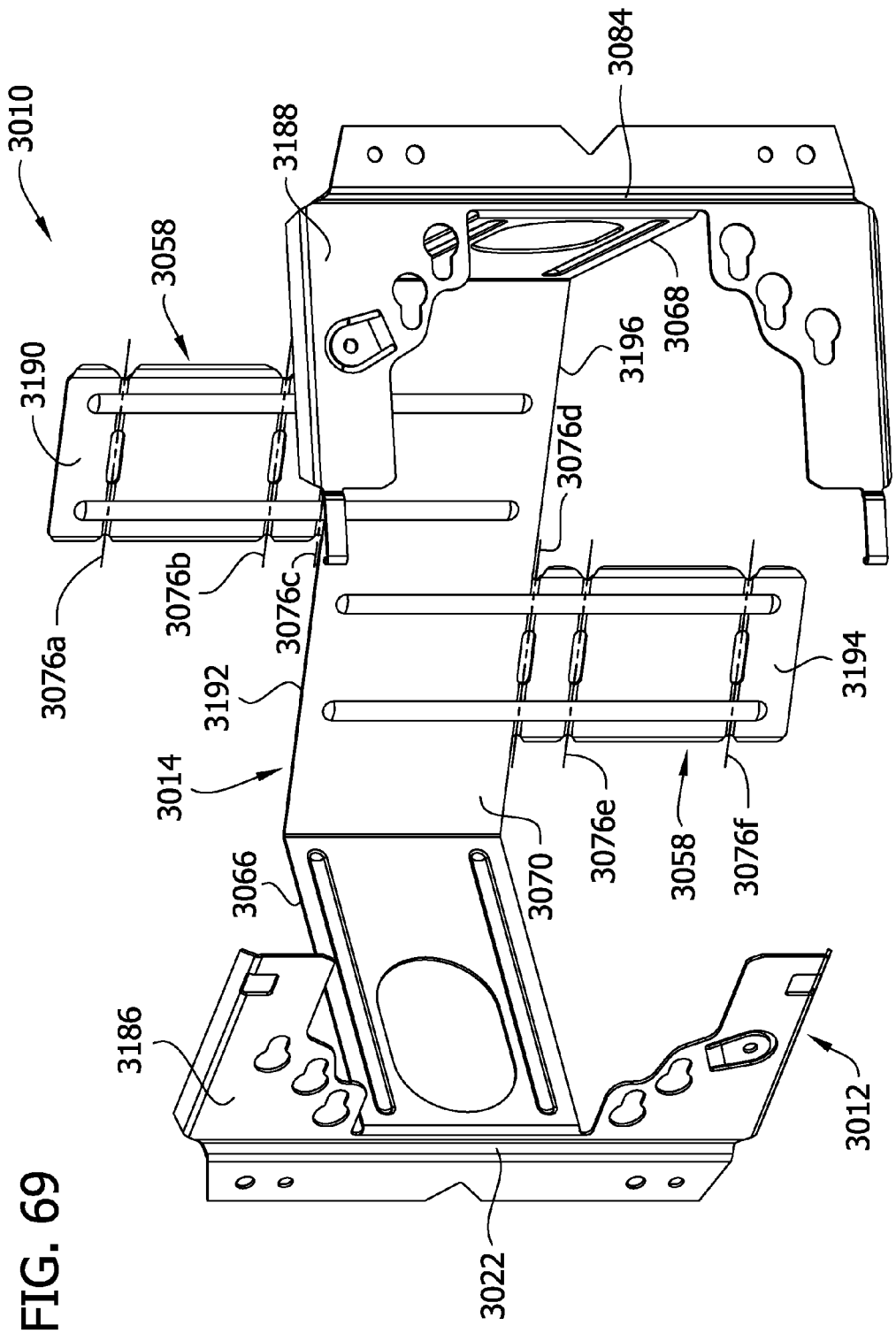
FIG. 69 is a perspective of a fourth embodiment of a mounting bracket for a junction box.

FIGS. 67 and 68 illustrate another stabilizing configuration of the stabilizing extension 2014. In this configuration, the leg connector 2070 is inserted into openings 2076 in the first and second legs 2066, 2068 closer to the face plate 2012 to accommodate a second wall stud depth smaller than the first wall stud depth (e.g., 2½ in). After the leg connector 2070 is inserted into the openings 2076 and is in position connecting the first and second legs 2066, 2068, the legs are bent about bending axes 2053$d,g$ such that the ends of the legs extending past the leg connector are bent inward until they are generally parallel with the leg connector. To accommodate different wall stud depths, the leg connector 2070 can similarly be inserted into any of the openings 2076 in the first and second legs 2066, 2068, and the remainder of the legs then bent about the corresponding bending axis 2053$b$-$i$ to be folded behind the leg connector.

In another embodiment, illustrated in FIGS. 69-75, the mounting bracket 3010 is a unitary, one piece construction. As described above with reference to previous embodiments, the mounting bracket 3010 is configured to be bent from an initial configuration to a plurality of stabilizing configurations. The mounting bracket 3010 includes a mounting face plate 3012 and a stabilizing extension 3014. In the initial configuration of this embodiment, the stabilizing extension 3014 is continuous and the face plate 3012 is separated into two portions 3186, 3188 extending from the ends of the stabilizing extension.

Figure 70:
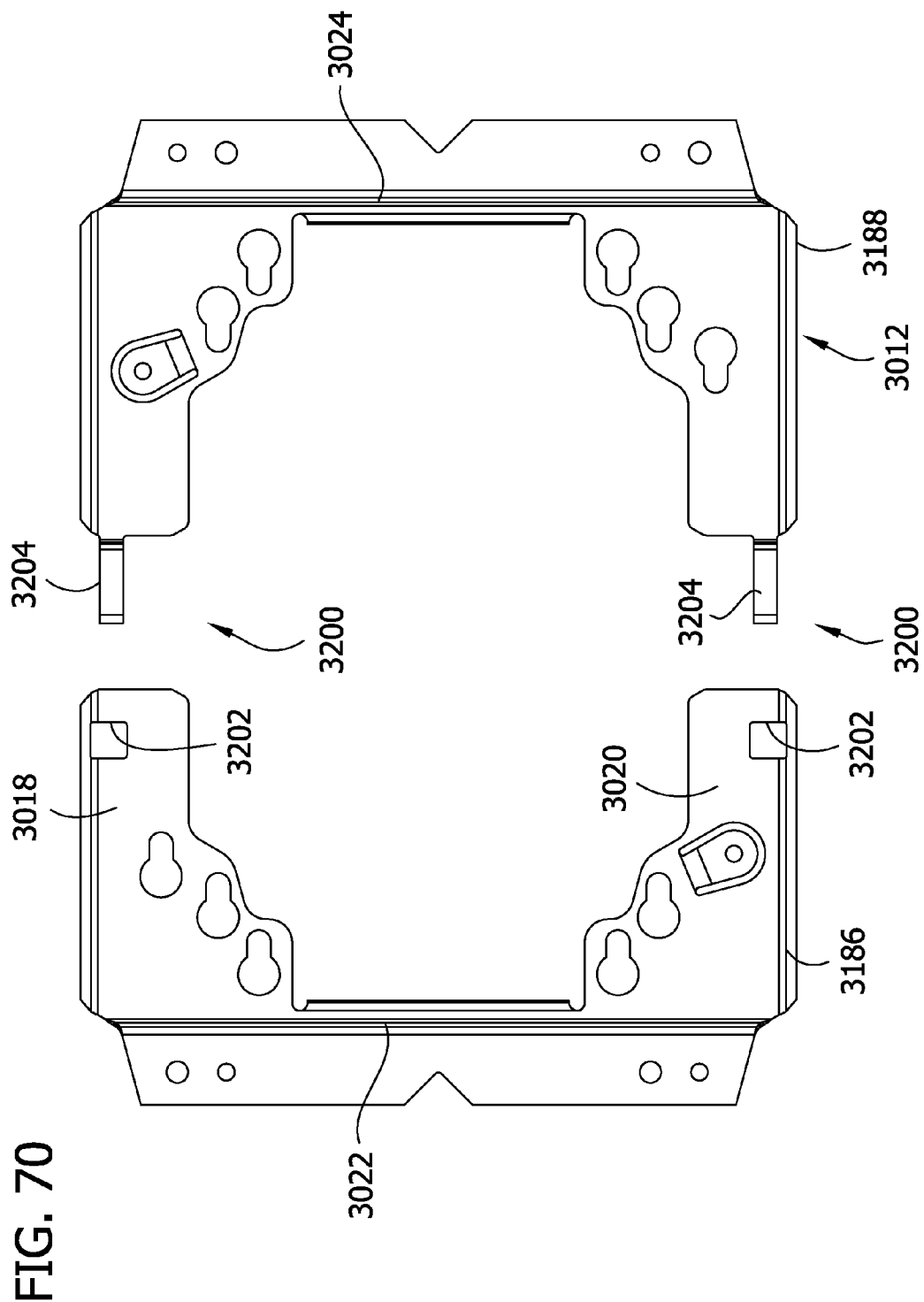
FIG. 70 is a front elevation of the mounting bracket of FIG. 69.
Figure 71:
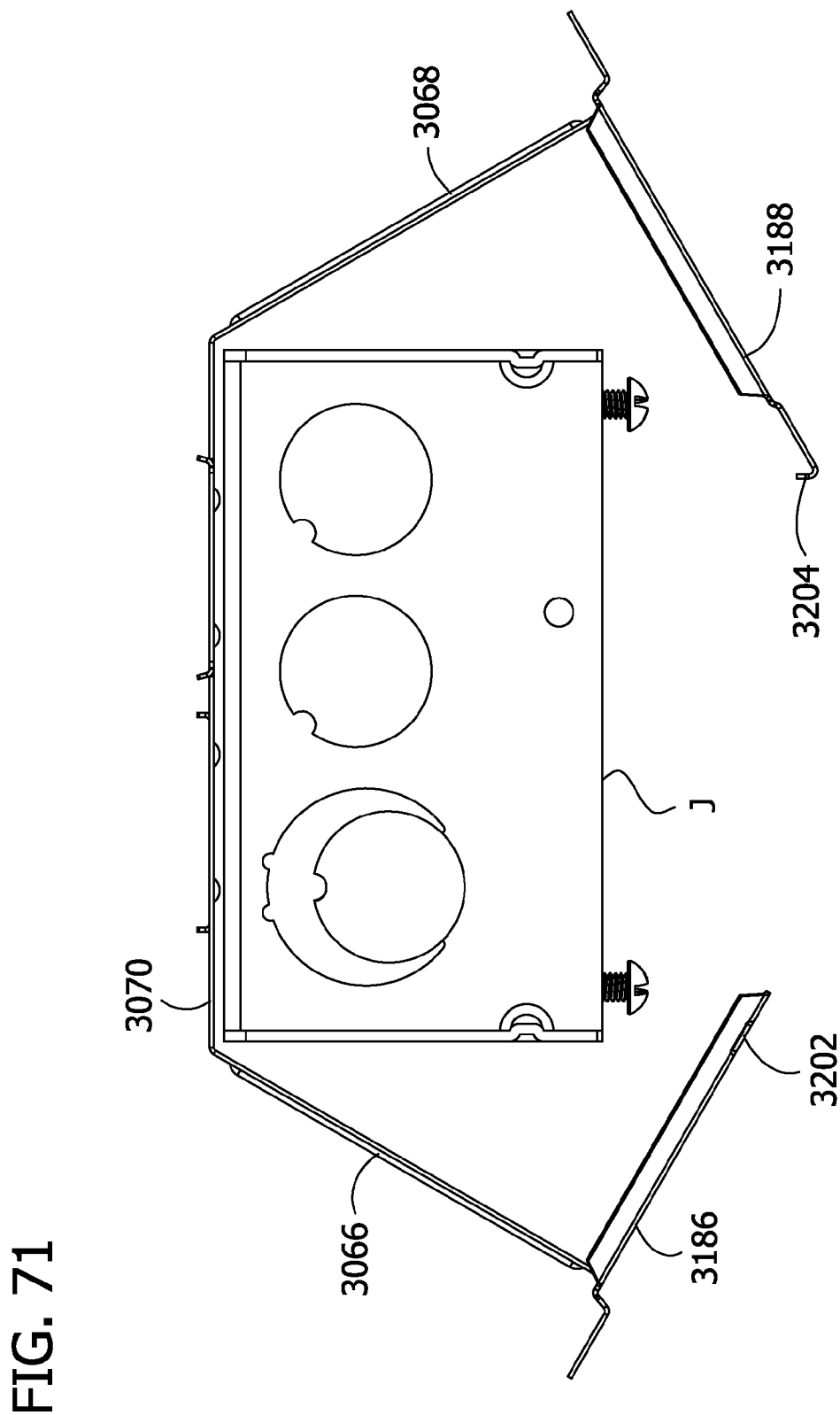
FIG. 71 is a top plan of a mounting bracket assembly including the mounting bracket of FIG. 69 and a junction box.
Figure 72:
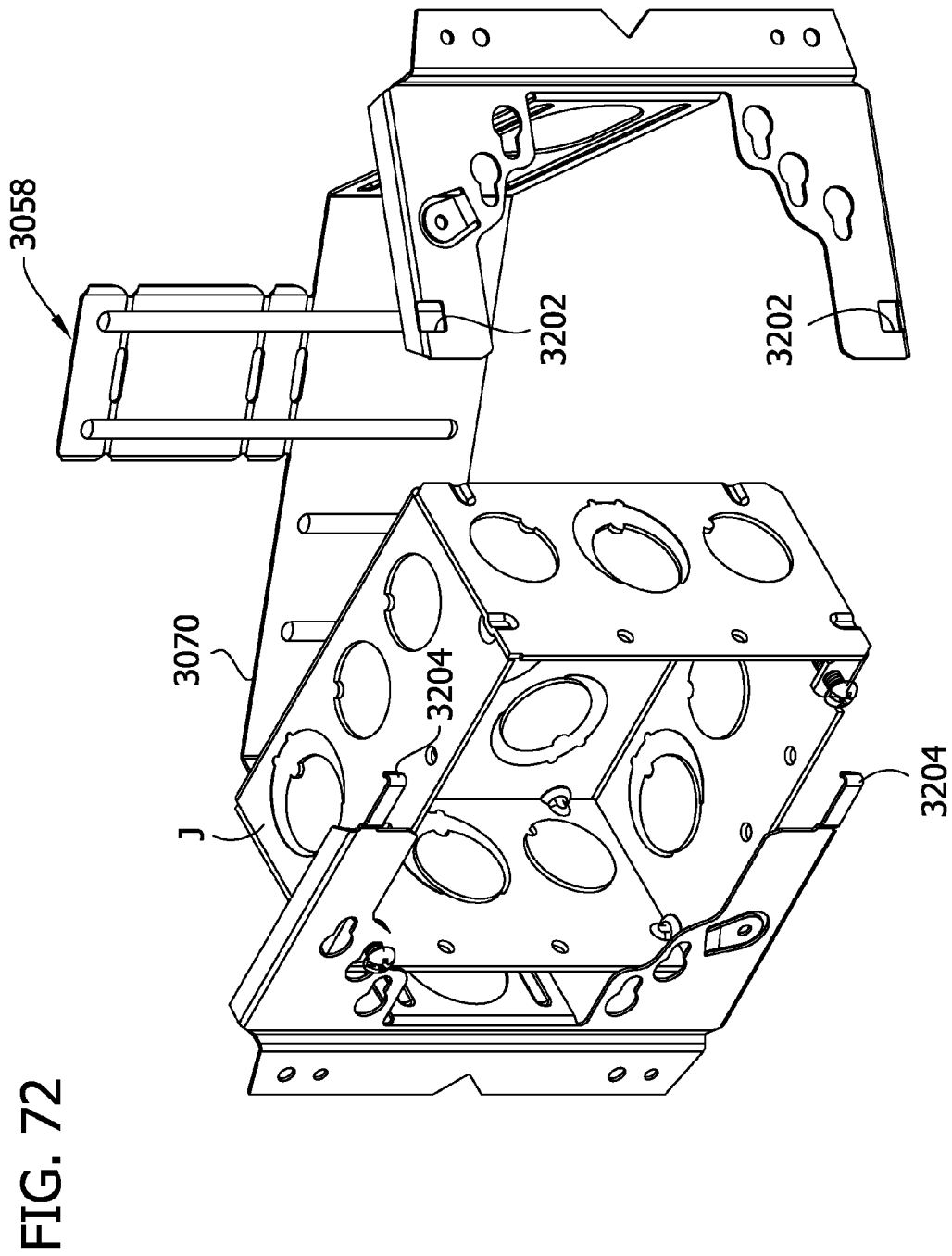
FIG. 72 is a perspective of the mounting bracket assembly of FIG. 71.

The stabilizing extension 3014 includes a first leg 3066 attached to the left edge margin 3022 of the face plate 3012 and a second leg 3068 attached to the right edge margin 3024 of the face plate. A leg connector 3070 extends between and interconnects the first and second legs 3066, 3068. Extension tabs 3058 extend from opposing edges of the leg connector 3070. An upper extension tab 3190 extends upward from a top edge 3192 of the leg connector 3070 and a lower extension tab 3194 extends downward from a bottom edge 3196 of the leg connector. The upper and lower extension tabs 3190, 3194 are configured for bending about bending axes 3076$a$-$f$. The face plate 3012 has a latch 3200 including an opening 3202 on the first portion 3186 and a hook 3204 on the second portion 3188 configured to engage the opening to connect the two portions of the face plate. In the illustrated embodiment, the face plate 3012 includes two latches 3200, one near the upper edge margin 3018 and one near the lower edge margin 3020 (FIG. 70). As seen in FIGS. 71 and 72, the stabilizing extension 3014 and face plate 3012 are bent around the junction box J to position the junction box in the mounting bracket 3010.

When the stabilizing extension 3014 is in a stabilizing configuration (see, e.g., FIGS. 73-75), the face plate portions 3186, 3188 are connected, the first and second legs 3066, 3068 extend generally perpendicular to and rearward from the face plate 3012, and the leg connector 3070 extends between the first and second legs generally parallel to the face plate. The stabilizing extension 3014 can include indicia (not shown) indicating where the extension should be bent for different stabilizing configurations, as described above with reference to previous embodiments. When the stabilizing extension 3014 is in a stabilizing configuration, it engages a rear surface (e.g., a rear wall secured to the wall stud WS) spaced rearward of the face plate 3012 to inhibit rearward deflection of the face plate in the space between the two walls, thus maintaining the plate generally parallel to the wall.

Figure 73:
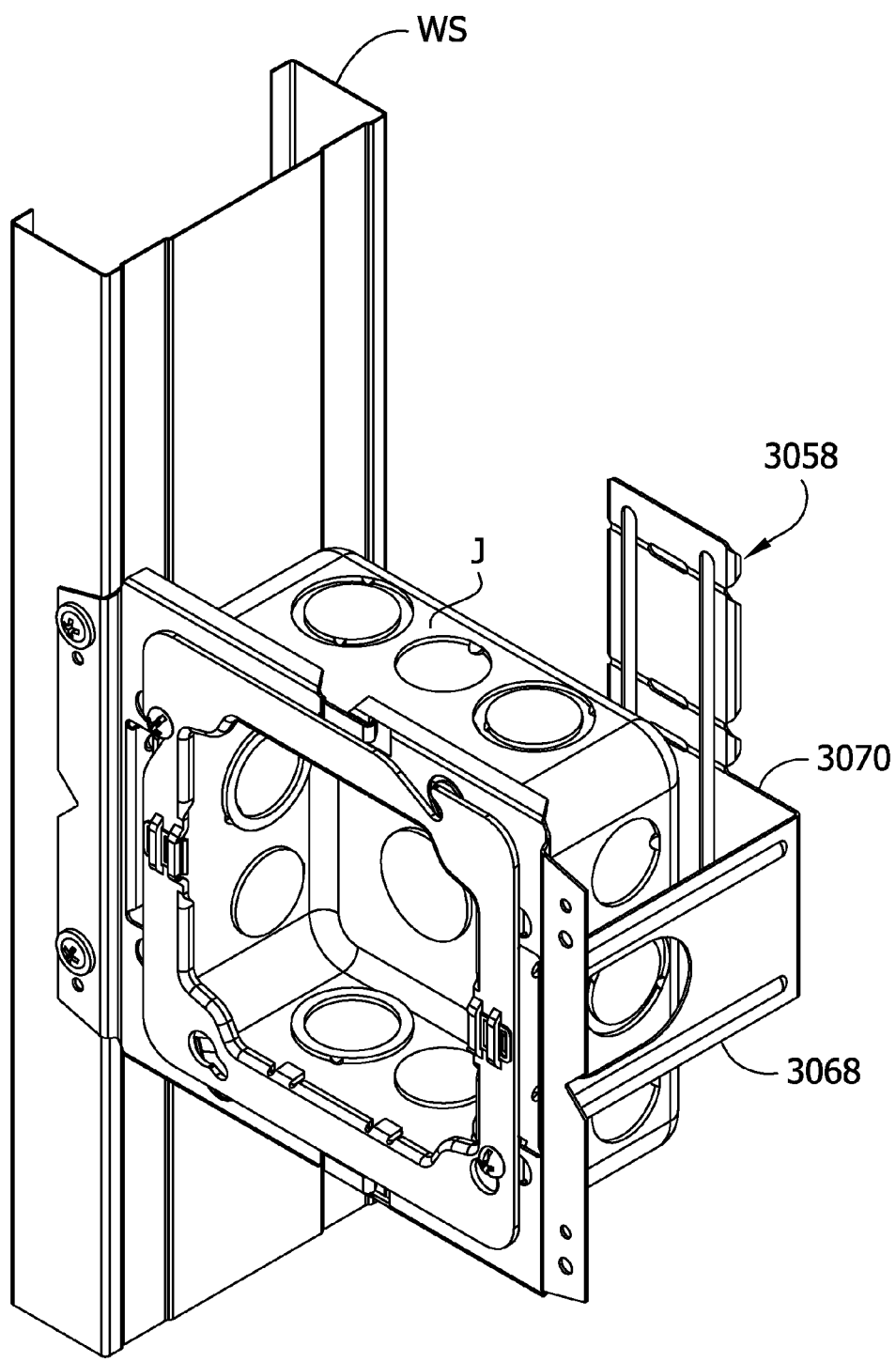
FIG. 73 is a perspective of the mounting bracket assembly attached to a wall stud with the mounting bracket in a first stabilizing configuration.
Figure 74:
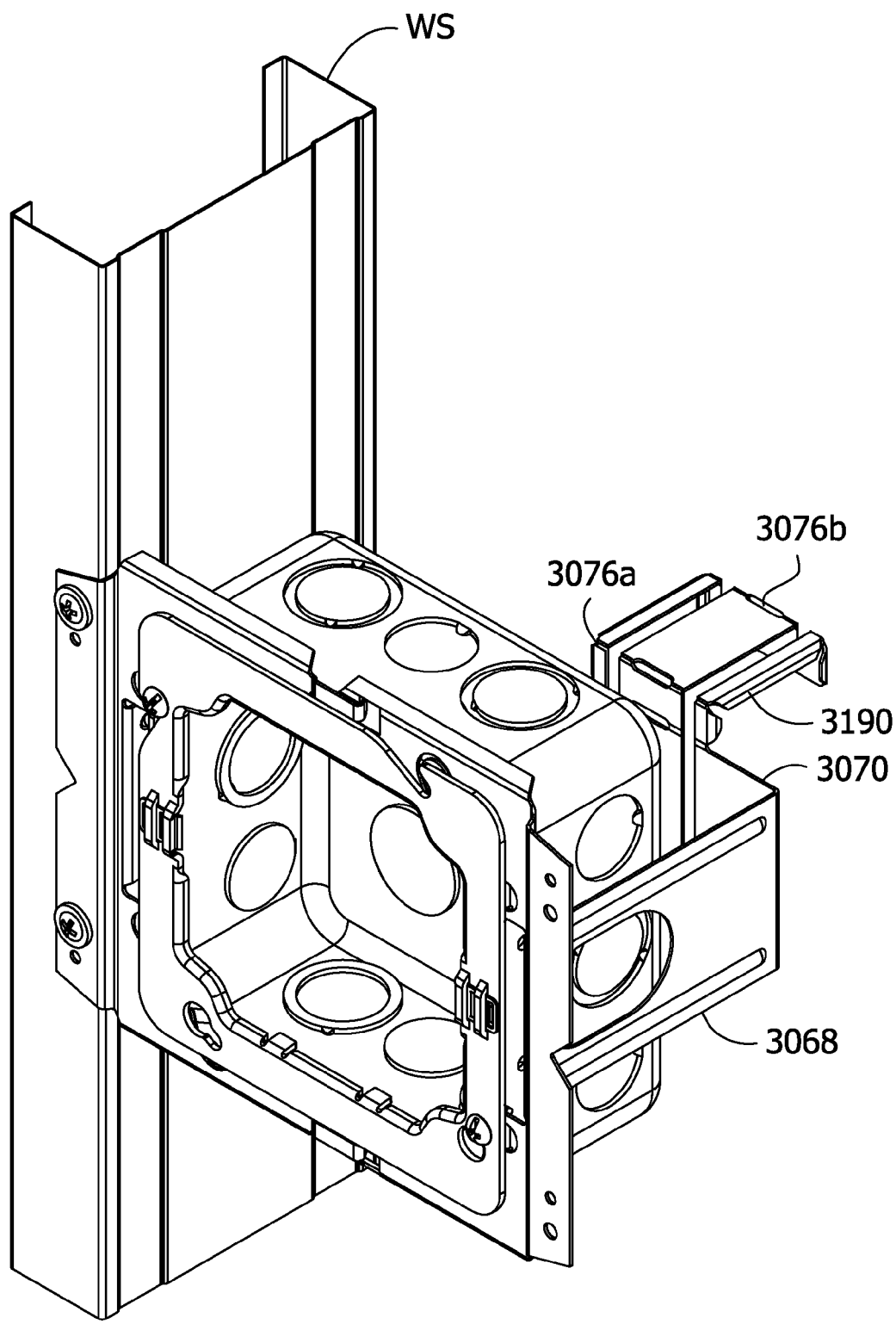
FIG. 74 is a perspective of the mounting bracket assembly attached to a wall stud with the mounting bracket in a second stabilizing configuration.
Figure 75:
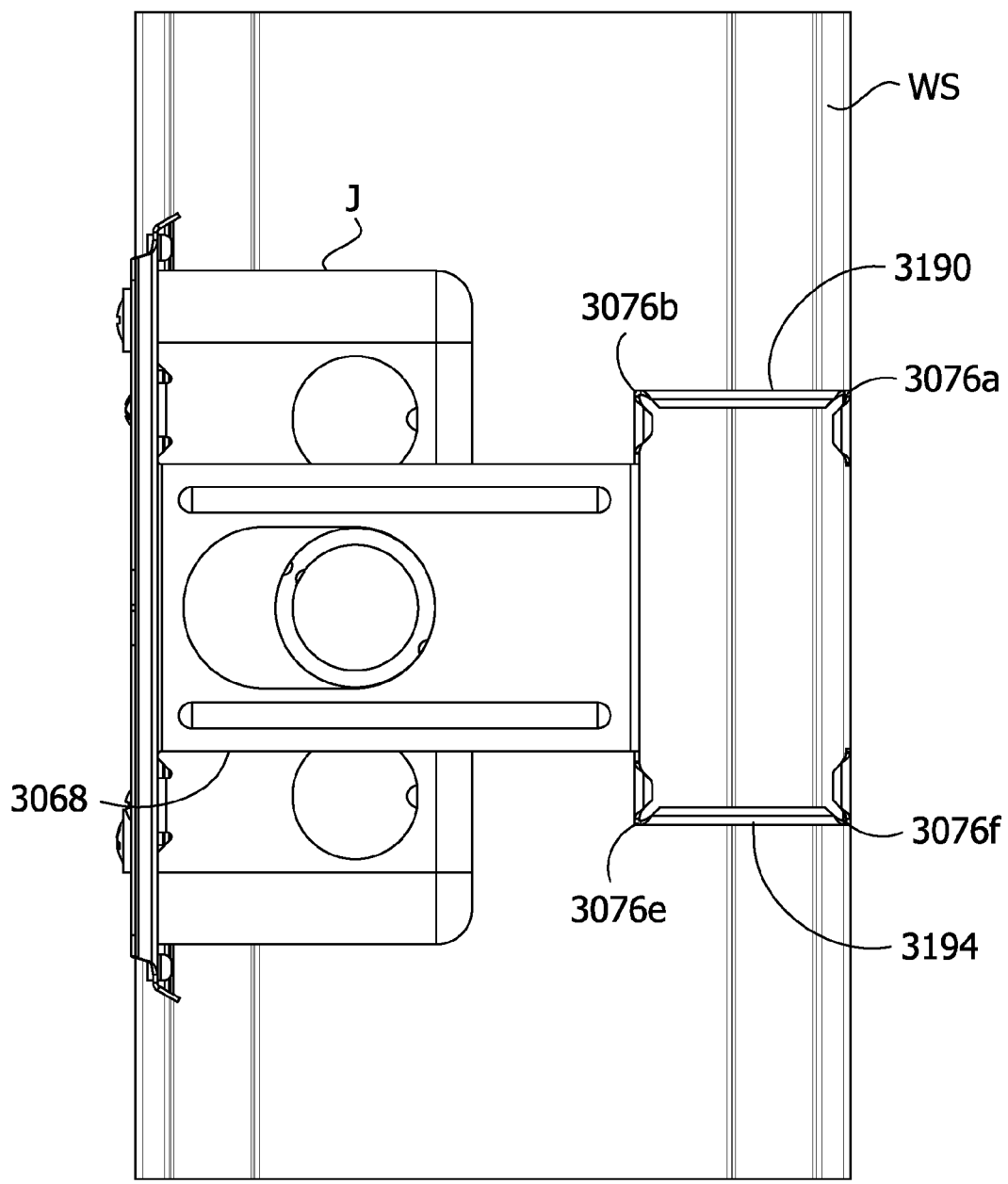
FIG. 75 is a side elevation of FIG. 74.

In a first stabilizing configuration, suitable for use with a first wall stud depth (e.g., 2½ in), the extension tabs 3058 remain in their initial configuration extending from and generally coplanar with the leg connector 3070 (see, e.g., FIG. 73). In a second stabilizing configuration, suitable for use with a second wall stud depth greater than the first wall stud depth (e.g., 3⅝ in), the extension tabs 3058 are bent about bending axes 3076$a$-$f$ to increase the depth of the stabilizer. As seen in FIGS. 74 and 75, the upper extension tab 3190 is bent downward about bending axes 3076$a,b$ and the lower extension tab 3194 is bent upward about bending axes 3076$e,f$. To further increase the depth of the stabilizing extension, the upper extension tab 3190 can be bent about bending axes 3076$a,c$ and the lower extension tab 3194 bent about bending axes 3076$d,f$ (not shown).

The mounting brackets as described above are versatile and permit a user to use the bracket with various size junction boxes and various wall stud depths. The mounting brackets as described eliminate the need for different depths of mounting bracket based on wall stud depth or different size mounting brackets based on junction box size. In addition, the bracket can be attached to a plaster ring without a junction box. Furthermore, multiple brackets can be attached to each other to accommodate any junction box requirements for a structure.

Having described the invention in detail, it will be apparent that modifications and variations are possible without departing from the scope of the invention defined in the appended claims.

When introducing elements of the present invention or the illustrated embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A mounting bracket for mounting a junction box on a wall stud, the mounting bracket comprising:
   a face plate including
      a main body having opposite front and rear faces and opposite left and right side edge margins, wherein the main body is configured for attaching the junction box to the rear face thereof, and
      at least one stud mounting tab configured for attachment to a wall stud, wherein the at least one stud mounting tab extends outward from at least one of the left and right side edge margins of the main body; and
   a stabilizing extension connected to the face plate, the stabilizing extension comprising a unitary stabilizing body, the unitary stabilizing body including
      a first leg extending rearward from the face plate,
      a second leg extending rearward from the face plate, and
      a leg connector extending between and interconnecting the first and second legs such that movement of one of the first and second legs relative to the face plate causes movement of the other of the first and second legs relative to the face plate, wherein the unitary stabilizing body is bent at bending locations to form the first leg, the second leg, and the leg connector, wherein the stabilizing extension includes indicia indicating the bending locations.

2. The mounting bracket as set forth in claim 1, wherein the stabilizing extension is formed integrally with the face plate.

3. The mounting bracket as set forth in claim 1, wherein the first leg extends from the first side edge margin of the face plate, the leg connector extends from the first leg, and the second leg extends from the leg connector and is attached to the second side edge margin of the face plate.

4. The mounting bracket as set forth in claim 3, wherein the second leg includes a locking tongue received in an opening in the face plate to attach the second leg to the second side edge margin of the face plate.

5. The mounting bracket as set forth in claim 4, wherein the locking tongue is a first locking tongue attaching the second leg to the second side edge margin of the face plate when the stabilizing extension is in a first stabilizing configuration, the second leg further comprising a second locking tongue configured to be received in the opening in the face plate to secure the second leg to the second side edge margin of the face plate when the stabilizing extension is in a second stabilizing configuration.

6. The mounting bracket as set forth in claim 1, wherein the first leg extends from the first side edge margin of the face plate and the second leg extends from the second side edge margin of the face plate.

7. The mounting bracket as set forth in claim 1, wherein the leg connector includes extension tabs configured to be bent relative to the leg connector to increase a depth of the stabilizing extension.

8. The mounting bracket as set forth in claim 1, further comprising a depth extender configured for attachment to the stabilizing extension to increase a depth of the stabilizing extension.

9. The mounting bracket as set forth in claim 8, wherein the depth extender comprises a first set of attachment clips configured for attachment to the stabilizing extension to increase the depth of the stabilizing extension to a first extended depth.

10. The mounting bracket as set forth in claim 9, wherein the depth extender comprises a second set of attachment clips configured for attachment to the stabilizing extension to increase the depth of the stabilizing extension to a second extended depth greater than the first extended depth.

11. The mounting bracket as set forth in claim 1, wherein the at least one stud mounting tab includes first and second stud mounting tabs extending from the respective first and second side edge margins of the main body, each of the stud mounting tabs being configured for attachment to both a wall stud and a second mounting bracket.

12. The mounting bracket as set forth in claim 11, wherein each of the first and second stud mounting tabs includes a clearance hole and a pilot hole vertically aligned with the clearance hole.

13. The mounting bracket as set forth in claim 1, wherein the main body of the face plate further comprises:

a mounting opening for attaching the main body of the face plate to a junction box; and a plaster ring mounting tab for mounting a plaster ring to the main body of the face plate, the plaster ring mounting tab being configured to be bent to overlie the mounting opening of the main body.

14. The mounting bracket as set forth in claim 13, wherein the plaster ring mounting tab includes a pilot hole positioned such that when the plaster ring mounting tab is bent to overlie the mounting opening, the pilot hole is aligned with the mounting opening.

15. A mounting bracket comprising:

a face plate including a main body having a mounting opening for attaching a junction box to the face plate, and a plaster ring mounting tab on the face plate for mounting a plaster ring to the face plate, the plaster ring mounting tab being configured to be bent to overlie the mounting opening of the face plate, wherein the plaster ring mounting tab includes a pilot hole positioned such that when the plaster ring mounting tab is bent to overlie the mounting opening, the pilot hole is aligned with the mounting opening.

16. A mounting bracket comprising:

a face plate including a main body having left and right edge margins;

a first stud mounting tab extending from the left edge margin of the main body, the first stud mounting tab including a clearance hole and a pilot hole vertically aligned with the clearance hole; and a second stud mounting tab extending from the right edge margin of the main body, the second stud mounting tab including a clearance hole and a pilot hole vertically aligned with the clearance hole.

17. The mounting bracket as set forth in claim 16, wherein the pilot hole of the first stud mounting tab is positioned beneath the clearance hole of the first stud mounting tab and the pilot hole of the second stud mounting tab is positioned above the clearance hole of the second stud mounting tab.

18. A mounting bracket for mounting a junction box on a wall stud, the mounting bracket comprising:

a face plate including a main body having opposite front and rear faces and opposite left and right side edge margins, wherein the main body is configured for attaching the junction box to the rear face thereof, and at least one stud mounting tab configured for attachment to a wall stud, wherein the at least one stud mounting tab extends outward from at least one of the left and right side edge margins of the main body; and a stabilizing extension connected to the face plate, the stabilizing extension including a first leg extending rearward from the face plate, a second leg extending rearward from the face plate, and a leg connector extending between and interconnecting the first and second legs such that movement of one of the first and second legs relative to the face plate causes movement of the other of the first and second legs relative to the face plate, wherein the leg connector includes extension tabs configured to be bent relative to the leg connector to increase a depth of the stabilizing extension.

* * * * *